(12) United States Patent
Zhang et al.

(10) Patent No.: US 12,113,984 B2
(45) Date of Patent: Oct. 8, 2024

(54) MOTION VECTOR DERIVATION BETWEEN COLOR COMPONENTS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

(*) Notice: Subject to any disclaimer, the term of this patent is extended or adjusted under 35 U.S.C. 154(b) by 0 days.

(21) Appl. No.: 17/831,958

(22) Filed: Jun. 3, 2022

(65) Prior Publication Data

US 2022/0312016 A1    Sep. 29, 2022

Related U.S. Application Data

(63) Continuation of application No. 17/342,900, filed on Jun. 9, 2021, now abandoned, which is a continuation
(Continued)

(51) Int. Cl.
*H04N 19/176* (2014.01)
*H04N 19/105* (2014.01)
(Continued)

(52) U.S. Cl.
CPC ......... *H04N 19/137* (2014.11); *H04N 19/105* (2014.11); *H04N 19/119* (2014.11); *H04N 19/176* (2014.11); *H04N 19/186* (2014.11)

(58) Field of Classification Search
CPC .. H04N 19/119; H04N 19/137; H04N 19/176; H04N 19/186
See application file for complete search history.

(56) References Cited

U.S. PATENT DOCUMENTS 6,489,995 B1   12/2002   Kok et al.
6,807,231 B1   10/2004   Wiegand et al.
(Continued)

FOREIGN PATENT DOCUMENTS

CN   101252686 A   8/2008
CN   101350920 A   1/2009
(Continued)

OTHER PUBLICATIONS

Andersson et al. "CE11: Deblocking of Sub-Block Boundaries for Luma," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0074, 2018.
(Continued)

*Primary Examiner* — Tsion B Owens
(74) *Attorney, Agent, or Firm* — Perkins Coie LLP

(57) ABSTRACT

A method for video processing is provided to comprise: dividing a video block of a first color component to obtain a first set sub-blocks of the first color component; dividing a corresponding video block of a second color component to obtain a second set of sub-blocks of a second color component; deriving one or more motion vectors of the first set of sub-blocks based on one or more motion vectors of the second set of sub-blocks; and performing, based on the one or more motion vectors of the first set and second set of sub-blocks, a conversion between the video block and a coded representation of the video.

20 Claims, 35 Drawing Sheets

Related U.S. Application Data of application No. PCT/CN2020/070119, filed on Jan. 2, 2020.

(51) Int. Cl.
*H04N 19/119* (2014.01)
*H04N 19/137* (2014.01)
*H04N 19/186* (2014.01)

(56) References Cited

U.S. PATENT DOCUMENTS

| | | | |
|---|---|---|---|
| 7,801,217 | B2 | 9/2010 | Boyce |
| 8,204,109 | B2 | 6/2012 | Xiong et al. |
| 9,544,601 | B2 | 1/2017 | Zhao et al. |
| 9,736,481 | B2 | 8/2017 | Zhang et al. |
| 9,860,559 | B2 | 1/2018 | Zhang et al. |
| 9,860,562 | B2 | 1/2018 | Zhang et al. |
| 9,912,925 | B2 | 3/2018 | Ye et al. |
| 9,986,257 | B2 | 5/2018 | Zhang et al. |
| 9,998,742 | B2 | 6/2018 | Chen et al. |
| 10,057,578 | B2 | 8/2018 | Rapaka et al. |
| 10,277,910 | B2 | 4/2019 | Xiu et al. |
| 10,375,411 | B2 | 8/2019 | Zhao et al. |
| 10,440,340 | B2 | 10/2019 | Ye et al. |
| 10,462,439 | B2 | 10/2019 | He et al. |
| 10,469,847 | B2 | 11/2019 | Xiu et al. |
| 10,477,214 | B2 | 11/2019 | Zhang et al. |
| 10,812,835 | B2 | 10/2020 | Wang et al. |
| 11,871,022 | B2 | 1/2024 | Zhang et al. |
| 11,930,182 | B2 | 3/2024 | Zhang et al. |
| 2003/0031258 | A1 | 2/2003 | Wang et al. |
| 2006/0193388 | A1 | 8/2006 | Woods et al. |
| 2006/0268166 | A1 | 11/2006 | Bossen et al. |
| 2008/0101707 | A1 | 5/2008 | Mukherjee et al. |
| 2009/0232207 | A1 | 9/2009 | Chen |
| 2010/0118943 | A1 | 5/2010 | Shiodera et al. |
| 2011/0122942 | A1 | 5/2011 | Kudana et al. |
| 2011/0200110 | A1 | 8/2011 | Chen et al. |
| 2012/0082224 | A1 | 4/2012 | Van Der Auwera |
| 2012/0219216 | A1 | 8/2012 | Sato |
| 2013/0128974 | A1 | 5/2013 | Chien et al. |
| 2014/0044179 | A1 | 2/2014 | Li et al. |
| 2014/0192883 | A1 | 7/2014 | Seregin |
| 2015/0016528 | A1 | 1/2015 | Wang |
| 2015/0341657 | A1 | 11/2015 | Onno et al. |
| 2015/0350687 | A1 | 12/2015 | Zhai et al. |
| 2015/0373343 | A1 | 12/2015 | Hendry et al. |
| 2016/0100163 | A1 | 4/2016 | Rapaka et al. |
| 2017/0048552 | A1 | 2/2017 | An et al. |
| 2017/0168709 | A1 | 6/2017 | Zhong et al. |
| 2017/0214932 | A1 | 7/2017 | Huang |
| 2017/0223377 | A1 | 8/2017 | Bankoski et al. |
| 2017/0332099 | A1 | 11/2017 | Lee et al. |
| 2018/0014017 | A1 | 1/2018 | Li et al. |
| 2018/0048889 | A1 | 2/2018 | Zhang et al. |
| 2018/0070105 | A1 | 3/2018 | Jin et al. |
| 2018/0131943 | A1 | 5/2018 | Park et al. |
| 2018/0184117 | A1 | 6/2018 | Chen et al. |
| 2018/0192069 | A1 | 7/2018 | Chen et al. |
| 2018/0213239 | A1 | 7/2018 | Mukherjee et al. |
| 2018/0241998 | A1 | 8/2018 | Chen et al. |
| 2018/0270500 | A1 | 9/2018 | Li et al. |
| 2018/0278950 | A1 | 9/2018 | Chen et al. |
| 2019/0045192 | A1 | 2/2019 | Socek et al. |
| 2019/0230350 | A1 | 7/2019 | Chen et al. |
| 2019/0246122 | A1 | 8/2019 | Zhang et al. |
| 2019/0273943 | A1 | 9/2019 | Zhao et al. |
| 2019/0379870 | A1 | 12/2019 | Ye et al. |
| 2020/0112740 | A1* | 4/2020 | Chien .................. H04N 19/52 |
| 2020/0221120 | A1 | 7/2020 | Robert et al. |
| 2020/0228815 | A1* | 7/2020 | Xu .................. H04N 19/44 |
| 2021/0029356 | A1 | 1/2021 | Zhang et al. |
| 2021/0092431 | A1 | 3/2021 | Zhang et al. |
| 2021/0297673 | A1 | 9/2021 | Zhang et al. |
| 2021/0329250 | A1 | 10/2021 | Zhang et al. |

FOREIGN PATENT DOCUMENTS

| | | |
|---|---|---|
| CN | 101491107 A | 7/2009 |
| CN | 101621693 A | 1/2010 |
| CN | 101626505 A | 1/2010 |
| CN | 101766030 A | 6/2010 |
| CN | 101833768 A | 9/2010 |
| CN | 102037732 A | 4/2011 |
| CN | 102577388 A | 7/2012 |
| CN | 104168483 A | 11/2014 |
| CN | 104244002 A | 12/2014 |
| CN | 104488271 A | 4/2015 |
| CN | 105103554 A | 11/2015 |
| CN | 105580365 A | 5/2016 |
| CN | 105723707 A | 6/2016 |
| CN | 105791858 A | 7/2016 |
| CN | 106303544 A | 1/2017 |
| CN | 106464885 A | 2/2017 |
| CN | 106688237 A | 5/2017 |
| CN | 106797476 A | 5/2017 |
| CN | 107079150 A | 8/2017 |
| CN | 107092787 A | 8/2017 |
| CN | 107231557 A | 10/2017 |
| CN | 108028933 A | 5/2018 |
| CN | 108109629 A | 6/2018 |
| CN | 108271023 A | 7/2018 |
| CN | 108293131 A | 7/2018 |
| CN | 108432250 A | 8/2018 |
| CN | 108702509 A | 10/2018 |
| CN | 108781282 A | 11/2018 |
| EP | 1658726 A2 | 5/2006 |
| JP | 2010068103 A | 3/2010 |
| KR | 20140146541 A | 12/2014 |
| TW | 200644644 A | 12/2006 |
| TW | 201433153 A | 8/2014 |
| TW | 201507443 A | 2/2015 |
| TW | 201820872 A | 6/2018 |
| TW | 201841505 A | 11/2018 |
| TW | 201902214 A | 12/2019 |
| WO | 2015196126 A1 | 12/2015 |
| WO | 2017059926 A1 | 4/2017 |
| WO | 2018054286 A1 | 3/2018 |
| WO | 2018070152 A1 | 4/2018 |
| WO | 2018226015 A1 | 12/2018 |
| WO | 2019004283 A1 | 1/2019 |
| WO | 2019229705 A1 | 12/2019 |
| WO | 2020008325 A1 | 1/2020 |

OTHER PUBLICATIONS

Bordes et al. "CE4-Related: LIC with Reduced Memory Buffer," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0203, 2018.

Boyce, Jill M. "Weighted Prediction in the H.264/MPEG AVC Video Coding Standard," Proceedings / 2004 IEEE International Syposium on Circuits and Systems, May 23-26, 2004, Sheraton Vancouver Wall Centre Hotel, Vancouver British Columbia, Piscataway, NJ, May 23, 2004, pp. III 789-792.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Flierl et al. "Multihypothesis Pictures for H.26L," Proceedings 2001 International Conference on Image Processing, ICIP 2001—Thessaloniki, Greece, Oct. 7-10, 2001, Institute of Electrical and Electronics Engineers, New York, NY, 2001, 3:526-529.

Luo et al. "CE9: Addressing the Decoding Latency Issue for Decoder-Side Motion Vector Refinement (DMVR)," Joint Video Experts Team (JVET) of ITU-T SG 16 WP 3 and ISO/IEC JTC 1/SC 29/WG 11, 12th Meeting: Macau, CN, Oct. 3-12, 2018, document JVET-L0253, 2018.

Xiu et al. "CE9-Related: A Simplified Design of Bi-Directional Optical Flow (BIO)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0591, 2018.

(56) References Cited

OTHER PUBLICATIONS

Zhang et al. "CE4-Related: Simplified Affine Prediction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0103, 2018.
Zhang et al. "CE10: Interweaved Prediction for Affine Motion Compensation (Test 10.5.1 and Test 10.5.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0269, 2018.
Zhang et al. "Non-CE2: Interweaved Prediction for Affine Motion Compensation," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0268, 2019.
International Search Report and Written Opinion from PCT/IB2019/054466 dated Sep. 9, 2019 (18 pages).
International Search Report and Written Opinion from PCT/IB2019/054467 dated Sep. 9, 2019 (17 pages).
International Search Report and Written Opinion from PCT/IB2019/054505 dated Sep. 9, 2019 (18 pages).
International Search Report and Written Opinion from PCT/IB2019/057399 dated Jan. 8, 2020 (17 pages).
International Search Report and Written Opinion from PCT/IB2019/057400 dated Nov. 6, 2019 (12 pages).
International Search Report and Written Opinion from PCT/CN2020/070113 dated Mar. 26, 2020 (9 pages).
International Search Report and Written Opinion from PCT/CN2020/070115 dated Mar. 24, 2020 (10 pages).
International Search Report and Written Opinion from PCT/CN2020/070119 dated Mar. 26, 2020 (10 pages).
International Search Report and Written Opinion from PCT/CN2020/071660 dated Apr. 13, 2020 (11 pages).
Non-Final Office Action from U.S. Appl. No. 17/342,900 dated Oct. 25, 2021.
Non-Final Office Action from U.S. Appl. No. 16/951,137 dated Oct. 4, 2022.
Zhang et al. "CE4-Related: Interweaved Prediction for Affine Motion Compensation," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0102, 2018.
Non-Final Office Action from U.S. Appl. No. 17/359,890 dated May 25, 2023.
Li et al. "CE2-related: Using Shorter-Tap Filter for 4x4 Sized Partition," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0310, 2019.(cited in CN202080008739.0 OA1 mailed Dec. 13, 2023).
Zhang et al. "CE4: Affine Prediction with 4x4 Sub-blocks for Chroma Components (Test 4.1.16)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0265, 2018. (cited in CN202080007867.3 OA1 mailed Dec. 12, 2023).
Notification to Grant Patent Right for Invention from Chinese Patent Application No. 202080007867.3 dated May 28, 2024.

\* cited by examiner

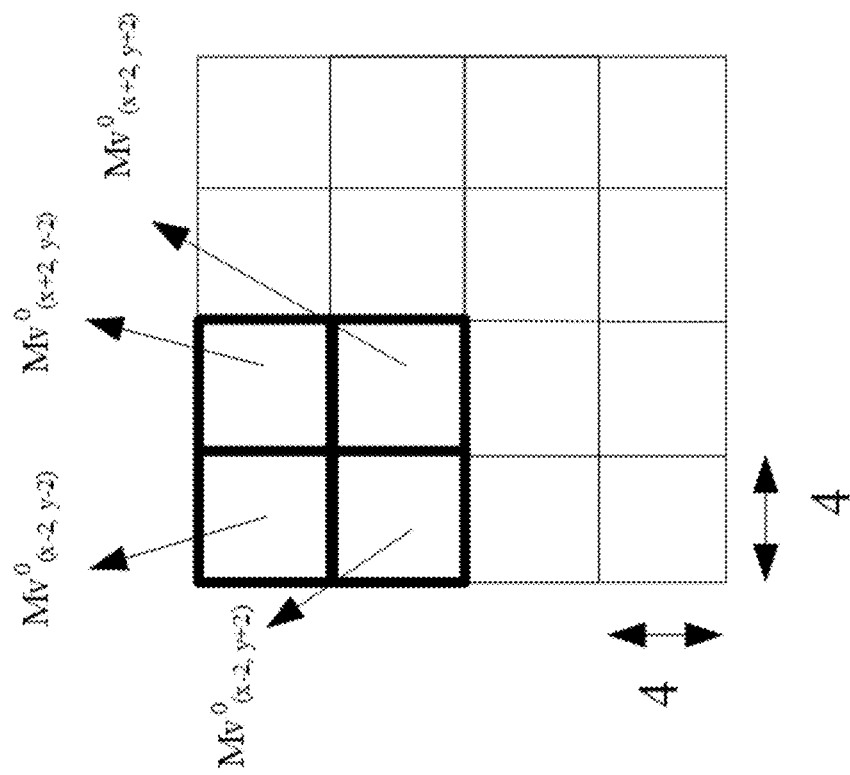
FIG. 16C Pattern 0

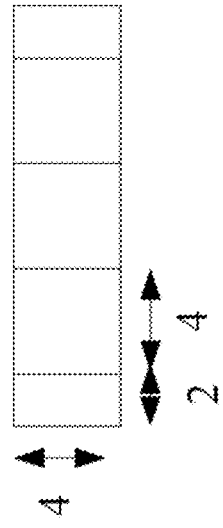
FIG. 17B
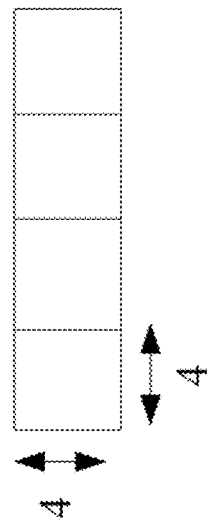
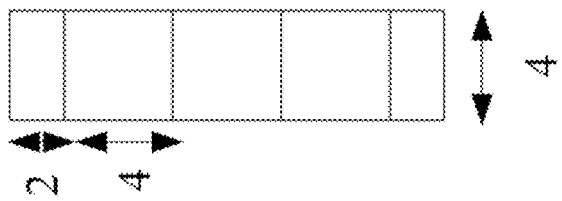
FIG. 17C
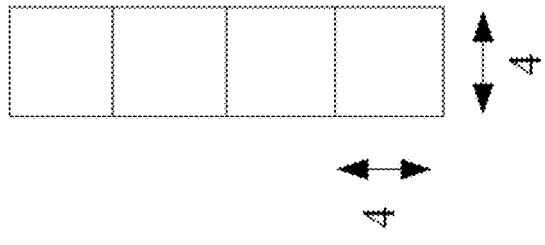

2210 ↙

2212 — Determining, for a conversion between a current video block of a video and a coded representation of the video, a refined motion information for the current video block 2214 — Performing the conversion using the refined motion information

FIG. 22A

MOTION VECTOR DERIVATION BETWEEN COLOR COMPONENTS

CROSS REFERENCE TO RELATED APPLICATIONS

This application is a continuation application of U.S. patent application Ser. No. 17/342,900, filed on Jun. 9, 2021, which is a continuation of International Patent Application No. PCT/CN2020/070119, filed on Jan. 2, 2020, which claims the priority to and benefits of International Patent Application No. PCT/CN2019/070058, filed on Jan. 2, 2019. All the aforementioned patent applications are hereby incorporated by reference in their entireties.

TECHNICAL FIELD

This patent document relates to video coding techniques, devices, and systems.

BACKGROUND

Motion compensation (MC) is a technique in video processing to predict a frame in a video, given the previous and/or future frames by accounting for motion of the camera and/or objects in the video. Motion compensation can be used in the encoding of video data for video compression.

SUMMARY

This document discloses methods, systems, and devices related to sub-block based motion prediction in video motion compensation.

In one representative aspect, a method for video processing is disclosed. The method includes deriving one or more motion vectors for a first set of sub-blocks belonging to a first dividing pattern of a current video block of a video; and performing, based on the one or more motion vectors, a conversion between the current video block and a coded representation of the video.

In another representative aspect, a method for video processing is disclosed. The method includes dividing a video block of a first color component to obtain a first set sub-blocks of the first color component; dividing a corresponding video block of a second color component to obtain a second set of sub-blocks of a second color component; deriving one or more motion vectors of the first set of sub-blocks based on one or more motion vectors of the second set of sub-blocks; and performing, based on the one or more motion vectors of the first set and second set of sub-blocks, a conversion between the video block and a coded representation of the video.

In another representative aspect, a method for video processing is disclosed. The method includes dividing, for a conversion between a current video block of a video and a bitstream representation of the video, the current video block into partitions according to multiple dividing patterns according to a height (H) or a width (W) of the current video block; and performing the conversion using an interweaved prediction of the multiple partitions.

In another representative aspect, a method for video processing is disclosed. The method includes determining to apply a prediction for a current video block of a video, the prediction including dividing the current video block into sub-blocks according to a dividing pattern; determining to apply a bit-shifting to generate a prediction block on the sub-blocks of the current video block; and performing a conversion between the current video block and a coded representation of the video.

In another representative aspect, a method for video processing is disclosed. The method includes determining, based on a characteristic of a current video block of a video, whether to use an interweaved prediction tool for a conversion between the current block and a coded representation of the video; and performing the conversion according to the determining, wherein, upon the determining that the characteristic of the current video block fails to meet a condition, the conversion is performed by disabling a use of an affine prediction tool and/or the interweaved prediction tool.

In another representative aspect, a method for video processing is disclosed. The method includes determining, based on a characteristic of a current video block of a video, whether to use an interweaved prediction tool for a conversion between the current block and a coded representation of the video; and performing the conversion according to the determining, and wherein, upon the determining that the characteristic of the current video block meets a condition, the conversion is performed by using an affine prediction tool and/or the interweaved prediction tool.

In another representative aspect, a method for video processing is disclosed. The method includes determining that interweaved prediction is to be applied for a current video block of a video; disabling bi-prediction for the current video block based on the determination that interweaved prediction is to be applied; and performing a conversion between the current video block and a coded representation of the video.

In another representative aspect, a method for video processing is disclosed. The method includes: determining, for a conversion between a current video block of a video and a coded representation of the video, a refined motion information for the current video block; and performing the conversion using the refined motion information, wherein the refined motion information is generated based on an interweaved prediction tool in which motion information of partitions of the current video block that are generated using multiple patterns, and wherein the refined motion information of the current video block is used for a subsequent processing or selectively stored based on whether a condition is satisfied.

In another representative aspect, a method for video processing is disclosed. The method includes: determining whether an interweaved prediction is applied to a current video block of a video; determining to use a filter process to the current video block based on a determination whether the interweaved prediction is applied to the current video block; and performing a conversion between the current video block and a coded representation of the video based on the determining on a use of the filter process.

In another representative aspect, a method for video processing is disclosed. The method includes: determining whether an interweaved prediction is applied to a current video block of a video; determining whether to use a local illumination compensation or a weighted prediction to the current video block based on a determination of a use of the interweaved prediction; and performing a conversion between the current video block and a coded representation of the video based on the determining on a use of the local illumination compensation or the weighted prediction.

In another representative aspect, a method for video processing is disclosed. The method includes: determining that weighted prediction is applied to a current video block of a video or a sub-block of the current video block; and performing a conversion between the current video block and a coded representation of the video by disabling a bi-directional optical flow (BDOF) technique.

In another representative aspect, an apparatus comprising a processor and a non-transitory memory with instructions thereon is disclosed. The instructions, upon execution by the processor, cause the processor to select a set of pixels from a video frame to form a block, partition the block into a first set of sub-blocks according to a first pattern, generate a first intermediate prediction block based on the first set of sub-blocks, partition the block into a second set of sub-blocks according to a second pattern, wherein at least one sub-block in the second set has a different size than a sub-block in the first set, generate a second intermediate prediction block based on the second set of sub-blocks, and determine a prediction block based on the first intermediate prediction block and the second intermediate prediction block.

In yet another representative aspect, a method for video processing includes deriving one or more motion vectors for a first set of sub-blocks of a current video block, wherein each of the first set of sub-blocks has a first dividing pattern, and reconstructing, based on the one or more motion vectors, the current video block.

In yet another representative aspect, the various techniques described herein may be embodied as a computer program product stored on a non-transitory computer readable media. The computer program product includes program code for carrying out the methods described herein.

In yet another representative aspect, a video decoder apparatus may implement a method as described herein.

The details of one or more implementations are set forth in the accompanying attachments, the drawings, and the description below. Other features will be apparent from the description and drawings, and from the claims.

BRIEF DESCRIPTION OF THE DRAWINGS

FIGS. 16A-16C show example embodiments of deriving MVs for one dividing pattern from another diving pattern.

FIGS. 17A-17C show example embodiments of choosing dividing patterns based on dimensions of a current video block.

FIGS. 22A to 22D are example flowcharts of methods for video processing based on some other implementations of the disclosed technology.

DETAILED DESCRIPTION

Global motion compensation is one of variations of motion compensation techniques and can be used for predicting camera's motion. However, moving objects within a frame are not sufficiently represented by various implementations of the global motion compensation. Local motion estimation, such as block motion compensation, in which the frames are partitioned in blocks of pixels for performing the motion prediction, can be used to account for the objects moving within the frames.

Figure 1:
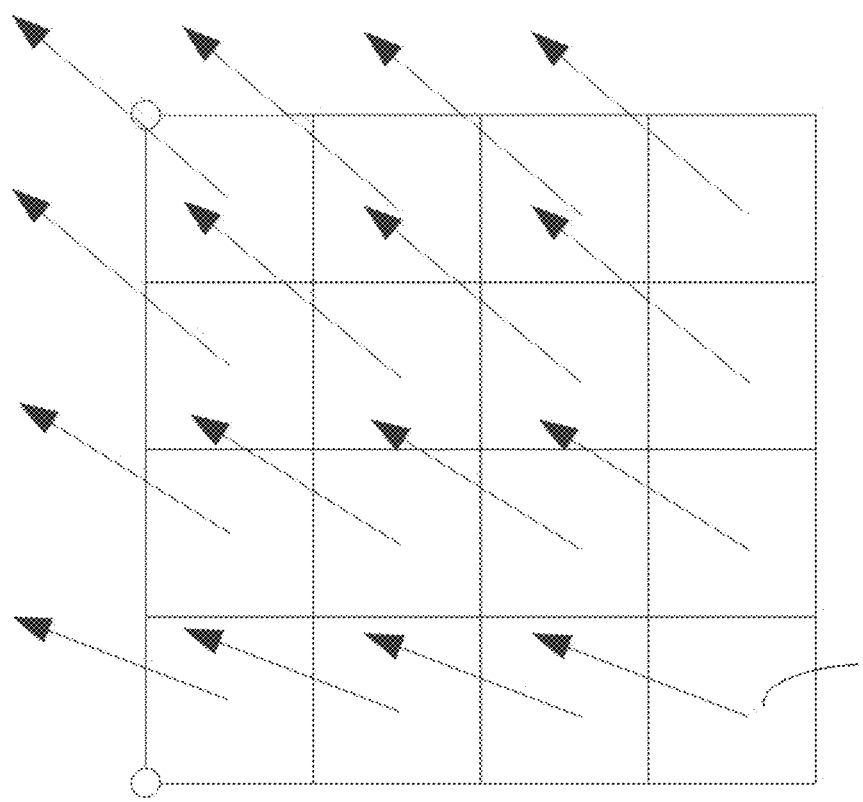
FIG. 1 is a schematic diagram showing an example of sub-block based prediction.
Figure 1:
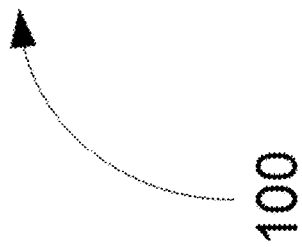

Sub-block based prediction, which was developed based on the block motion compensation, was first introduced into the video coding standard by High Efficiency Video Coding (HEVC) Annex I (3D-HEVC). FIG. 1 is a schematic diagram showing an example of sub-block based prediction.

With sub-block based prediction, a block 100, such as a Coding Unit (CU) or a Prediction Unit (PU), is divided into several non-overlapped sub-blocks 101. Different sub-blocks may be assigned different motion information, such as reference index or Motion Vector (MV). Motion compensation is then performed individually for each sub-block.

To explore the future video coding technologies beyond HEVC, Joint Video Exploration Team (JVET) was founded jointly by the Video Coding Expert Group (VCEG) and the Moving Picture Expert Group (MPEG) in 2015. Many methods have been adopted by JVET and added into the reference software named Joint Exploration Model (JEM). In JEM, sub-block based prediction is adopted in several coding techniques, such as affine prediction, Alternative temporal motion vector prediction (ATMVP), spatial-temporal motion vector prediction (STMVP), Bi-directional Optical flow (BIO), and Frame-Rate Up Conversion (FRUC), which are discussed in detail below.

Affine Prediction

Figure 2:
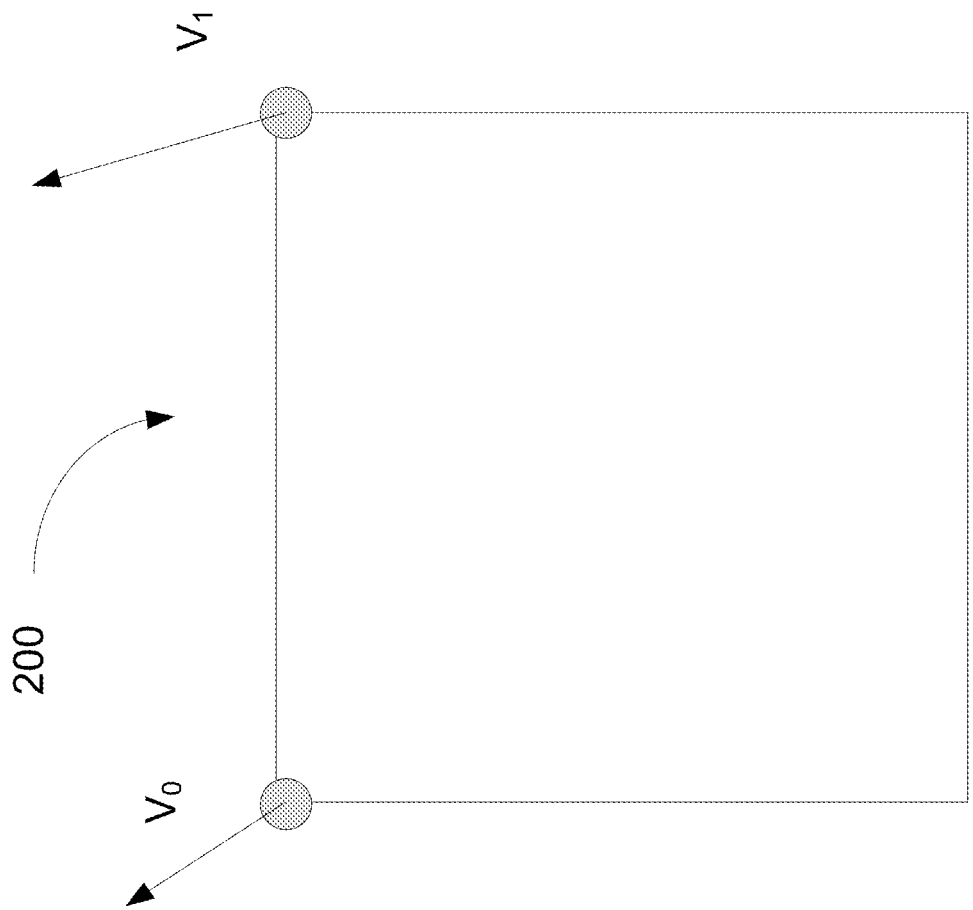
FIG. 2 shows an example of an affine motion field of a block described by two control point motion vectors.

In HEVC, only translation motion model is applied for motion compensation prediction (MCP). However, the camera and objects may have many kinds of motion, e.g. zoom in/out, rotation, perspective motions, and/or other irregular motions. JEM, on the other hand, applies a simplified affine transform motion compensation prediction. FIG. 2 shows an example of an affine motion field of a block 200 described by two control point motion vectors $V_0$ and $V_1$. The motion vector field (MVF) of the block 200 can be described by the following equation:

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} - v_{0x})}{w} y + v_{0y} \end{cases} \quad \text{Eq. (1)}$$

As shown in FIG. 2, $(v_{0x}, v_{0y})$ is motion vector of the top-left corner control point, and $(v_{1x}, v_{1y})$ is motion vector of the top-right corner control point. To simplify the motion compensation prediction, sub-block based affine transform prediction can be applied. The sub-block size M×N is derived as follows:

$$\begin{cases} M = clip3\left(4, w, \frac{w \times MvPre}{\max(abs(v_{1x} - v_{0x}), abs(v_{1y} - v_{0y}))}\right) \\ N = clip3\left(4, h, \frac{h \times MvPre}{\max(abs(v_{2x} - v_{0x}), abs(v_{2y} - v_{0y}))}\right) \end{cases} \quad \text{Eq. (2)}$$

Here, MvPre is the motion vector fraction accuracy (e.g., 1/16 in JEM). $(v_{2x}, v_{2y})$ is motion vector of the bottom-left control point, calculated according to Eq. (1). M and N can be adjusted downward if necessary to make it a divisor of w and h, respectively.

Figure 3:
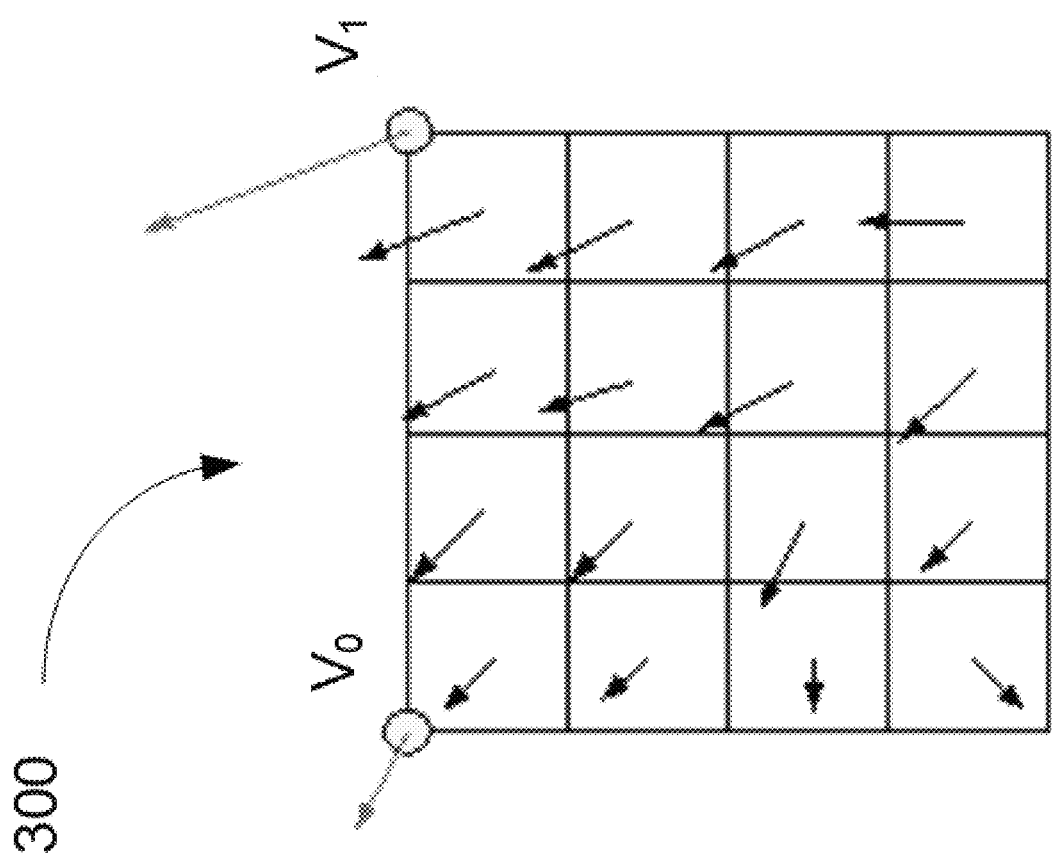
FIG. 3 shows an example of affine motion vector field per sub-block for a block.

FIG. 3 shows an example of affine MVF per sub-block for a block 300. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

Figure 4:
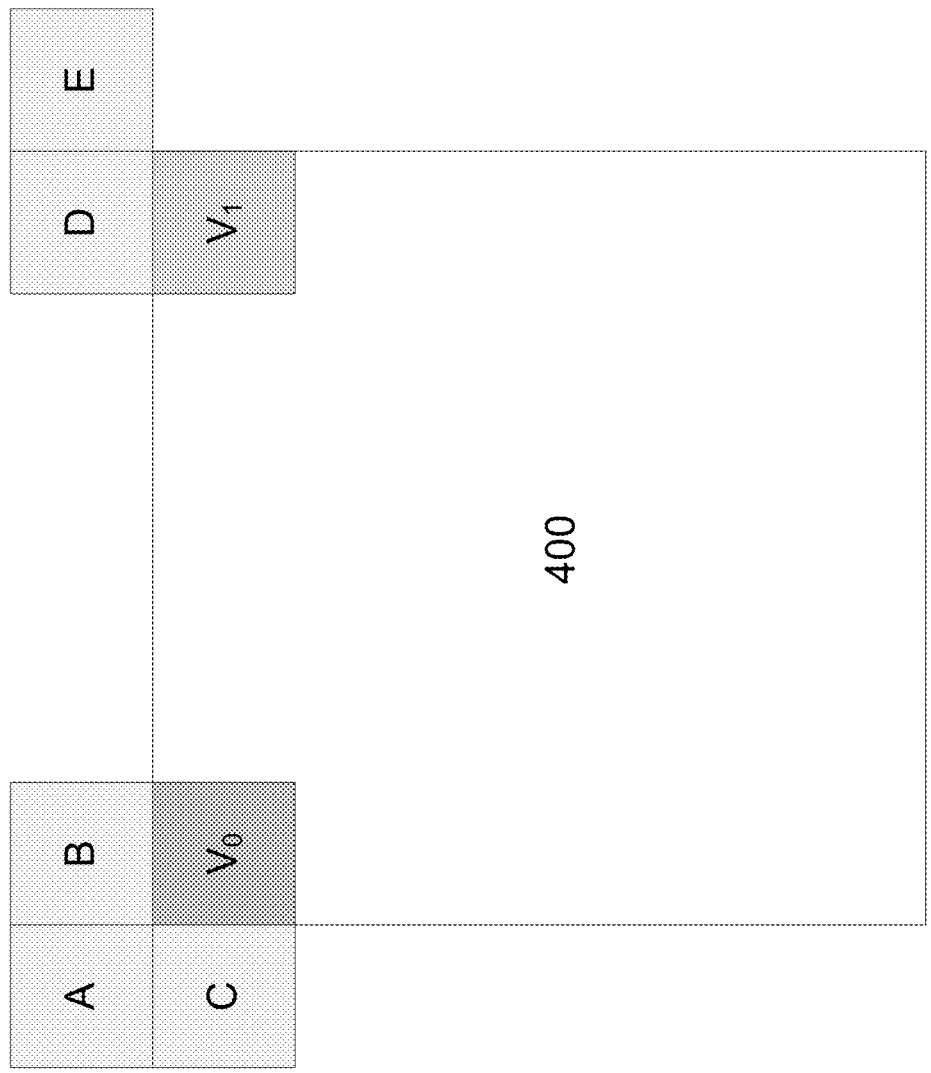
FIG. 4 shows an example of motion vector prediction for a block 400 in the AF_INTER mode.

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1 | v_0 = \{v_A, v_B, v_V\}, v_1 = \{v_D, v_E\}\}$ is constructed using the neighboring blocks. FIG. 4 shows an example of motion vector prediction (MVP) for a block 400 in the AF_INTER mode. As shown in FIG. 4, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the AMVP candidates. When the candidate list is larger than 2, the candidates can be firstly sorted according to the neighboring motion vectors (e.g., based on the similarity of the two motion vectors in a pair candidate). In some implementations, the first two candidates are kept. In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

Figures 5A, 5B:
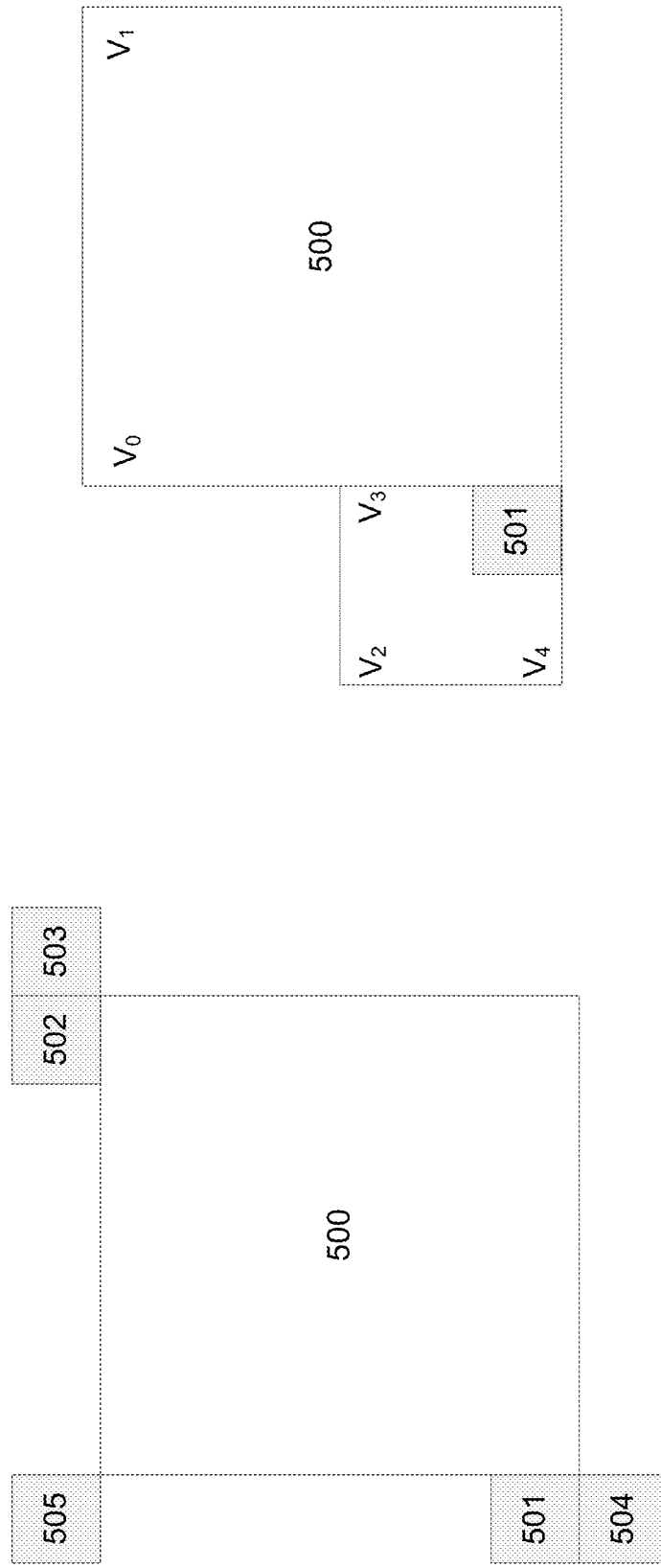
FIG. 5A shows an example of the selection order of candidate blocks for a current Coding Unit (CU).
FIG. 5B shows another example of candidate blocks for a current CU in the AF_MERGE mode.

When a CU is applied in AF_MERGE mode, it gets the first block coded with an affine mode from the valid neighboring reconstructed blocks. FIG. 5A shows an example of the selection order of candidate blocks for a current CU 500. As shown in FIG. 5A, the selection order can be from left (501), above (502), above right (503), left bottom (504) to above left (505) of the current CU 500. FIG. 5B shows another example of candidate blocks for a current CU 500 in the AF_MERGE mode. If the neighboring left bottom block 501 is coded in affine mode, as shown in FIG. 5B, the motion vectors $v_2$, $v_3$ and $v_4$ of the top left corner, above right corner, and left bottom corner of the CU containing the sub-block 501 are derived. The motion vector $v_0$ of the top left corner on the current CU 500 is calculated based on v2, v3 and v4. The motion vector v1 of the above right of the current CU can be calculated accordingly.

After the CPMV of the current CU v0 and v1 are computed according to the affine motion model in Eq. (1), the MVF of the current CU can be generated. In order to identify whether the current CU is coded with AF_MERGE mode, an affine flag can be signaled in the bitstream when there is at least one neighboring block is coded in affine mode.

Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 6:
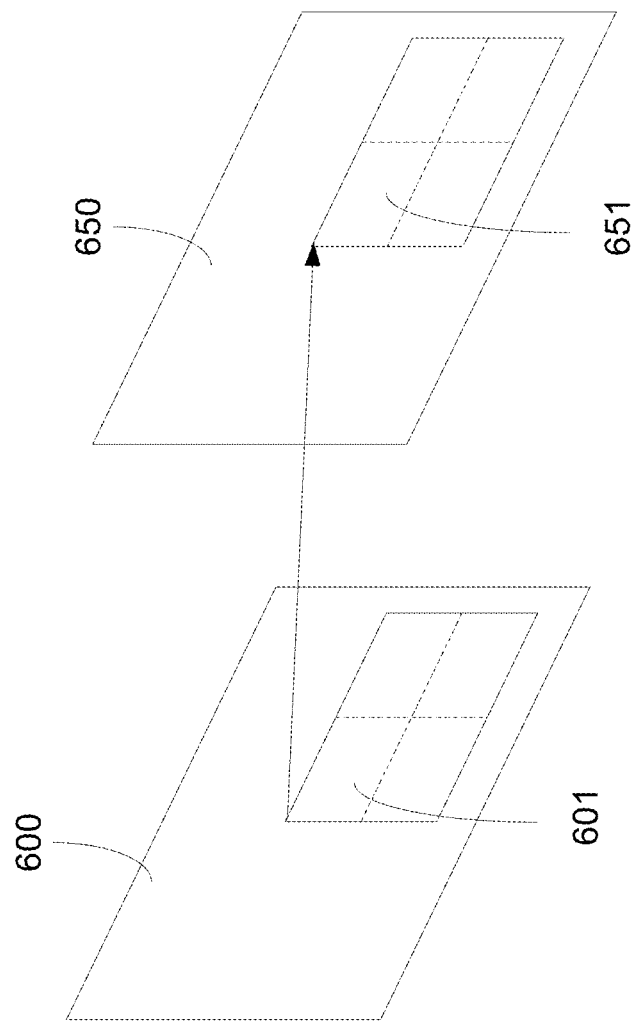
FIG. 6 shows an example of Alternative Temporal Motion Vector Prediction (ATMVP) motion prediction process for a CU.
Figure 6:
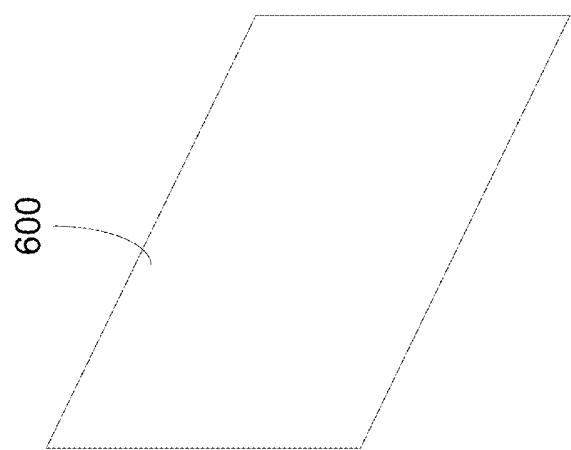

FIG. 6 shows an example of ATMVP motion prediction process for a CU 600. The ATMVP method predicts the motion vectors of the sub-CUs 601 within a CU 600 in two steps. The first step is to identify the corresponding block 651 in a reference picture 650 with a temporal vector. The reference picture 650 is also referred to as the motion source picture. The second step is to split the current CU 600 into sub-CUs 601 and obtain the motion vectors as well as the reference indices of each sub-CU from the block corresponding to each sub-CU.

In the first step, a reference picture 650 and the corresponding block is determined by the motion information of the spatial neighboring blocks of the current CU 600. To avoid the repetitive scanning process of neighboring blocks, the first merge candidate in the merge candidate list of the current CU 600 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 651 is identified by the temporal vector in the motion source picture 650, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1-X) for each sub-CU.

Spatial Temporal Motion Vector Prediction (STMVP)

Figure 7:
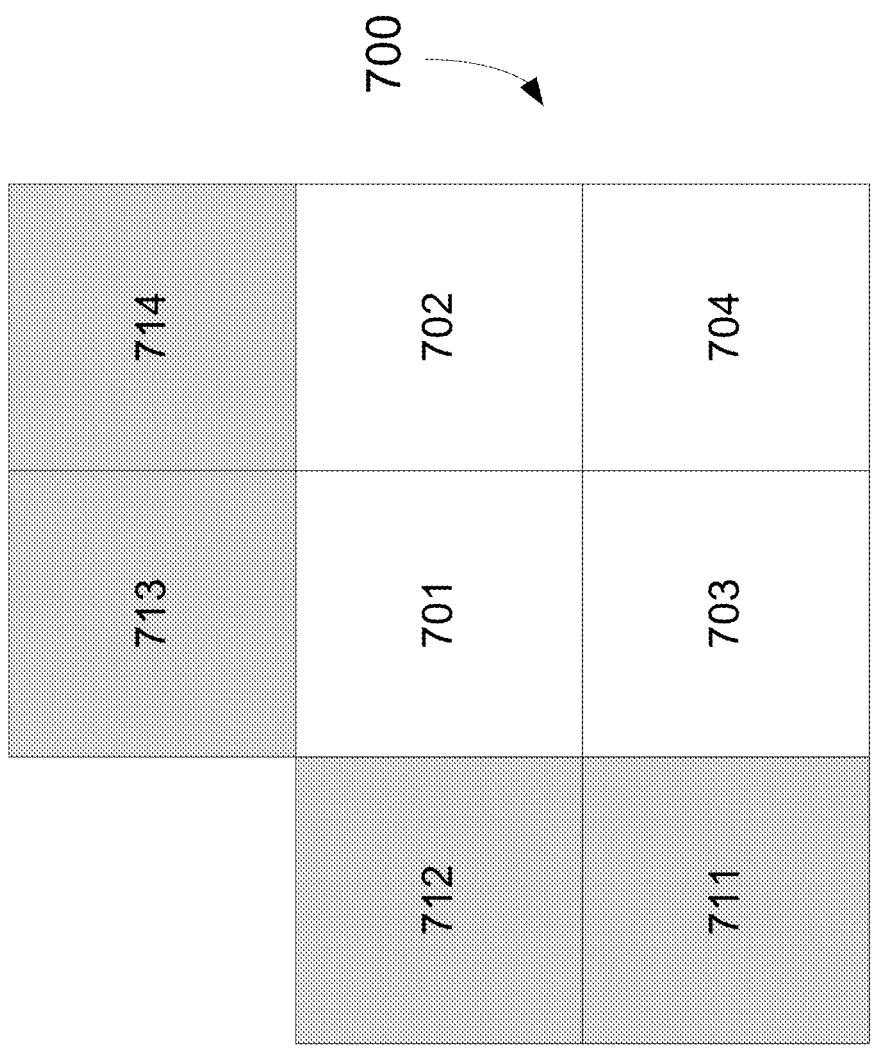
FIG. 7 shows an example of one CU with four sub-blocks and neighboring blocks.

In the STMVP method, the motion vectors of the sub-CUs are derived recursively, following raster scan order. FIG. 7 shows an example of one CU with four sub-blocks and neighboring blocks. Consider an 8×8 CU 700 that includes four 4×4 sub-CUs A (701), B (702), C (703), and D (704). The neighboring 4×4 blocks in the current frame are labelled as a (711), b (712), c (713), and d (714).

The motion derivation for sub-CU A starts by identifying its two spatial neighbors. The first neighbor is the N×N block above sub-CU A 701 (block c 713). If this block c (713) is not available or is intra coded the other N×N blocks above sub-CU A (701) are checked (from left to right, starting at block c 713). The second neighbor is a block to the left of the sub-CU A 701 (block b 712). If block b (712) is not available or is intra coded other blocks to the left of sub-CU A 701 are checked (from top to bottom, staring at block b 712). The motion information obtained from the neighboring blocks for each list is scaled to the first reference frame for a given list. Next, temporal motion vector predictor (TMVP) of sub-block A 701 is derived by following the same procedure of TMVP derivation as specified in HEVC. The motion information of the collocated block at block D 704 is fetched and scaled accordingly. Finally, after retrieving and scaling the motion information, all available motion vectors are averaged separately for each reference list. The averaged motion vector is assigned as the motion vector of the current sub-CU.

Bi-Directional Optical Flow (BIO)

The Bi-directional Optical flow (BIO) method is sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and $\partial I^{(k)}/\partial c$, $\partial^{(k)}/\partial y$ are horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \qquad \text{Eq. (3)}$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO} = \tfrac{1}{2} \cdot I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)) \qquad \text{Eq. (4)}$$

Figure 8:
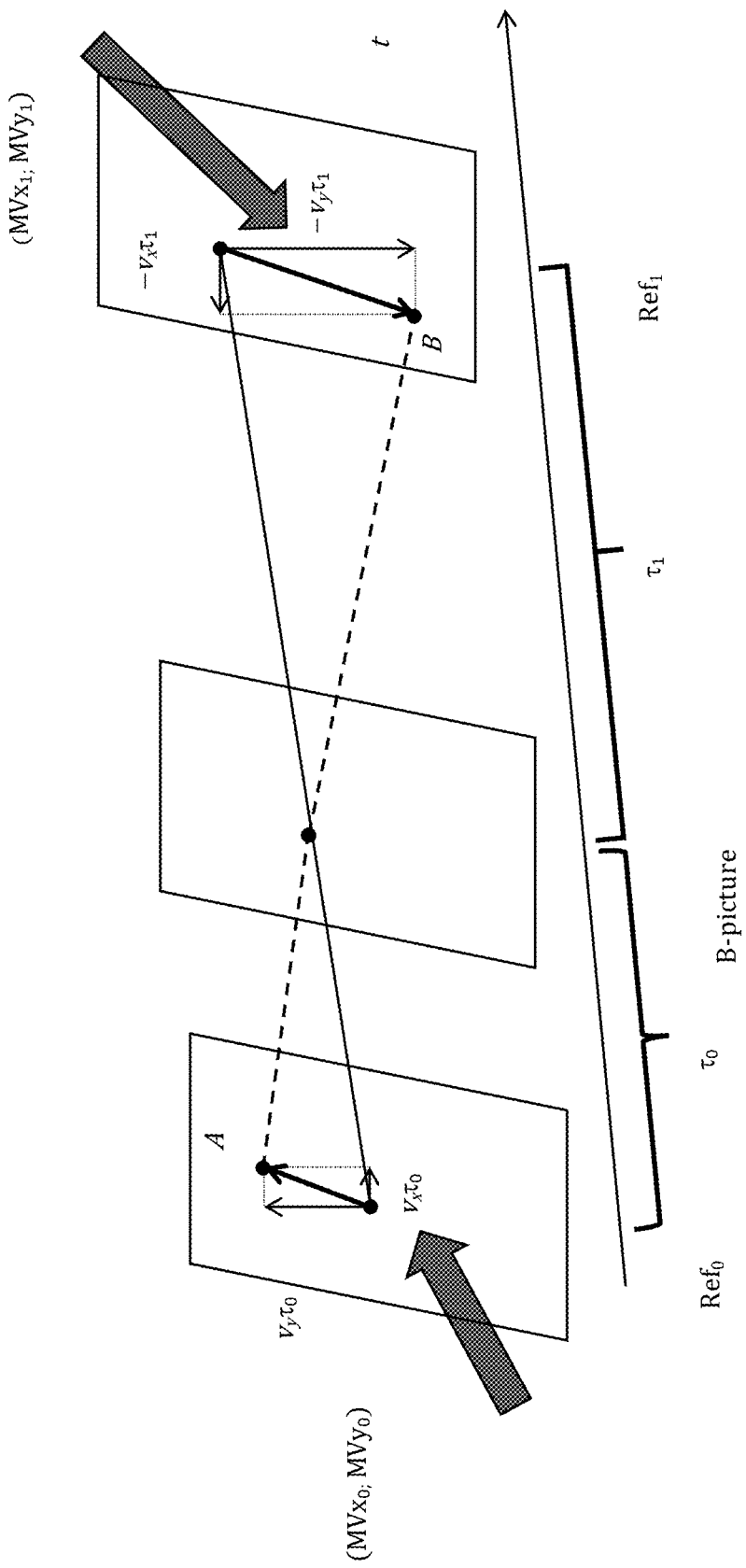
FIG. 8 shows an example optical flow trajectory in the Bi-directional Optical flow (BIO) method.

FIG. 8 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for $\text{Ref}_0$ and $\text{Ref}_1$: $\tau_0 = \text{POC(current)} - \text{POC}(\text{Ref}_0)$, $\tau_1 = \text{POC}(\text{Ref}_1) - \text{POC}(\text{current})$. If both predictions come from the same time direction (either both from the past or both from the future) then the signs are different (e.g., $\tau_0 \cdot \tau_1 < 0$). In this case, BIO is applied if the prediction is not from the same time moment (e.g., $\tau_0 \neq \tau_1$). Both referenced regions have non-zero motion (e.g., $MVx_0, MVy_0, MVx_1, MVy_0 \neq 0$) and the block motion vectors are proportional to the time distance (e.g., $MVx_0/MVx_0 = MXy_0/MXy_1 = -\tau_0/\tau_1$).

Figure 9B:
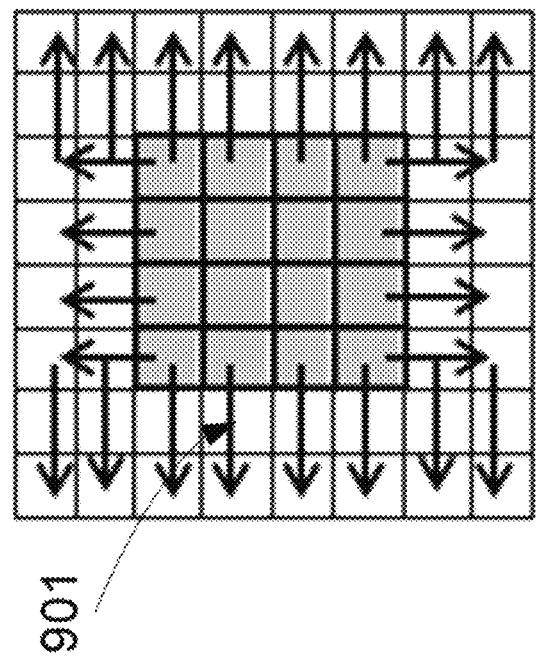
FIG. 9B shows that a padding area can used to avoid extra memory access and calculation.
Figure 9A:
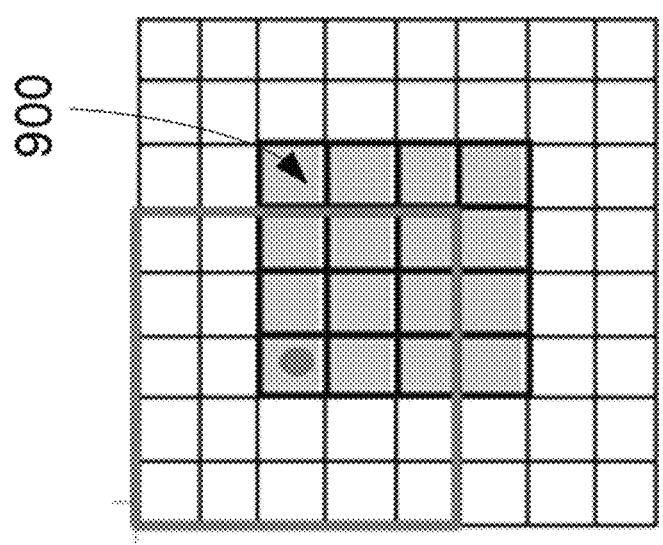
FIG. 9A shows an example of access positions outside of a block.

The motion vector field $(v_x, v_y)$ is determined by minimizing the difference A between values in points A and B. FIGS. 9A-9B show an example of intersection of motion trajectory and reference frame planes. Model uses only first linear term of a local Taylor expansion for $\Delta$:

$$\Delta = (I^{(0)} - I^{(1)}{}_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \qquad \text{Eq. (5)}$$

All values in the above equation depend on the sample location, denoted as (i',j'). Assuming the motion is consistent in the local surrounding area, $\Delta$ can be minimized inside the (2M+1)×(2M+1) square window $\Omega$ centered on the currently predicted point (i,j), where M is equal to 2:

$$(v_x, v_y) = \arg\min_{v_x, v_y} \sum_{[i',j'] \in \Omega} \Delta^2[i', j'] \qquad \text{Eq. (6)}$$

For this optimization problem, the JEM uses a simplified approach making first a minimization in the vertical direction and then in the horizontal direction. This results in the following:

$$v_x = (s_1 + r) > m ? \ clip3\left(-thBIO, thBIO, -\frac{s_3}{(s_1+r)}\right) : 0 \qquad \text{Eq. (7)}$$

$$v_y = (s_5 + r) > m ? \ clip3\left(-thBIO, thBIO, -\frac{s_6 - v_x s_2/2}{(s_5+r)}\right) : 0 \qquad \text{Eq. (8)}$$

where, $$s_1 = \sum_{[i',j'] \in \Omega} \left(\tau_1 \partial I^{(1)}/\partial x + \tau_0 \partial I^{(0)}/\partial x\right)^2; \qquad \text{Eq. (9)}$$

$$s_3 = \sum_{[i',j'] \in \Omega} \left(I^{(1)} - I^{(0)}\right)\left(\tau_1 \partial I^{(1)}/\partial x + \tau_0 \partial I^{(0)}/\partial x\right);$$

$$s_2 = \sum_{[i',j'] \in \Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

-continued $$s_5 = \sum_{[i',j]\in\Omega} \left(\tau_1 \partial I^{(1)}/\partial y + \tau_0 \partial I^{(0)}/\partial y\right)^2;$$

$$s_6 = \sum_{[i',j]\in\Omega} \left(I^{(1)} - I^{(0)}\right)\left(\tau_1 \partial I^{(1)}/\partial y + \tau_0 \partial I^{(0)}/\partial y\right)$$

In order to avoid division by zero or a very small value, regularization parameters r and m can be introduced in Eq. (7) and Eq. (8).

$$r = 500 \cdot 4^{d-8} \quad \text{Eq. (10)}$$

$$m = 700 \cdot 4^{d-8} \quad \text{Eq. (11)}$$

Here, d is bit depth of the video samples.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated for positions inside the current block. FIG. 9A shows an example of access positions outside of a block 900. As shown in FIG. 9A, in Eq. (9), (2M+1)×(2M+1) square window $\Omega$ centered in currently predicted point on a boundary of predicted block needs to accesses positions outside of the block. In the JEM, values of $I^{(k)}$, $\partial I^{(k)}/\partial x$, $\partial I^{(k)}/\partial y$ outside of the block are set to be equal to the nearest available value inside the block. For example, this can be implemented as a padding area 901, as shown in FIG. 9B.

With BIO, it is possible that the motion field can be refined for each sample. To reduce the computational complexity, a block-based design of BIO is used in the JEM. The motion refinement can be calculated based on a 4×4 block. In the block-based BIO, the values of $s_n$ in Eq. (9) of all samples in a 4×4 block can be aggregated, and then the aggregated values of $s_n$ in are used to derived BIO motion vectors offset forthe 4×4 block. More specifically, the following formula can used for block-based BIO derivation:

$$s_{1,b_k} = \sum_{(x,y)\in b_k} \sum_{[i',j]\in\Omega(x,y)} \left(\tau_1 \partial I^{(1)}/\partial x + \tau_0 \partial I^{(0)}/\partial x\right)^2; \quad \text{Eq. (12)}$$

$$s_{3,b_k} = \sum_{(x,y)\in b_k} \sum_{[i',j]\in\Omega} \left(I^{(1)} - I^{(0)}\right)\left(\tau_1 \partial I^{(1)}/\partial x + \tau_0 \partial I^{(0)}/\partial x\right);$$

$$s_{2,b_k} = \sum_{(x,y)\in b_k} \sum_{[i',j]\in\Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_{5,b_k} = \sum_{(x,y)\in b_k} \sum_{[i',j]\in\Omega} \left(\tau_1 \partial I^{(1)}/\partial y + \tau_0 \partial I^{(0)}/\partial y\right)^2;$$

$$s_{6,b_k} = \sum_{(x,y)\in b_k} \sum_{[i',j]\in\Omega} \left(I^{(1)} - I^{(0)}\right)\left(\tau_1 \partial I^{(1)}/\partial y + \tau_0 \partial I^{(0)}/\partial y\right)$$

Here, $b_k$ denotes the set of samples belonging to the k-th 4×4 block of the predicted block. $s_n$ in Eq (7) and Eq (8) are replaced by $((s_n,b_k)>>4)$ to derive the associated motion vector offsets.

In some scenarios, MV regiment of BIO may be unreliable due to noise or irregular motion. Therefore, in BIO, the magnitude of MV regiment is clipped to a threshold value. The threshold value is determined based on whether the reference pictures of the current picture are all from one direction. For example, if all the reference pictures of the current picture are from one direction, the value of the threshold is set to $12\times2^{14-d}$; otherwise, it is set to $12\times2^{13-d}$.

Gradients for BIO can be calculated at the same time with motion compensation interpolation using operations consistent with HEVC motion compensation process (e.g., 2D separable Finite Impulse Response (FIR)). In some embodiments, the input for the 2D separable FIR is the same reference frame sample as for motion compensation process and fractional position (fracX,fracY) according to the fractional part of block motion vector. For horizontal gradient $\partial I/\partial x$, a signal is first interpolated vertically using BIOfilterS corresponding to the fractional position fracY with de-scaling shift d−8. Gradient filter BIOfilterG is then applied in horizontal direction corresponding to the fractional position fracX with de-scaling shift by 18−d. For vertical gradient $\partial I/\partial y$, a gradient filter is applied vertically usingBIO-filterG corresponding to the fractional position fracY with de-scaling shift d−8. The signal displacement is then performed using BIOfilterS in horizontal direction corresponding to the fractional position fracX with de-scaling shift by 18−d. The length of interpolation filter for gradients calculation BIOfilterG and signal displacement BIOfilterF can be shorter (e.g., 6-tap) in order to maintain reasonable complexity. Table 1 shows example filters that can be used for gradients calculation of different fractional positions of block motion vector in BIO. Table 2 shows example interpolation filters that can be used for prediction signal generation in BIO.

TABLE 1

Example filters for gradient calculation in BIO

| Fractional pel position | Interpolation filter for gradient (BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Example interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIG can be applied to all bi-predicted blocks when the two predictions are from different reference pictures. When Local Illumination Compensation (LIC) is enabled for a CU, BIG can be disabled.

In some embodiments, OBMC is applied for a block after normal MC process. To reduce the computational complexity, BIG may not be applied during the OBMC process. This means that BIG is applied in the MC process for a block when using its own MV and is not applied in the MC process when the MV of a neighboring block is used during the GBMC process.

Frame-Rate Up Conversion (FRUC)

A FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\}$$ Eq. (13)

Figure 10:
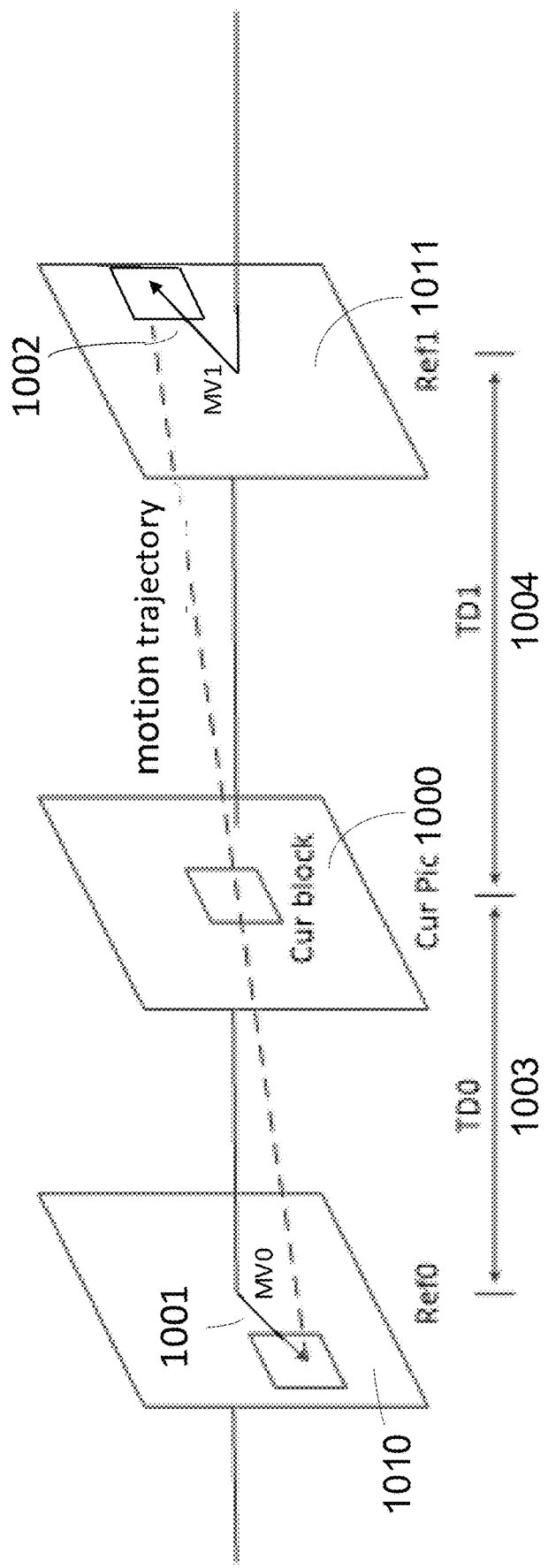
FIG. 10 shows an example of bilateral matching used in the Frame-Rate Up Conversion (FRUC) method.

FIG. 10 shows an example of bilateral matching used in the Frame-Rate Up Conversion (FRUC) method. The bilateral matching is used to derive motion information of the current CU by finding the closest match between two blocks along the motion trajectory of the current CU (1000) in two different reference pictures (1010, 1011). Under the assumption of continuous motion trajectory, the motion vectors MV0 (1001) and MV1 (1002) pointing to the two reference blocks are proportional to the temporal distances, e.g., TD0 (1003) and TD1 (1004), between the current picture and the two reference pictures. In some embodiments, when the current picture 1000 is temporally between the two reference pictures (1010, 1011) and the temporal distance from the current picture to the two reference pictures is the same, the bilateral matching becomes mirror based bi-directional MV.

Figure 11:
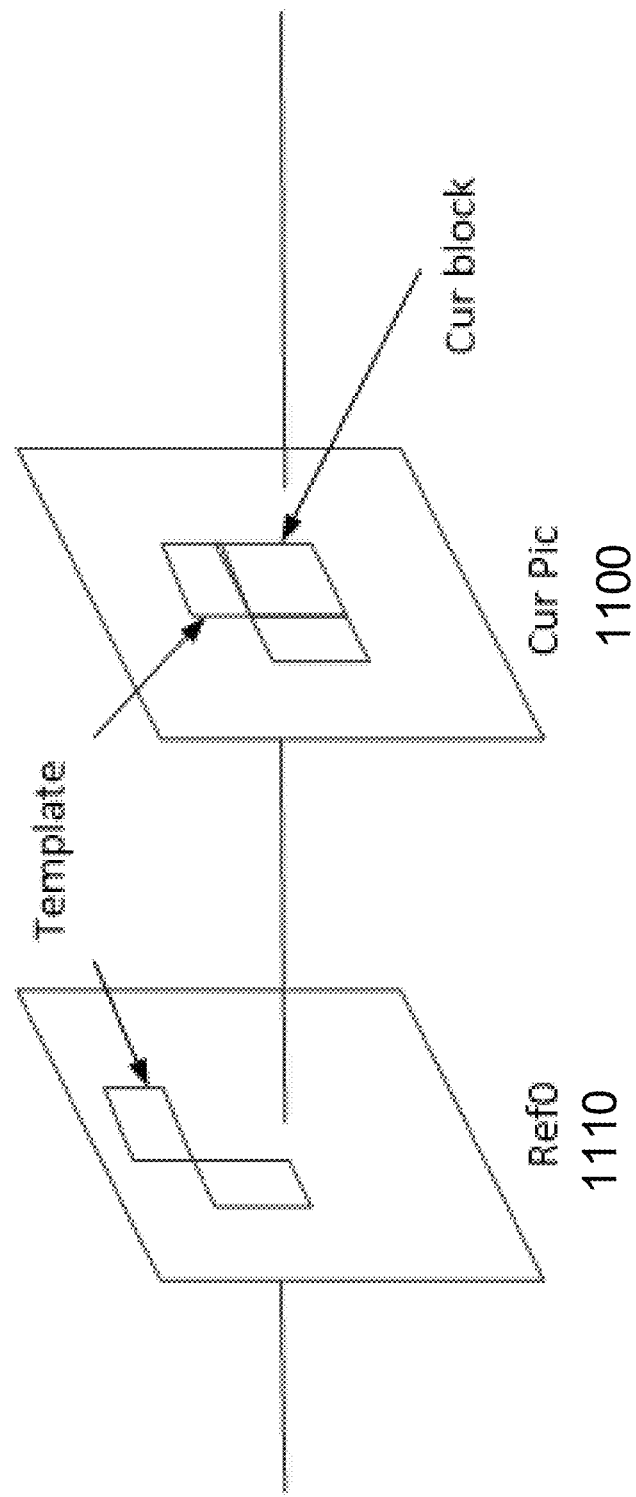
FIG. 11 shows an example of template matching used in the FRUC method.

FIG. 11 shows an example of template matching used in the FRUC method.

Template matching can be used to derive motion information of the current CU 1100 by finding the closest match between a template (e.g., top and/or left neighboring blocks of the current CU) in the current picture and a block (e.g., same size to the template) in a reference picture 1110. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and top and left neighboring motion vectors.

When using bilateral matching, each valid MV of a merge candidate can be used as an input to generate a MV pair with the assumption of bilateral matching. For example, one valid MV of a merge candidate is (MVa, $\text{ref}_a$) at reference list A. Then the reference picture $\text{ref}_b$ of its paired bilateral MV is found in the other reference list B so that $\text{ref}_a$ and $\text{ref}_b$ are temporally at different sides of the current picture. If such a $\text{ref}_b$ is not available in reference list B, $\text{ref}_b$ is determined as a reference which is different from $\text{ref}_a$ and its temporal distance to the current picture is the minimal one in list B. After $\text{ref}_b$ is determined, MVb is derived by scaling MVa based on the temporal distance between the current picture and $\text{ref}_a$, $\text{ref}_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of Interpolated MV Field

Before coding a frame, interpolated motion field is generated for the whole picture based on unilateral ME. Then the motion field may be used later as CU level or sub-CU level MV candidates.

Figure 12:
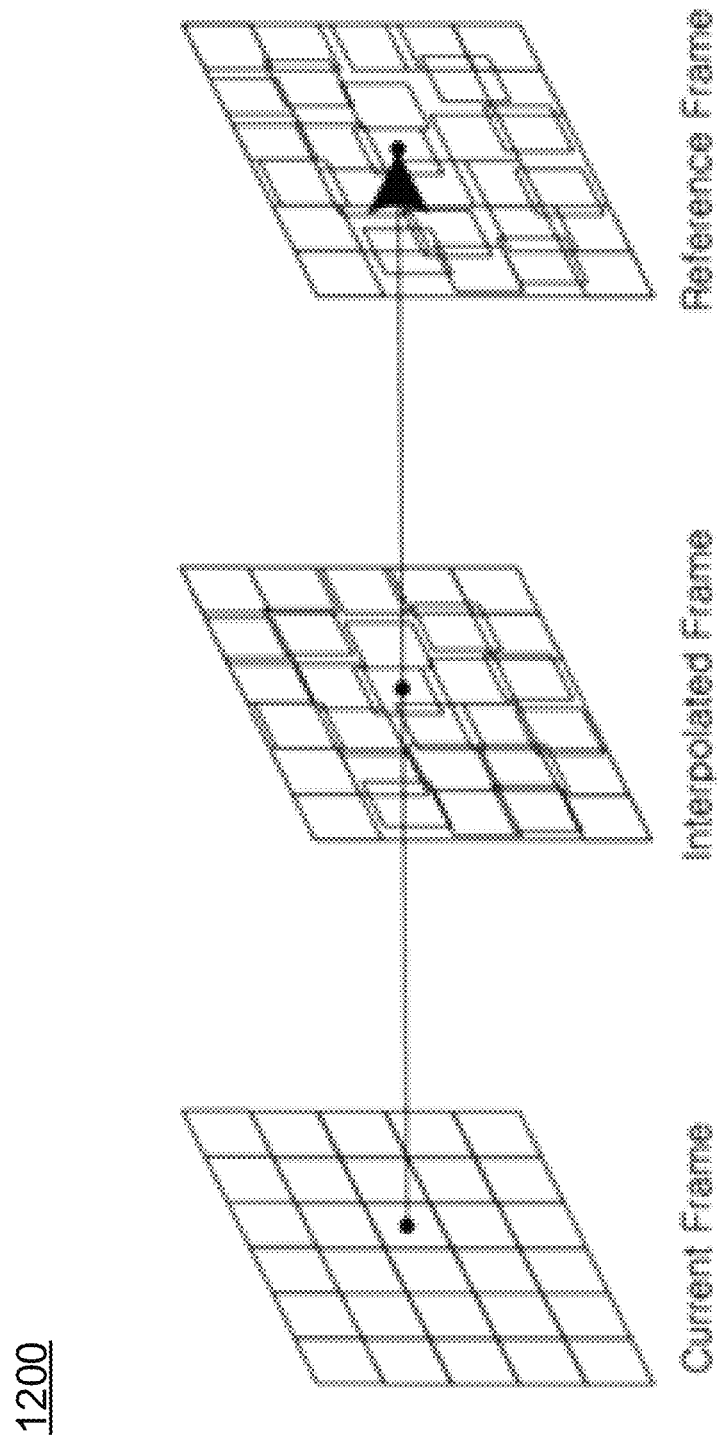
FIG. 12 shows an example of unilateral Motion Estimation (ME) in the FRUC method.

In some embodiments, the motion field of each reference pictures in both reference lists is traversed at 4×4 block level. FIG. 12 shows an example of unilateral Motion Estimation (ME) 1200 in the FRUC method. For each 4×4 block, if the motion associated to the block passing through a 4×4 block in the current picture and the block has no tbeen assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and Matching Cost

When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad \text{Eq. (14)}$$

Here, w is a weighting factor. In some embodiments, w can be empirically set to 4. MV and $MV^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

If costBi<=factor*min (cost0, cost1)
bi-prediction is used;
Otherwise, if cost0<=cost1
uni-prediction from list0 is used;
Otherwise,
uni-prediction from list1 is used;

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

Deblocking Process in VVC 8.6.2 Deblocking Filter Process 8.6.2.1 General

Inputs to this process are the reconstructed picture prior to deblocking, i.e., the array recPictureL and, when ChromaArrayType is not equal to 0, the arrays recPictureCb and recPictureCr.

Outputs of this process are the modified reconstructed picture after deblocking, i.e., the array recPictureL and, when ChromaArrayType is not equal to 0, the arrays recPictureCb and recPictureCr.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

NOTE—Although the filtering process is specified on a picture basis in this Specification, the filtering process can be implemented on a coding unit basis with an equivalent result, provided the decoder properly accounts for the processing dependency order so as to produce the same output values.

The deblocking filter process is applied to all coding subblock edges and transform block edges of a picture, except the following types of edges:
Edges that are at the boundary of the picture,
Edges that coincide with tile boundaries when loop_filter_across_tiles_enabled_flag is equal to 0,
Edges that coincide with upper or left boundaries of tile groups with tile_group_loop_filter_across_tile_groups_enabled_flag equal to 0 or tile_group_deblocking_filter_disabled flag equal to 1,
Edges within tile groups with tile_group_deblocking_filter_disabled_flag equal to 1,
Edges that do not correspond to 8×8 sample grid boundaries of the considered component,
Edges within chroma components for which both sides of the edge use inter prediction,
Edges of chroma transform blocks that are not edges of the associated transform unit.

[Ed. (BB): Adapt Syntax Once Tiles are Integrated.]

The edge type, vertical or horizontal, is represented by the variable edgeType as specified in Table 8 17.

TABLE 8 17

| Name of association to edgeType | |
| --- | --- |
| edgeType | Name of edgeType |
| 0 (vertical edge) | EDGE_VER |
| 1 (horizontal edge) | EDGE_HOR |

When tile_group_deblocking_filter_disabled flag of the current tile group is equal to 0, the following applies:
The variable treeType is derived as follows:
If tile_group_type is equal to I and qtbtt_dual_tree_intra_flag is equal to 1, treeType is set equal to DUAL_TREE_LUMA.
Otherwise, treeType is set equal to SINGLE_TREE.
The vertical edges are filtered by invoking the deblocking filter process for one direction as specified in clause 8.6.2.2 with the variable treeType, the reconstructed picture prior to deblocking, i.e., the array recPictureL and, when ChromaArrayType is not equal to 0 or treeType is equal to SINGLE_TREE, the arrays recPictureCb and recPictureCr, and the variable edgeType set equal to EDGE_VER as inputs, and the modified reconstructed picture after deblocking, i.e., the array recPictureL and, when ChromaArrayType is not equal to 0 or treeType is equal to SINGLE_TREE, the arrays recPictureCb and recPictureCr as outputs.

The horizontal edge are filtered by invoking the deblocking filter process for one direction as specified in clause 8.6.2.2 with the variable treeType, the modified reconstructed picture after deblocking, i.e., the array recPictureL and, when ChromaArrayType is not equal to 0 or treeType is equal to SINGLE_TREE, the arrays recPictureCb and recPictureCr, and the variable edgeType set equal to EDGE_HOR as inputs, and the modified reconstructed picture after deblocking, i.e., the array recPictureL and, when ChromaArrayType is not equal to 0 or treeType is equal to SINGLE_TREE, the arrays recPictureCb and recPictureCr as outputs.

When tile_group_type is equal to I and qtbtt_dual_tree_intra_flag is equal to 1, the following applies:

The variable treeType is set equal to DUAL_TREE_CHROMA

The vertical edges are filtered by invoking the deblocking filter process for one direction as specified in clause 8.6.2.2 with the variable treeType, the reconstructed picture prior to deblocking, i.e., the arrays recPictureCb and recPictureCr, and the variable edgeType set equal to EDGE_VER as inputs, and the modified reconstructed picture after deblocking, i.e., the arrays recPictureCb and recPictureCr as outputs.

The horizontal edge are filtered by invoking the deblocking filter process for one direction as specified in clause 8.6.2.2 with the variable treeType, the modified reconstructed picture after deblocking, i.e., the arrays recPictureCb and recPictureCr, and the variable edgeType set equal to EDGE_HOR as inputs, and the modified reconstructed picture after deblocking, i.e., the arrays recPictureCb and recPictureCr as outputs.

8.6.2.2 Deblocking Filter Process for One Direction

Inputs to this process are:

the variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed, when treeType is equal to SINGLE_TREE or DUAL_TREE_LUMA, the reconstructed picture prior to deblocking, i.e., the array recPictureL, when ChromaArrayType is not equal to 0 and treeType is equal to SINGLE_TREE or DUAL_TREE_CHROMA, the arrays recPictureCb and recPictureCr, a variable edgeType specifying whether a vertical (EDGE_VER) or a horizontal (EDGE_HOR) edge is filtered.

Outputs of this process are the modified reconstructed picture after deblocking, i.e:

when treeType is equal to SINGLE_TREE or DUAL_TREE_LUMA, the array recPictureL, when ChromaArrayType is not equal to 0 and treeType is equal to SINGLE_TREE or DUAL_TREE_CHROMA, the arrays recPictureCb and recPictureCr.

For each coding unit with coding block width log 2CbW, coding block height log 2CbH and location of top-left sample of the coding block (xCb, yCb), when edgeType is equal to EDGE_VER and xCb % 8 is equal 0 or when edgeType is equal to EDGE_HOR and yCb % 8 is equal to 0, the edges are filtered by the following ordered steps:

1. The coding block width nCbW is set equal to 1<<log 2CbW and the coding block height nCbH is set equal to 1<<log 2CbH 2. The variable filterEdgeFlag is derived as follows:

If edgeType is equal to EDGE_VER and one or more of the following conditions are true, filterEdgeFlag is set equal to 0:

The left boundary of the current coding block is the left boundary of the picture.

The left boundary of the current coding block is the left boundary of the tile and loop_filter_across_tiles_enabled_flag is equal to 0.

The left boundary of the current coding block is the left boundary of the tile group and tile_group_loop_filter_across_tile_groups_enabled_flag is equal to 0.

Otherwise if edgeType is equal to EDGE_HOR and one or more of the following conditions are true, the variable filterEdgeFlag is set equal to 0:

The top boundary of the current luma coding block is the top boundary of the picture.

The top boundary of the current coding block is the top boundary of the tile and loop_filter_across_tiles_enabled_flag is equal to 0.

The top boundary of the current coding block is the top boundary of the tile group and tile_group_loop_filter_across_tile_groups_enabled_flag is equal to 0.

Otherwise, filterEdgeFlag is set equal to 1.

[Ed. (BB): Adapt syntax once tiles are integrated.]

3. All elements of the two-dimensional (nCbW)×(nCbH) array edgeFlags are initialized to be equal to zero.

4. The derivation process of transform block boundary specified in clause 8.6.2.3 is invoked with the location (xB0, yB0) set equal to (0, 0), the block width nTbW set equal to nCbW, the block height nTbH set equal to nCbH, the variable treeType, the variable filterEdgeFlag, the array edgeFlags, and the variable edgeType as inputs, and the modified array edgeFlags as output.

5. The derivation process of coding subblock boundary specified in clause 8.6.2.4 is invoked with the location (xCb, yCb), the coding block width nCbW, the coding block height nCbH, the array edgeFlags, and the variable edgeType as inputs, and the modified array edgeFlags as output.

6. The picture sample array recPicture is derived as follows:

If treeType is equal to SINGLE_TREE or DUAL_TREE_LUMA, recPicture is set equal to the reconstructed luma picture sample array prior to deblocking recPictureL.

Otherwise (treeType is equal to DUAL_TREE_CHROMA), recPicture is set equal to the reconstructed chroma picture sample array prior to deblocking recPictureCb.

7. The derivation process of the boundary filtering strength specified in clause 8.6.2.5 is invoked with the picture sample array recPicture, the luma location (xCb, yCb), the coding block width nCbW, the coding block height nCbH, the variable edgeType, and the array edgeFlags as inputs, and an (nCbW)×(nCbH) array verBs as output.

8. The edge filtering process is invoked as follows:

If edgeType is equal to EDGE_VER, the vertical edge filtering process for a coding unit as specified in clause 8.6.2.6.1 is invoked with the variable treeType, the reconstructed picture prior to deblocking, i.e., when treeType is equal to SINGLE_TREE or DUAL_TREE_LUMA, the array recPictureL and, when ChromaArrayType is not equal to 0 and treeType is equal to SINGLE_TREE or DUAL_TREE_CHROMA, the arrays recPictureCb and recPictureCr, the location (xCb, yCb), the coding block width nCbW, the coding block height nCbH, and the array verBs as inputs, and the modified reconstructed picture, i.e., when treeType is equal to SINGLE_TREE or DUAL_TREE_LUMA, the array recPictureL and, when ChromaArrayType is not equal to 0 and treeType is equal to SINGLE_TREE or DUAL_TREE_CHROMA, the arrays recPictureCb and recPictureCr, as output.

Otherwise if edgeType is equal to EDGE_HOR, the horizontal edge filtering process for a coding unit as specified in clause 8.6.2.6.2 is invoked with the variable treeType, the modified reconstructed picture prior to deblocking, i.e., when treeType is equal to SINGLE_TREE or DUAL_TREE_LUMA, the array recPictureL and, when ChromaArrayType is not equal to 0 and treeType is equal to SINGLE_TREE or DUAL_TREE_CHROMA, the arrays recPictureCb and recPictureCr, the location (xCb, yCb), the coding block width nCbW, the coding block height nCbH, and the array horBs as inputs and the modified reconstructed picture, i.e., when treeType is equal to SINGLE_TREE or DUAL_TREE_LUMA, the array recPictureL and, when ChromaArrayType is not equal to 0 and treeType is equal to SINGLE_TREE or DUAL_TREE_CHROMA, the arrays recPictureCb and recPictureCr, as output.

8.6.2.3 Derivation process of transform block boundary

Inputs to this process are:

a location (xB0, yB0) specifying the top-left sample of the current block relative to the top left sample of the current coding block, a variable nTbW specifying the width of the current block, a variable nTbH specifying the height of the current block, a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed, a variable filterEdgeFlag, a two-dimensional (nCbW)×(nCbH) array edgeFlags, a variable edgeType specifying whether a vertical (EDGE_VER) or a horizontal (EDGE_HOR) edge is filtered.

Output of this process is the modified two-dimensional (nCbW)×(nCbH) array edgeFlags.

The maximum transform block size maxTbSize is derived as follows:

maxTbSize=(treeType==DUAL_TREE_CHROMA)?
   MaxTbSize$Y$/2: MaxTbSize$Y$    (8 862)

Depending on maxTbSize, the following applies:

If nTbW is greater than maxTb Size or nTbH is greater than maxTb Size, the following ordered steps apply.

1. The variables newTbW and newTbH are derived as follows:

newTb$W$=(nTb$W$>maxTbSize)?(nTb$W$/2):nTb$W$    (8 863)

newTb$H$=(nTb$H$>maxTbSize)?(nTb$H$/2):nTb$H$    (8 864)

2. The derivation process of transform block boundary as specified in this clause is invoked with the location (xB0, yB0), the variables nTbW set equal to newTbW and nTbH set equal to newTbH, the variable filterEdgeFlag, the array edgeFlags, and the variable edgeType as inputs, and the output is the modified version of array edgeFlags.

3. If nTbW is greater than maxTb Size, the derivation process of transform block boundary as specified in this clause is invoked with the luma location (xTb0, yTb0) set equal to (xTb0+newTbW, yTb0), the variables nTbW set equal to newTbW and nTbH set equal to newTbH, the variable filterEdgeFlag, the array edgeFlags and the variable edgeType as inputs, and the output is the modified version of array edgeFlags.

4. If nTbH is greater than maxTbSize, the derivation process of transform block boundary as specified in this clause is invoked with the luma location (xTb0, yTb0) set equal to (xTb0, yTb0+newTbH), the variables nTbW set equal to newTbW and nTbH set equal to newTbH, the variable filterEdgeFlag, the array edgeFlags and the variable edgeType as inputs, and the output is the modified version of array edgeFlags.

5. If nTbW is greater than maxTb Size and nTbH is greater than maxTb Size, the derivation process of transform block boundary as specified in this clause is invoked with the luma location (xTb0, yTb0) set equal to (xTb0+newTbW, yTb0+newTbH), the variables nTbW set equal to newTbW and nTbH set equal to newTbH, the variable filterEdgeFlag, the array edgeFlags and the variable edgeType as inputs, and the output is the modified version of array edgeFlags.

Otherwise, the following applies:

If edgeType is equal to EDGE_VER, the value of edgeFlags[xB0][yB0+k] for k=0 . . . nTbH−1 is derived as follows:

If xB0 is equal to 0, edgeFlags[xB0][yB0+k] is set equal to filterEdgeFlag.

Otherwise, edgeFlags[xB0][yB0+k] is set equal to 1.

Otherwise (edgeType is equal to EDGE_HOR), the value of edgeFlags[xB0+k][yB0] for k=0 . . . nTbW−1 is derived as follows:

If yB0 is equal to 0, edgeFlags[xB0+k][yB0] is set equal to filterEdgeFlag.

Otherwise, edgeFlags[xB0+k][yB0] is set equal to 1.

8.6.2.4 Derivation Process of Coding Subblock Boundary

Inputs to this process are:

a location (xCb, yCb) specifying the top-left sample of the current coding block relative to the top-left sample of the current picture, a variable nCbW specifying the width of the current coding block, a variable nCbH specifying the height of the current coding block, a two-dimensional (nCbW)×(nCbH) array edgeFlags, a variable edgeType specifying whether a vertical (EDGE_VER) or a horizontal (EDGE_HOR) edge is filtered.

Output of this process is the modified two-dimensional (nCbW)×(nCbH) array edgeFlags.

The number of coding subblock in horizontal direction numSbX and in vertical direction numSbY are derived as follows:

If CuPredMode[xCb][yCb]==MODE_INTRA, numSbX and numSbY are both set equal to 1.

Otherwise, numSbX and numSbY are set equal to NumSbX[xCb][yCb] and NumSbY[xCb][yCb], respectively.

Depending on the value of edgeType the following applies:

If edgeType is equal to EDGE_VER and numSbX is greater than 1, the following applies for i=1 . . . min((nCbW/8)−1, numSbX−1), k=0 . . . nCbH−1:

edgeFlags[i*Max(8,nCbW/numSbX)][k]=1 (8 865)

Otherwise if edgeType is equal to EDGE_HOR and numSbY is greater than 1, the following applies for j=1 . . . min((nCbH/8)−1, numSbY−1), k=0 . . . nCbW−1:

edgeFlags[k][j*Max(8,nCbH/numSbY)]=1 (8 866)

8.6.2.5 Derivation Process of Boundary Filtering Strength

Inputs to this process are:
a picture sample array recPicture,
a location (xCb, yCb) specifying the top-left sample of the current coding block relative to the top-left sample of the current picture,
a variable nCbW specifying the width of the current coding block,
a variable nCbH specifying the height of the current coding block,
a variable edgeType specifying whether a vertical (EDGE_VER) or a horizontal (EDGE_HOR) edge is filtered,
a two-dimensional (nCbW)×(nCbH) array edgeFlags.

Output of this process is a two-dimensional (nCbW)×(nCbH) array b S specifying the boundary filtering strength.

The variables xDi, yDj, xN and yN are derived as follows:
If edgeType is equal to EDGE_VER, xDi is set equal to (i<<3), yDj is set equal to (j<<2), xN is set equal to Max(0, (nCbW/8)−1) and yN is set equal to (nCbH/4)−1.
Otherwise (edgeType is equal to EDGE_HOR), xDi is set equal to (i<<2), yDj is set equal to (j<<3), xN is set equal to (nCbW/4)−1 and yN is set equal to Max(O, (nCbH/8)−1).

For xDi with i=0 . . . xN and yDj with j=0 . . . yN, the following applies:
If edgeFlags[xDi][yDj] is equal to 0, the variable bS[xDi][yDj] is set equal to 0.
Otherwise, the following applies:
The sample values p0 and q0 are derived as follows:
If edgeType is equal to EDGE_VER, p0 is set equal to recPicture [xCb+xDi−1][yCb+yDj] and q0 is set equal to recPicture [xCb+xDi][yCb+yDj].
Otherwise (edgeType is equal to EDGE_HOR), p0 is set equal to recPicture [xCb+xDi][yCb+yDj−1] and q0 is set equal to recPicture [xCb+xDi][yCb+yDj].
The variable bS[xDi][yDj] is derived as follows:
If the sample p0 or q0 is in the coding block of a coding unit coded with intra prediction mode, bS[xDi][yDj] is set equal to 2.
Otherwise, if the block edge is also a transform block edge and the sample p0 or q0 is in a transform block which contains one or more non-zero transform coefficient levels, bS[xDi][yDj] is set equal to 1.
Otherwise, if one or more of the following conditions are true, bS[xDi][yDj] is set equal to 1:
For the prediction of the coding subblock containing the sample p0 different reference pictures or a different number of motion vectors are used than for the prediction of the coding subblock containing the sample q0.
NOTE 1—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.

NOTE 2—The number of motion vectors that are used for the prediction of a coding subblock with top-left sample covering (xSb, ySb), is equal to PredFlagL0[xSb][ySb]+PredFlagL1[xSb][ySb].

One motion vector is used to predict the coding subblock containing the sample p0 and one motion vector is used to predict the coding subblock containing the sample q0, and the absolute difference between the horizontal or vertical component of the motion vectors used is greater than or equal to 4 in units of quarter luma samples.

Two motion vectors and two different reference pictures are used to predict the coding subblock containing the sample p0, two motion vectors for the same two reference pictures are used to predict the coding subblock containing the sample q0 and the absolute difference between the horizontal or vertical component of the two motion vectors used in the prediction of the two coding subblocks for the same reference picture is greater than or equal to 4 in units of quarter luma samples.

Two motion vectors for the same reference picture are used to predict the coding subblock containing the sample p0, two motion vectors for the same reference picture are used to predict the coding subblock containing the sample q0 and both of the following conditions are true:

The absolute difference between the horizontal or vertical component of list 0 motion vectors used in the prediction of the two coding subblocks is greater than or equal to 4 in quarter luma samples, or the absolute difference between the horizontal or vertical component of the list 1 motion vectors used in the prediction of the two coding subblocks is greater than or equal to 4 in units of quarter luma samples.

The absolute difference between the horizontal or vertical component of list 0 motion vector used in the prediction of the coding subblock containing the sample p0 and the list 1 motion vector used in the prediction of the coding subblock containing the sample q0 is greater than or equal to 4 in units of quarter luma samples, or the absolute difference between the horizontal or vertical component of the list 1 motion vector used in the prediction of the coding subblock containing the sample p0 and list 0 motion vector used in the prediction of the coding subblock containing the sample q0 is greater than or equal to 4 in units of quarter luma samples.

Otherwise, the variable bS[xDi][yDj] is set equal to 0.

8.6.2.6 Edge Filtering Process 8.6.2.6.1 Vertical Edge Filtering Process

Inputs to this process are:
a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed,
when treeType is equal to SINGLE_TREE or DUAL_TREE_LUMA, the reconstructed picture prior to deblocking, i.e., the array recPictureL,
when ChromaArrayType is not equal to 0 and treeType is equal to SINGLE_TREE or DUAL_TREE_CHROMA, the arrays recPictureCb and recPictureCr, a location (xCb, yCb) specifying the top-left sample of the current coding block relative to the top-left sample of the current picture, a variable nCbW specifying the width of the current coding block, a variable nCbH specifying the height of the current coding block.

Outputs of this process are the modified reconstructed picture after deblocking, i.e:

when treeType is equal to SINGLE_TREE or DUAL_TREE_LUMA, the array recPictureL, when ChromaArrayType is not equal to 0 and treeType is equal to SINGLE_TREE or DUAL_TREE_CHROMA, the arrays recPictureCb and recPictureCr.

When treeType is equal to SINGLE_TREE or DUAL_TREE_LUMA, the filtering process for edges in the luma coding block of the current coding unit consists of the following ordered steps:

1. The variable xN is set equal to Max(0, (nCbW/8)−1) and yN is set equal to (nCbH/4)−1.

2. For xDk equal to k<<3 with k=0 . . . nN and yDm equal to m<<2 with m=0 . . . yN, the following applies:

When bS[xDk][yDm] is greater than 0, the following ordered steps apply:

a. The decision process for block edges as specified in clause 8.6.2.6.3 is invoked with treeType, the picture sample array recPicture set equal to the luma picture sample array recPictureL, the location of the luma coding block (xCb, yCb), the luma location of the block(xDk, yDm), a variable edgeType set equal to EDGE_VER, the boundary filtering strength bS[xDk][yDm], and the bit depth bD set equal to BitDepthY as inputs, and the decisions dE, dEp and dEq, and the variable tC as outputs.

b. The filtering process for block edges as specified in clause 8.6.2.6.4 is invoked with the picture sample array recPicture set equal to the luma picture sample array recPictureL, the location of the luma coding block (xCb, yCb), the luma location of the block (xDk, yDm), a variable edgeType set equal to EDGE_VER, the decisions dE, dEp and dEq, and the variable tC as inputs, and the modified luma picture sample array recPictureL as output.

When ChromaArrayType is not equal to 0 and treeType is equal to SINGLE_TREE the filtering process for edges in the chroma coding blocks of current coding unit consists of the following ordered steps:

1. The variable xN is set equal to Max(0, (nCbW/8)−1) and yN is set equal to Max(O, (nCbH/8)−1).

2. The variable edgeSpacing is set equal to 8/SubWidthC.

3. The variable edgeSections is set equal to yN*(2/SubHeightC).

4. For xDk equal to k*edgeSpacing with k=0 . . . xN and yDm equal to m<<2 with m=0 . . . edgeSections, the following applies:

When bS[xDk*SubWidthC][yDm*SubHeightC] is equal to 2 and (((xCb/SubWidthC+xDk)>>3)<<3) is equal to xCb/SubWidthC+xDk, the following ordered steps apply:

a. The filtering process for chroma block edges as specified in clause 8.6.2.6.5 is invoked with the chroma picture sample array recPictureCb, the location of the chroma coding block (xCb/SubWidthC, yCb/SubHeightC), the chroma location of the block (xDk, yDm), a variable edgeType set equal to EDGE_VER and a variable cQpPicOffset set equal to pps_cb_qp_offset as inputs, and the modified chroma picture sample array recPictureCb as output.

b. The filtering process for chroma block edges as specified in clause 8.6.2.6.5 is invoked with the chroma picture sample array recPictureCr, the location of the chroma coding block (xCb/SubWidthC, yCb/SubHeightC), the chroma location of the block (xDk, yDm), a variable edgeType set equal to EDGE_VER and a variable cQpPicOffset set equal to pps_cr_qp_offset as inputs, and the modified chroma picture sample array recPictureCr as output.

When treeType is equal to DUAL_TREE_CHROMA, the filtering process for edges in the two chroma coding blocks of the current coding unit consists of the following ordered steps:

1. The variable xN is set equal to Max(0, (nCbW/8)−1) and yN is set equal to (nCbH/4)−1.

2. For xDk equal to k<<3 with k=0 . . . xN and yDm equal to m<<2 with m=0 . . . yN, the following applies:

When bS[xDk][yDm] is greater than 0, the following ordered steps apply:

a. The decision process for block edges as specified in clause 8.6.2.6.3 is invoked with treeType, the picture sample array recPicture set equal to the chroma picture sample array recPictureCb, the location of the chroma coding block (xCb, yCb), the location of the chroma block (xDk, yDm), a variable edgeType set equal to EDGE_VER, the boundary filtering strength bS[xDk][yDm], and the bit depth bD set equal to BitDepthC as inputs, and the decisions dE, dEp and dEq, and the variable tC as outputs.

b. The filtering process for block edges as specified in clause 8.6.2.6.4 is invoked with the picture sample array recPicture set equal to the chroma picture sample array recPictureCb, the location of the chroma coding block (xCb, yCb),the chromalocation of the block (xDk, yDm), a variable edgeType set equal to EDGE_VER, the decisions dE, dEp and dEq, and the variable tC as inputs, and the modified chroma picture sample array recPictureCb as output.

c. The filtering process for block edges as specified in clause 8.6.2.6.4 is invoked with the picture sample array recPicture set equal to the chroma picture sample array recPictureCr, the location of the chroma coding block (xCb, yCb), the chroma location of the block (xDk, yDm), a variable edgeType set equal to EDGE_VER, the decisions dE, dEp and dEq, and the variable tC as inputs, and the modified chroma picture sample array recPictureCr as output.

8.6.2.6.2 Horizontal Edge Filtering Process

Inputs to this process are:

a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed, when treeType is equal to SINGLE_TREE or DUAL_TREE_LUMA, the reconstructed picture prior to deblocking, i.e., the array recPictureL, when ChromaArrayType is not equal to 0 and treeType is equal to SINGLE_TREE or DUAL_TREE_CHROMA, the arrays recPictureCb and recPictureCr, a location (xCb, yCb) specifying the top-left sample of the current coding block relative to the top-left sample of the current picture, a variable nCbW specifying the width of the current coding block, a variable nCbH specifying the height of the current coding block.

Outputs of this process are the modified reconstructed picture after deblocking, i.e:
    when treeType is equal to SINGLE_TREE or DUAL_TREE_LUMA, the array recPictureL,
    when ChromaArrayType is not equal to 0 and treeType is equal to SINGLE_TREE or DUAL_TREE_CHROMA, the arrays recPictureCb and recPictureCr.

When treeType is equal to SINGLE_TREE or DUAL_TREE_LUMA, the filtering process for edges in the luma coding block of the current coding unit consists of the following ordered steps:
    1. The variable yN is set equal to Max(0, (nCbH/8)−1) and xN is set equal to (nCbW/4)−1.
    2. For yDm equal to m<<3 with m=0 . . . yN and xDk equal to k<<2 with k=0 . . . xN, the following applies:
        When bS[xDk][yDm] is greater than 0, the following ordered steps apply:
        a. The decision process for block edges as specified in clause 8.6.2.6.3 is invoked with treeType, the picture sample array recPicture set equal to the luma picture sample array recPictureL, the location of the luma coding block (xCb, yCb), the luma location of the block(xDk, yDm), a variable edgeType set equal to EDGE_HOR, the boundary filtering strength bS[xDk][yDm], and the bit depth bD set equal to BitDepthY as inputs, and the decisions dE, dEp and dEq, and the variable tC as outputs.
        b. The filtering process for block edges as specified in clause 8.6.2.6.4 is invoked with the picture sample array recPicture set equal to the luma picture sample array recPictureL, the location of the luma coding block (xCb, yCb), the luma location of the block (xDk, yDm), a variable edgeType set equal to EDGE_HOR, the decisions dEp, dEp and dEq, and the variable tC as inputs, and the modified luma picture sample array recPictureL as output.

When ChromaArrayType is not equal to 0 and treeType is equal to SINGLE_TREE the filtering process for edges in the chroma coding blocks of current coding unit consists of the following ordered steps:
    1. The variable xN is set equal to Max(0, (nCbW/8)−1) and yN is set equal to Max(0, (nCbH/8)−1).
    2. The variable edgeSpacing is set equal to 8/SubHeightC.
    3. The variable edgeSections is set equal to xN*(2/SubWidthC).
    4. For yDm equal to m*edgeSpacing with m=0 . . . yN and xDk equal to k<<2 with k=0 . . . edgeSections, the following applies:
        When bS[xDk*SubWidthC][yDm*SubHeightC] is equal to 2 and (((yCb/SubHeightC+yDm)>>3)<<3) is equal to yCb/SubHeightC+yDm, the following ordered steps apply:
        a. The filtering process for chroma block edges as specified in clause 8.6.2.6.5 is invoked with the chroma picture sample array recPictureCb, the location of the chroma coding block (xCb/SubWidthC, yCb/SubHeightC), the chroma location of the block (xDk, yDm), a variable edgeType set equal to EDGE_HOR and a variable cQpPicOffset set equal to pps_cb_qp_offset as inputs, and the modified chroma picture sample array recPictureCb as output.
        b. The filtering process for chroma block edges as specified in clause 8.6.2.6.5 is invoked with the chroma picture sample array recPictureCr, the location of the chroma coding block (xCb/SubWidthC, yCb/SubHeightC), the chroma location of the block (xDk, yDm), a variable edgeType set equal to EDGE_HOR and a variable cQpPicOffset set equal to pps_cr_qp_offset as inputs, and the modified chroma picture sample array recPictureCr as output.

When treeType is equal to DUAL_TREE_CHROMA, the filtering process for edges in the two chroma coding blocks of the current coding unit consists of the following ordered steps:
    1. The variable yN is set equal to Max(0, (nCbH/8)−1) and xN is set equal to (nCbW/4)−1.
    2. For yDm equal to m<<3 with m=0 . . . yN and xDk equal to k<<2 with k=0 . . . xN, the following applies:
        When bS[xDk][yDm] is greater than 0, the following ordered steps apply:
        a. The decision process for block edges as specified in clause 8.6.2.6.3 is invoked with treeType, the picture sample array recPicture set equal to the chroma picture sample array recPictureCb, the location of the chroma coding block (xCb, yCb), the location of the chroma block (xDk, yDm), a variable edgeType set equal to EDGE_HOR, the boundary filtering strength bS[xDk][yDm], and the bit depth bD set equal to BitDepthC as inputs, and the decisions dE, dEp and dEq, and the variable tC as outputs.
        b. The filtering process for block edges as specified in clause 8.6.2.6.4 is invoked with the picture sample array recPicture set equal to the chroma picture sample array recPictureCb, the location of the chroma coding block (xCb, yCb),the chromalocation of the block (xDk, yDm), a variable edgeType set equal to EDGE_HOR, the decisions dE, dEp and dEq, and the variable tC as inputs, and the modified chroma picture sample array recPictureCb as output.
        c. The filtering process for block edges as specified in clause 8.6.2.6.4 is invoked with the picture sample array recPicture set equal to the chroma picture sample array recPictureCr, the location of the chroma coding block (xCb, yCb), the chroma location of the block (xDk, yDm), a variable edgeType set equal to EDGE_HOR, the decisions dE, dEp and dEq, and the variable tC as inputs, and the modified chroma picture sample array recPictureCr as output.

8.6.2.6.3 Decision Process for Block Edges

Inputs to this process are:
    a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed,
    a picture sample array recPicture,
    a location (xCb, yCb) specifying the top-left sample of the current coding block relative to the top-left sample of the current picture,
    a location (xBl, yBl) specifying the top-left sample of the current block relative to the top-left sample of the current coding block,
    a variable edgeType specifying whether a vertical (EDGE_VER) or a horizontal (EDGE_HOR) edge is filtered,
    a variable bS specifying the boundary filtering strength,
    a variable bD specifying the bit depth of the current component.

Outputs of this process are:
    the variables dE, dEp and dEq containing decisions,
    the variable tC.

If edgeType is equal to EDGE_VER, the sample values pi,k and qi,k with i=0 . . . 3 and k=0 and 3 are derived as follows:

$$qi,k = \text{recPicture}L[xCb+xBl+i][yCb+yBl+k] \qquad (8\text{-}867)$$

$$pi,k = \text{recPicture}L[xCb+xBl-i-1][yCb+yBl+k] \qquad (8\text{-}868)$$

Otherwise (edgeType is equal to EDGE_HOR), the sample values pi,k and qi,k with i=0 . . . 3 and k=0 and 3 are derived as follows:

$$q_{i,k}=recPicture[xCb+xBl+k][yCb+yBl+i] \quad (8\ 869)$$

$$p_{i,k}=recPicture[xCb+xBl+k][yCb+yBl-i-1] \quad (8\ 870)$$

The variable qpOffset is derived as follows:
If sps_ladf_enabled_flag is equal to 1 and treeType is equal to SINGLE_TREE or DUAL_TREE_LUMA, the following applies:
The variable lumaLevel of the reconstructed luma level is derived as follow:

$$lumaLevel=((p0,0+p0,3+q0,0+q0,3)>>2), \quad (8\ 871)$$

The variable qpOffset is set equal to sps_ladf_lowest_interval_qp_offset and modified as follows:

```
for( i = 0; i < sps_num_ladf_intervals_minus2 + 1; i++ ) {
    if( lumaLevel > SpsLadfIntervalLowerBound[ i + 1 ] )
        qpOffset = sps_ladf_qp_offset[ i ]    (8 872)
    else
        break
}
```

Otherwise (treeType is equal to DUAL_TREE_CHROMA), qpOffset is set equal to 0.
The variables QpQ and QpP are derived as follows:
If treeType is equal to SINGLE_TREE or DUAL_TREE_LUMA, QpQ and QpP are set equal to the QpY values of the coding units which include the coding blocks containing the sample q0,0 and p0,0, respectively.
Otherwise (treeType is equal to DUAL_TREE_CHROMA), QpQ and QpP are set equal to the QpC values of the coding units which include the coding blocks containing the sample q0,0 and p0,0, respectively.
The variable qP is derived as follows:

$$qP=((QpQ+QpP+1)>>1)+qpOffset \quad (8\ 873)$$

The value of the variable $P'$ is determined as specified in Table 8 18 based on the quantization parameter Q derived as follows:

$$Q=Clip3(0,63,qP+(tile\_group\_beta\_offset\_div\ 2<<1)) \quad (8\ 874)$$

where tile_group_beta_offset_div2 is the value of the syntax element tile_group_beta_offset_div2 for the tile group that contains sample q0,0.
The variable R is derived as follows:

$$\beta=\beta'*(1<<(bD-8)) \quad (8\ 875)$$

The value of the variable $tC'$ is determined as specified in Table 8 18 based on the quantization parameter Q derived as follows:

$$Q=Clip3(0,65,qP+2*(bS-1)+(tile\_group\_tc\_offset\_div\ 2<<1)) \quad (8\ 876)$$

where tile_group_tc_offset_div2 is the value of the syntax element tile_group_tc_offset_div2 for the tile group that contains sample q0,0.
The variable tC is derived as follows:

$$tC=tC'*(1<(bD-8)) \quad (8\ 877)$$

Depending on the value of edgeType, the following applies:
If edgeType is equal to EDGE_VER, the following ordered steps apply:
1. The variables dpq0, dpq3, dp, dq and d are derived as follows:

$$dp0=Abs(p2,0-2*p1,0+p0,0) \quad (8\ 878)$$

$$dp3=Abs(p2,3-2*p1,3+p0,3) \quad (8\ 879)$$

$$dq0=Abs(q2,0-2*q1,0+q0,0) \quad (8\ 880)$$

$$dq3=Abs(q2,3-2*q1,3+q0,3) \quad (8\ 881)$$

$$dpq0=dp0+dq0 \quad (8\ 882)$$

$$dpq3=dp3+dq3 \quad (8\ 883)$$

$$dp=dp0+dp3 \quad (8\ 884)$$

$$dq=dq0+dq3 \quad (8\ 885)$$

$$d=dpq0+dpq3 \quad (8\ 886)$$

2. The variables dE, dEp and dEq are set equal to 0.
3. When d is less than β, the following ordered steps apply:
a. The variable dpq is set equal to 2*dpq0.
b. For the sample location (xCb+xBl, yCb+yBl), the decision process for a sample as specified in clause 8.6.2.6.6 is invoked with sample values p0,0, p3,0, q0,0, and q3,0, the variables dpq, p and tC as inputs, and the output is assigned to the decision dSam0.
c. The variable dpq is set equal to 2*dpq3.
d. For the sample location (xCb+xBl, yCb+yBl+3), the decision process for a sample as specified in clause 8.6.2.6.6 is invoked with sample values p0,3, p3,3, q0,3, and q3,3, the variables dpq, p and tC as inputs, and the output is assigned to the decision dSam3.
e. The variable dE is set equal to 1.
f. When dSam0 is equal to 1 and dSam3 is equal to 1, the variable dE is set equal to 2.
g. When dp is less than $(\beta+(\beta>>1)))>>3$, the variable dEp is set equal to 1.
h. When dq is less than $(\beta+(\beta\times\times1)))>>3$, the variable dEq is set equal to 1.
Otherwise (edgeType is equal to EDGE_HOR), the following ordered steps apply:
1. The variables dpq0, dpq3, dp, dq and d are derived as follows:

$$dp0=Abs(p2,0-2*p1,0+p0,0) \quad (8\ 887)$$

$$dp3=Abs(p2,3-2*p1,3+p0,3) \quad (8\ 888)$$

$$dq0=Abs(q2,0-2*q1,0+q0,0) \quad (8\ 889)$$

$$dq3=Abs(q2,3-2*q1,3+q0,3) \quad (8\ 890)$$

$$dpq0=dp0+dq0 \quad (8\ 891)$$

$$dpq3=dp3+dq3 \quad (8\ 892)$$

$$dp=dp0+dp3 \quad (8\ 893)$$

$$dq=dq0+dq3 \quad (8\ 894)$$

$$d=dpq0+dpq3 \quad (8\ 895)$$

2. The variables dE, dEp and dEq are set equal to 0.
3. When d is less than, the following ordered steps apply:
a. The variable dpq is set equal to 2*dpq0.
b. For the sample location (xCb+xBl, yCb+yBl), the decision process for a sample as specified in clause 8.6.2.6.6 is invoked with sample values p0,0, p3,0, q0,0 and q3,0, the variables dpq, p and tC as inputs, and the output is assigned to the decision dSam0.

c. The variable dpq is set equal to 2*dpq3.

d. For the sample location (xCb+xBl+3, yCb+yBl), the decision process for a sample as specified in clause 8.6.2.6.6 is invoked with sample values p0,3, p3,3, q0,3 and q3,3, the variables dpq, p and tC as inputs, and the output is assigned to the decision dSam3.

e. The variable dE is set equal to 1.

f. When dSam0 is equal to 1 and dSam3 is equal to 1, the variable dE is set equal to 2.

g. When dp is less than $(\beta+(\beta>>1)))>>3$, the variable dEp is set equal to 1.

h. When dq is less than $(\beta+(\beta>>1)))>>3$, the variable dEq is set equal to 1.

TABLE 8 18

Derivation of threshold variables β' and tC' from input Q

| Q | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|----|----|----|----|----|----|----|
| β' | 0 | 0 | 0 | 0 | 0 | 0 | 0 | 0 | 0 | 0 | 0 | 0 | 0 | 0 | 0 | 0 | 6 |
| tC' | 0 | 0 | 0 | 0 | 0 | 0 | 0 | 0 | 0 | 0 | 0 | 0 | 0 | 0 | 0 | 0 | 0 |
| Q | 17 | 18 | 19 | 20 | 21 | 22 | 23 | 24 | 25 | 26 | 27 | 28 | 29 | 30 | 31 | 32 | 33 |
| β' | 7 | 8 | 9 | 10 | 11 | 12 | 13 | 14 | 15 | 16 | 17 | 18 | 20 | 22 | 24 | 26 | 28 |
| tC' | 0 | 1 | 1 | 1 | 1 | 1 | 1 | 1 | 1 | 1 | 2 | 2 | 2 | 2 | 3 | 3 | 3 |
| Q | 34 | 35 | 36 | 37 | 38 | 39 | 40 | 41 | 42 | 43 | 44 | 45 | 46 | 47 | 48 | 49 | 50 |
| β' | 30 | 32 | 34 | 36 | 38 | 40 | 42 | 44 | 46 | 48 | 50 | 52 | 54 | 56 | 58 | 60 | 62 |
| tC' | 3 | 4 | 4 | 4 | 5 | 5 | 6 | 6 | 7 | 8 | 9 | 10 | 11 | 13 | 14 | 16 | 18 |
| Q | 51 | 52 | 53 | 54 | 55 | 56 | 57 | 58 | 59 | 60 | 61 | 62 | 63 | 64 | 65 | | |
| β' | 64 | 66 | 68 | 70 | 72 | 74 | 76 | 78 | 80 | 82 | 84 | 86 | 88 | — | — | | |
| tC' | 20 | 22 | 25 | 28 | 31 | 35 | 39 | 44 | 50 | 56 | 63 | 70 | 79 | 88 | 99 | | |

8.6.2.6.4 Filtering Process for Block Edges

Inputs to this process are:

a picture sample array recPicture, a location (xCb, yCb) specifying the top-left sample of the current coding block relative to the top-left sample of the current picture, a location (xBl, yBl) specifying the top-left sample of the current block relative to the top-left sample of the current coding block, a variable edgeType specifying whether a vertical (EDGE_VER) or a horizontal (EDGE_HOR) edge is filtered, the variables dE, dEp and dEq containing decisions, the variable tC.

Output of this process is the modified picture sample array recPicture.

Depending on the value of edgeType, the following applies:

If edgeType is equal to EDGE_VER, the following ordered steps apply:

1. The sample values pi,k and qi,k with i=0 . . . 3 and k=0 . . . 3 are derived as follows:

$$qi,k = recPictureL[xCb+xBl+i][yCb+yBl+k] \quad (8\ 896)$$

$$pi,k = recPictureL[xCb+xBl-i-1][yCb+yBl+k] \quad (8\ 897)$$

2. When dE is not equal to 0, for each sample location (xCb+xBl, yCb+yBl+k), k=0.3, the following ordered steps apply:

a. The filtering process for a sample as specified in clause 8.6.2.6.7 is invoked with the sample values pi,k, qi,k with i=0.3, the locations (xPi, yPi) set equal to (xCb+xBl-i-1, yCb+yBl+k) and (xQi, yQi) set equal to (xCb+xBl+i, yCb+yBl+k) with i=0 . . . 2, the decision dE, the variables dEp and dEq and the variable tC as inputs, and the number of filtered samples nDp and nDq from each side of the block boundary and the filtered sample values pi' and qj' as outputs.

b. When nDp is greater than 0, the filtered sample values pi' with i=0 . . . nDp−1 replace the corresponding samples inside the sample array recPicture as follows:

$$recPicture[xCb+xBl-i-1][yCb+yBl+k]=pi' \quad (8\ 898)$$

c. When nDq is greater than 0, the filtered sample values qj' with j=0 . . . nDq−1 replace the corresponding samples inside the sample array recPicture as follows:

$$recPicture[xCb+xBl+j][yCb+yBl+k]=qj' \quad (8\ 899)$$

Otherwise (edgeType is equal to EDGE_HOR), the following ordered steps apply:

1. The sample values pi,k and qi,k with i=0 . . . 3 and k=0 . . . 3 are derived as follows:

$$qi,k = recPictureL[xCb+xBl+k][yCb+yBl+i] \quad (8\ 900)$$

$$pi,k = recPictureL[xCb+xBl+k][yCb+yBl-i-1] \quad (8\ 901)$$

2. When dE is not equal to 0, for each sample location (xCb+xBl+k, yCb+yBl), k=0 . . . 3, the following ordered steps apply:

a. The filtering process for a sample as specified in clause 8.6.2.6.7 is invoked with the sample values pi,k, qi,k with i=0.3, the locations (xPi, yPi) set equal to (xCb+xBl+k, yCb+yBl-i-1) and (xQi, yQi) set equal to (xCb+xBl+k, yCb+yBl+i) with i=0 . . . 2, the decision dE, the variables dEp and dEq, and the variable tC as inputs, and the number of filtered samples nDp and nDq from each side of the block boundary and the filtered sample values pi' and qj' as outputs.

b. When nDp is greater than 0, the filtered sample values pi' with i=0 . . . nDp−1 replace the corresponding samples inside the sample array recPicture as follows:

$$recPicture[xCb+xBl+k][yCb+yBl-i-1]=pi' \quad (8\ 902)$$

c. When nDq is greater than 0, the filtered sample values qj' with j=0 . . . nDq−1 replace the corresponding samples inside the sample array recPicture as follows:

$$recPicture[xCb+xBl+k][yCb+yBl+j]=qj' \quad (8\ 903)$$

8.6.2.6.5 Filtering process for chroma block edges

This process is only invoked when ChromaArrayType is not equal to 0.

Inputs to this process are:

a chroma picture sample array s', a chroma location (xCb, yCb) specifying the top-left sample of the current chroma coding block relative to the top-left chroma sample of the current picture, a chroma location (xBl, yBl) specifying the top-left sample of the current chroma block relative to the top-left sample of the current chroma coding block, a variable edgeType specifying whether a vertical (EDGE_VER) or a horizontal (EDGE_HOR) edge is filtered, a variable cQpPicOffset specifying the picture-level chroma quantization parameter offset.

Output of this process is the modified chroma picture sample array s'.

If edgeType is equal to EDGE_VER, the values pi and qi with i=0 . . . 1 and k=0 . . . 3 are derived as follows:

$$q_{i,k}=s'[xCb+xBl+i][yCb+yBl+k] \qquad (8\ 904)$$

$$p_{i,k}=s'[xCb+xBl-i-1][yCb+yBl+k] \qquad (8\ 905)$$

Otherwise (edgeType is equal to EDGE_HOR), the sample values pi and qi with i=0 . . . 1 and k=0 . . . 3 are derived as follows:

$$q_{i,k}=s'[xCb+xBl+k][yCb+yBl+i] \qquad (8\ 906)$$

$$p_{i,k}=s'[xCb+xBl+k][yCb+yBl-i-1] \qquad (8\ 907)$$

The variables QpQ and QpP are set equal to the QpY values of the coding units which include the coding blocks containing the sample q0,0 and p0,0, respectively.

If ChromaArrayType is equal to 1, the variable QpC is determined as specified in Table 8 15 based on the index qPi derived as follows:

$$qPi=((QpQ+QpP+1)>>1)+cQpPicOffset \qquad (8\ 908)$$

Otherwise (ChromaArrayType is greater than 1), the variable QpC is set equal to Min(qPi, 63).

NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of tile_group_cb_qp_offset or tile_group_cr_qp_offset.

The value of the variable tC' is determined as specified in Table 8 18 based on the chroma quantization parameter Q derived as follows:

$$Q=\text{Clip3}(0,65,QpC+2+(\text{tile\_group\_tc\_offset\_div}2<<1)) \qquad (8\ 909)$$

where tile_group_tc_offset_div2 is the value of the syntax element tile_group_tc_offset_div2 for the tile group that contains sample q0,0.

The variable tC is derived as follows:

$$tC=tC'*(1<<(\text{BitDepthC}-8)) \qquad (8\ 910)$$

Depending on the value of edgeType, the following applies:

If edgeType is equal to EDGE_VER, for each sample location (xCb+xBl, yCb+yBl+k), k=0 . . . 3, the following ordered steps apply:

1. The filtering process for a chroma sample as specified in clause 8.6.2.6.8 is invoked with the sample values pi,k, qi,k, with i=0 . . . 1, the locations (xCb+xBl-1, yCb+yBl+k) and (xCb+xBl, yCb+yBl+k) and the variable tC as inputs, and the filtered sample values p0' and q0' as outputs.

2. The filtered sample values p0' and q0' replace the corresponding samples inside the sample array s' as follows:

$$s'[xCb+xBl][yCb+yBl+k]=q0' \qquad (8\ 911)$$

$$s'[xCb+xBl-1][yCb+yBl+k]=p0' \qquad (8\ 912)$$

Otherwise (edgeType is equal to EDGE_HOR), for each sample location (xCb+xBl+k, yCb+yBl), k=0.3, the following ordered steps apply:

1. The filtering process for a chroma sample as specified in clause 8.6.2.6.8 is invoked with the sample values pi,k, qi,k, with i=0 . . . 1, the locations (xCb+xBl+k, yCb+yBl-1) and (xCb+xBl+k, yCb+yBl), and the variable tC as inputs, and the filtered sample values p0' and q0' as outputs.

2. The filtered sample values p0' and q0' replace the corresponding samples inside the sample array s' as follows:

$$s'[xCb+xBl+k][yCb+yBl]=q0' \qquad (8\ 913)$$

$$s'[xCb+xBl+k][yCb+yBl-1]=p0' \qquad (8\ 914)$$

8.6.2.6.6 Decision Process for a Sample

Inputs to this process are:

the sample values p0, p3, q0 and q3, the variables dpq, β and tC.

Output of this process is the variable dSam containing a decision.

The variable dSam is specified as follows:

If dpq is less than (β>>2), Abs(p3−p0)+Abs(q0−q3) is less than (β>>3) and Abs(p0−q0) is less than (5*tC+1)>>1, dSam is set equal to 1. Otherwise, dSam is set equal to 0.

8.6.2.6.7 Filtering Process for a Sample

Inputs to this process are:

the sample values pi and qi with i=0.3, the locations of pi and qi, (xPi, yPi) and (xQi, yQi) with i=0 . . . 2, a variable dE, the variables dEp and dEq containing decisions to filter samples p1 and q1, respectively, a variable tC.

Outputs of this process are:

the number of filtered samples nDp and nDq, the filtered sample values pi' and qj' with i=0 . . . nDp−1, j=0 . . . nDq−1.

Depending on the value of dE, the following applies:

If the variable dE is equal to 2, nDp and nDq are both set equal to 3 and the following strong filtering applies:

$$p0'=\text{Clip3}(p0-2*tC,p0+2*tC,(p2+2*p1+2*p0+2*q0+q1+4)>>3) \qquad (8\ 915)$$

$$p1'=\text{Clip3}(p1-2*tC,p1+2*tC,(p2+p1+p0+q0+2)>>2) \qquad (8\ 916)$$

$$p2'=\text{Clip3}(p2-2*tC,p2+2*tC,(2*p3+3*p2+p1+p0+q0+4)>>3) \qquad (8\ 917)$$

$$q0'=\text{Clip3}(q0-2*tC,q0+2*tC,(p1+2*p0+2*q0+2*q1+q2+4)>>3) \qquad (8\ 918)$$

$$q1'=\text{Clip3}(q1-2*tC,q1+2*tC,(p0+q0+q1+q2+2)>>2) \qquad (8\ 919)$$

$$q2'=\text{Clip3}(q2-2*tC,q2+2*tC,(p0+q0+q1+3*q2+2*q3+4)>>3) \qquad (8\ 920)$$

Otherwise, nDp and nDq are set both equal to 0 and the following weak filtering applies:

The following applies:

$$\Box=(9*(q0-p0)-3*(q1-p1)+8)>>4 \qquad (8\ 921)$$

When Abs(Q) is less than tC*10, the following ordered steps apply:

The filtered sample values p0' and q0' are specified as follows:

$$\Box=\text{Clip3}(-tC,tC,\Box) \qquad (8\ 922)$$

$$p0'=\text{Clip1}Y(p0+\Box) \qquad (8\ 923)$$

$$q0'=\text{Clip1}Y(q0-\Box) \qquad (8\ 924)$$

When dEp is equal to 1, the filtered sample value p1' is specified as follows:

$$\Delta p = \text{Clip3}(-(tC>>1), tC>>1, (((p2+p0+1)>>1) - p1+Q)>>1) \quad (8\ 925)$$

$$p1' = \text{Clip1}Y(p1+Qp) \quad (8\ 926)$$

When dEq is equal to 1, the filtered sample value q1' is specified as follows:

$$\Delta q = \text{Clip3}(-(tC>>1), tC>>1, (((q2+q0+1)>>1) - q1 - \Delta)>>1) \quad (8\ 927)$$

$$q1' = \text{Clip1}Y(q1+\Delta q) \quad (8\ 928)$$

nDp is set equal to dEp+1 and nDq is set equal to dEq+1.

When nDp is greater than 0 and one or more of the following conditions are true, nDp is set equal to 0:
  pcm_loop_filter_disabled_flag is equal to 1 and pcm_flag [xP0][yP0] is equal to 1.
  cu_transquant_bypass_flag of the coding unit that includes the coding block containing the sample p0 is equal to 1.

When nDq is greater than 0 and one or more of the following conditions are true, nDq is set equal to 0:
  pcm_loop_filter_disabled_flag is equal to 1 and pcm_flag [xQ0][yQ0] is equal to 1.
  cu_transquant_bypass_flag of the coding unit that includes the coding block containing the sample q0 is equal to 1.

8.6.2.6.8 Filtering Process for a Chroma Sample

This process is only invoked when ChromaArrayType is not equal to 0.

Inputs to this process are:
  the chroma sample values pi and qi with i=0 . . . 1,
  the chroma locations of p0 and q0, (xP0, yP0) and (xQ0, yQ0),
  a variable tC.

Outputs of this process are the filtered sample values p0' and q0'.

The filtered sample values p0' and q0' are derived as follows:

$$\Delta = \text{Clip3}(-tC, tC, ((((q0-p0)>>2) + p1-q1+4)>>3)) \quad (8\ 929)$$

$$p0' = \text{Clip1}C(p0+\Delta) \quad (8\ 930)$$

$$q0' = \text{Clip1}C(q0-\Delta) \quad (8\ 931)$$

When one or more of the following conditions are true, the filtered sample value, p0' is substituted by the corresponding input sample value p0:
  pcm_loop_filter_disabled_flag is equal to 1 and pcm_flag [xP0*SubWidthC][yP0*SubHeightC] is equal to 1.
  cu_transquant_bypass_flag of the coding unit that includes the coding block containing the sample p0 is equal to 1.

When one or more of the following conditions are true, the filtered sample value, q0' is substituted by the corresponding input sample value q0:
  pcm_loop_filter_disabled_flag is equal to 1 and pcm_flag [xQ0*SubWidthC][yQ0*SubHeightC] is equal to 1.
  cu_transquant_bypass_flag of the coding unit that includes the coding block containing the sample q0 is equal to 1.

8.6.3 Sample Adaptive Offset Process
8.6.3.1 General

Inputs to this process are the reconstructed picture sample array prior to sample adaptive offset recPictureL and, when ChromaArrayType is not equal to 0, the arrays recPictureCb and recPictureCr.

Outputs of this process are the modified reconstructed picture sample array after sample adaptive offset saoPictureL and, when ChromaArrayType is not equal to 0, the arrays saoPictureCb and saoPictureCr.

This process is performed on a CTB basis after the completion of the deblocking filter process for the decoded picture.

The sample values in the modified reconstructed picture sample array saoPictureL and, when ChromaArrayType is not equal to 0, the arrays saoPictureCb and saoPictureCr are initially set equal to the sample values in the reconstructed picture sample array recPictureL and, when ChromaArrayType is not equal to 0, the arrays recPictureCb and recPictureCr, respectively.

For every CTU with CTB location (rx, ry), where rx=0 . . . PicWidthInCtbsY−1 and ry=0 . . . PicHeightInCtbsY−1, the following applies:
  When tile_group_sao_luma_flag of the current tile group is equal to 1, the CTB modification process as specified in clause 8.6.3.2 is invoked with recPicture set equal to recPictureL, cIdx set equal to 0, (rx, ry), and both nCtb Sw and nCtb Sh set equal to Ctb SizeY as inputs, and the modified luma picture sample array saoPictureL as output.
  When ChromaArrayType is not equal to 0 and tile_group_sao_chroma_flag of the current tile group is equal to 1, the CTB modification process as specified in clause 8.6.3.2 is invoked with recPicture set equal to recPictureCb, cIdx set equal to 1, (rx, ry), nCtb Sw set equal to (1<<Ctb Log 2SizeY)/SubWidthC and nCtbSh set equal to (1<<Ctb Log 2SizeY)/SubHeightC as inputs, and the modified chroma picture sample array saoPictureCb as output.
  When ChromaArrayType is not equal to 0 and tile_group_sao_chroma_flag of the current tile group is equal to 1, the CTB modification process as specified in clause 8.6.3.2 is invoked with recPicture set equal to recPictureCr, cIdx set equal to 2, (rx, ry), nCtb Sw set equal to (1<<Ctb Log 2SizeY)/SubWidthC and nCtbSh set equal to (1<<Ctb Log 2SizeY)/SubHeightC as inputs, and the modified chroma picture sample array saoPictureCr as output.

8.6.3.2 CTB Modification Process

Inputs to this process are:
  the picture sample array recPicture for the colour component cIdx,
  a variable cIdx specifying the colour component index,
  a pair of variables (rx, ry) specifying the CTB location,
  the CTB width nCtbSw and height nCtb Sh.

Output of this process is a modified picture sample array saoPicture for the colour component cIdx.

The variable bitDepth is derived as follows:
  If cIdx is equal to 0, bitDepth is set equal to BitDepthY.
  Otherwise, bitDepth is set equal to BitDepthC.

The location (xCtb, yCtb), specifying the top-left sample of the current CTB for the colour component cIdx relative to the top-left sample of the current picture component cIdx, is derived as follows:

$$(xCtb, yCtb) = (rx*nCtbSw, ry*nCtbSh) \quad (8\ 932)$$

The sample locations inside the current CTB are derived as follows:

$$(xSi,ySj)=(xCtb+i,yCtb+j) \quad (8\ 933)$$

$$(xYi,yYj)=(cIdx==0)?(xSi,ySj):(xSi*SubWidthC, ySj*SubHeightC) \quad (8\ 934)$$

For all sample locations (xSi, ySj) and (xYi, yYj) with i=0 . . . nCtb Sw−1 and j=0 . . . nCtb Sh−1, depending on the values of pcm_loop_filter_disabled_flag, pcm_flag[xYi][yYj] and cu_transquant_bypass_flag of the coding unit which includes the coding block covering recPicture[xSi][ySj], the following applies:
  If one or more of the following conditions are true, saoPicture[xSi][ySj] is not modified:
    pcm_loop_filter_disabled_flag and pcm_flag[xYi][yYj] are both equal to 1.
    cu_transquant_bypass_flag is equal to 1.
    SaoTypeIdx[cIdx][rx][ry] is equal to 0.
  [Ed. (BB): Modify Highlighted Sections Prending on Future Decision Transform/Quantizaion Bypass.]
  Otherwise, if SaoTypeIdx[cIdx][rx][ry] is equal to 2, the following ordered steps apply:
    1. The values of hPos[k] and vPos[k] for k=0 . . . 1 are specified in Table 8 19 based on SaoEoClass[cIdx][rx][ry].
    2. The variable edgeIdx is derived as follows:
    The modified sample locations (xSik', ySjk') and (xYik', yYjk') are derived as follows:

$$(xSik',ySjk')=(xSi+hPos[k],ySj+vPos[k]) \quad (8\ 935)$$

$$(xYik',yYjk')=(cIdx==0)?(xSik',ySjk'): (xSik'*SubWidthC,ySjk'*SubHeightC) \quad (8\ 936)$$

If one or more of the following conditions for all sample locations (xSik', ySjk') and (xYik', yYjk') with k=0 . . . 1 are true, edgeIdx is set equal to 0:
    The sample at location (xSik', ySjk') is outside the picture boundaries.
    The sample at location (xSik', ySjk') belongs to a different tile group and one of the following two conditions is true:
    MinTbAddrZs[xYik'>>MinTb Log 2SizeY][yYjk'>>MinTb Log 2SizeY] is less than MinTbAddrZs[xYi>>MinTb Log 2SizeY][yYj>>MinTb Log 2SizeY] and tile_group_loop_filter_across_tile_groups_enabled_flag in the tile group which the sample recPicture[xSi][ySj] belongs to is equal to 0.
    MinTbAddrZs[xYi>>MinTb Log 2SizeY][yYj>>MinTb Log 2SizeY] is less than MinTbAddrZs[xYik'>>MinTb Log 2SizeY][yYjk'>>MinTb Log 2SizeY] and tile_group_loop_filter_across_tile_groups_enabled_flag in the tile group which the sample recPicture[xSik'][ySjk'] belongs to is equal to 0.
    loop_filter_across_tiles_enabled_flag is equal to 0 and the sample at location (xSik', ySjk') belongs to a different tile.
  [Ed. (BB): Modify Highlighted Sections when Tiles without Tile Groups are Incorporated]
  Otherwise, edgeIdx is derived as follows:
  The following applies:

$$edgeIdx=2+Sign(recPicture[xSi][ySj]-recPicture[xSi+hPos[0]][ySj+vPos[0]])+Sign(recPicture[xSi][ySj]-recPicture[xSi+hPos[1]][ySj+vPos[1]]) \quad (8\ 937)$$

When edgeIdx is equal to 0, 1, or 2, edgeIdx is modified as follows:

$$edgeIdx=(edgeIdx==2)?0:(edgeIdx+1) \quad (8\ 938)$$

3. The modified picture sample array saoPicture[xSi][ySj] is derived as follows:

$$saoPicture[xSi][ySj]=Clip3(0,(1<<bitDepth)-1,recPicture[xSi][ySj]+SaoOffsetVal[cIdx][rx][ry][edgeIdx]) \quad (8\ 939)$$

Otherwise (SaoTypeIdx[cIdx][rx][ry] is equal to 1), the following ordered steps apply:
    1. The variable bandShift is set equal to bitDepth−5.
    2. The variable saoLeftClass is set equal to sao_band_position[cIdx][rx][ry].
    3. The list bandTable is defined with 32 elements and all elements are initially set equal to 0. Then, four of its elements (indicating the starting position of bands for explicit offsets) are modified as follows:
    for (k=0; k<4; k++)

$$bandTable[(k+saoLeftClass)\&31]=k+1 \quad (8\ 940)$$

4. The variable bandIdx is set equal to bandTable[recPicture[xSi][ySj]>>bandShift].
    5. The modified picture sample array saoPicture[xSi][ySj] is derived as follows:

$$saoPicture[xSi][ySj]=Clip3(0,(1<<bitDepth)-1,recPicture[xSi][ySj]+SaoOffsetVal[cIdx][rx][ry][bandIdx]) \quad (8\ 941)$$

TABLE 8 19

Specification of hPos and vPos according to the sample adaptive offset class

| SaoEoClass[cIdx][rx][ry] | 0 | 1 | 2 | 3 |
|---|---|---|---|---|
| hPos[0] | −1 | 0 | −1 | 1 |
| hPos[1] | 1 | 0 | 1 | −1 |
| vPos[0] | 0 | −1 | −1 | −1 |
| vPos[1] | 0 | 1 | 1 | 1 |

The sub-block based prediction techniques discussed above can be used to obtain more accurate motion information of each sub-block when the size of sub-blocks is smaller. However, smaller sub-blocks impose a higher bandwidth requirement in motion compensation. On the other hand, motion information derived for smaller sub-block may not be accurate, especially when there are some noises in a block. Therefore, having a fixed sub-block size within one block may be suboptimal.

This document describes techniques that can be used in various embodiments to use non-uniform and/or variable sub-block sizes to address the bandwidth and accuracy problems that a fixed sub-block size introduces. The techniques, also referred to as interweaved prediction, use different ways of dividing a block so that motion information can be obtained more robustly without increasing bandwidth consumption.

Using the interweaved prediction techniques, a block is divided into sub-blocks with one or more dividing patterns. A dividing pattern represents the way to divide a block into sub-blocks, including the size of sub-blocks and the position of sub-blocks. For each dividing pattern, a corresponding prediction block may be generated by deriving motion information of each sub-block based on the dividing pattern. Therefore, in some embodiments, multiple prediction blocks may be generated by multiple dividing patterns even for one prediction direction. In some embodiments, for each prediction direction, only one dividing pattern may be applied.

Figure 13:
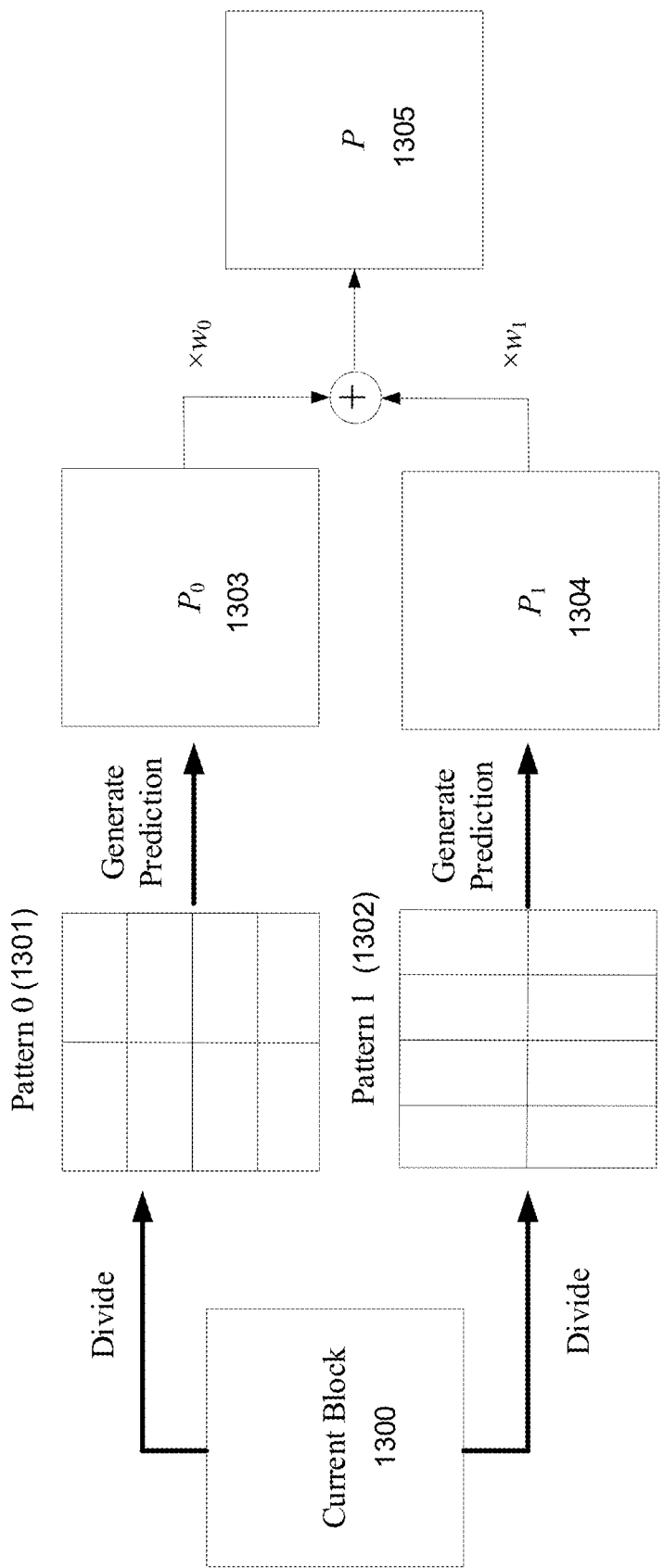
FIG. 13 shows an example of interweaved prediction with two dividing patterns in accordance with the disclosed technology.

FIG. 13 shows an example of interweaved prediction with two dividing patterns in accordance with the disclosed technology. A current block 1300 can be divided into multiple patterns. For example, as shown in FIG. 13, the current block is divided into both Pattern 0 (1301) and Pattern 1 (1302). Two prediction blocks, $P_0$(1303) and $P_1$(1304), are generated. A final prediction block P (1305) of the current block 1300 can be generated by computing a weighted sum of $P_0$(1303) and $P_1$(1304).

More generally, given X dividing patterns, X prediction blocks of the current block, denoted as $P_0, P_1, \ldots, P_{X-1}$, can be generated by sub-block based prediction with the X dividing patterns. The final prediction of the current block, denoted as P, can be generated as $$P(x, y) = \frac{\sum_{i=0}^{X-1} w_i(x, y) \times P_i(x, y)}{\sum_{i=0}^{X-1} w_i(x, y)} \qquad \text{Eq. (15)}$$

Here, (x,y) is the coordinate of a pixel in the block and $w_i(x,y)$ is the weighting value of $P_i$. By the way of example, and not by limitation, the weights can be expressed as:

$$\Sigma_{i=0}^{X-1} w_i(x,y) = (1 << N) \qquad \text{Eq. (16)}$$

N is a non-negative value. Alternatively, the bit-shifting operation in Eq. (16) can also be expressed as:

$$\Sigma_{i=0}^{X-1} w_i(x,y) = 2^N \qquad \text{Eq. (17)}$$

The sum of the weights being a power of two allows a more efficient computation of the weighted sum P by performing a bit-shifting operation instead of a floating-point division.

In the below, various implementations are presented as separate sections and items. The different sections and items are used in the present document only to facilitate ease of understanding and scope of the embodiments and techniques described in each section/item are not only limited to that section/item.

Usage of Interweaved Prediction for Different Coding Tools

Item 1: It is noted that the interweaved prediction techniques disclosed herein can be applied in one, some, or all coding techniques of sub-block based prediction. For example, the interweaved prediction techniques can be applied to affine prediction, while other coding techniques of sub-block based prediction (e.g., ATMVP, STMVP, FRUC or BIO) do not use the interweaved prediction. As another example, all of affine, ATMVP, and STMVP apply the interweaved prediction techniques disclosed herein.

Definitions of Dividing Patterns

Figure 14B:
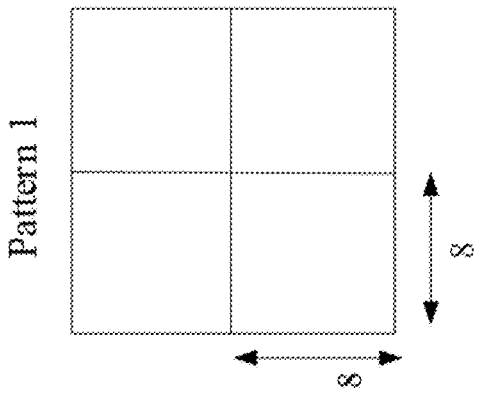
FIG. 14B shows an example dividing pattern in which a block is divided into 8×8 sub-blocks in accordance with the disclosed technology.
Figure 14D:
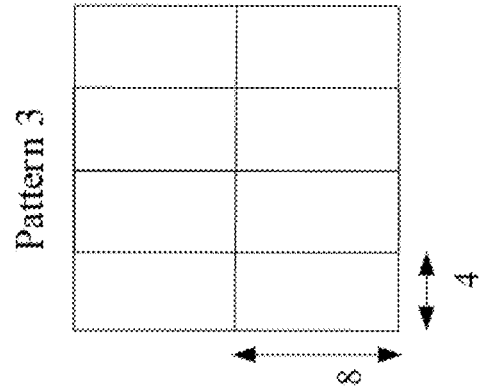
FIG. 14D shows an example dividing pattern in which a block is divided into 8×4 sub-blocks in accordance with the disclosed technology.
Figure 14A:
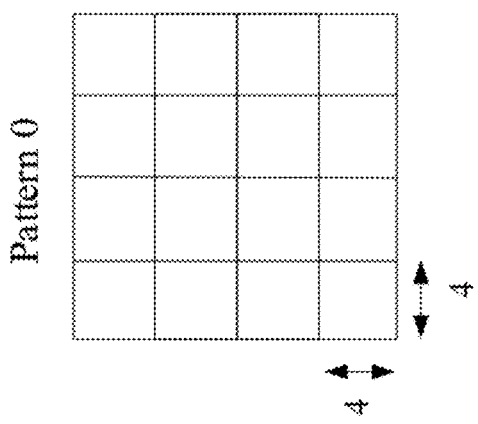
FIG. 14A shows an example dividing pattern in which block is divided into 4×4 sub-blocks in accordance with the disclosed technology.
Figure 14C:
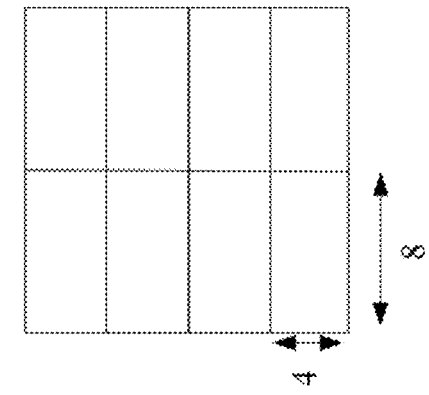
FIG. 14C shows an example dividing pattern in which a block is divided into 4×8 sub-blocks in accordance with the disclosed technology.
Figure 14E:
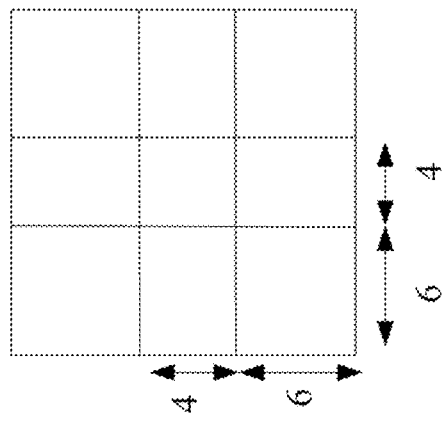
FIG. 14E shows an example dividing pattern in which a block is divided into non-uniform sub-blocks in accordance with the disclosed technology.
Figure 14F:
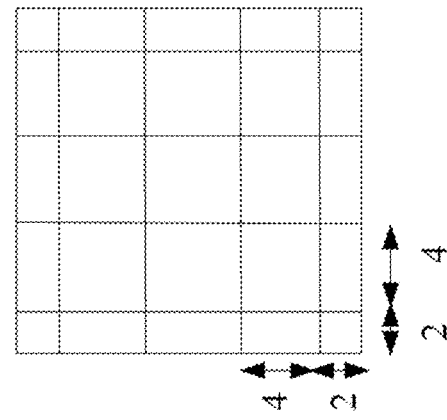
FIG. 14F shows another example dividing pattern in which a block is divided into non-uniform sub-blocks in accordance with the disclosed technology.
Figure 14G:
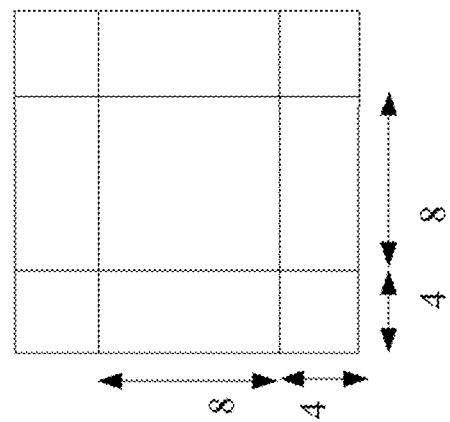
FIG. 14G shows yet another example dividing pattern in which a block is divided into non-uniform sub-blocks in accordance with the disclosed technology.

Item 2: Dividing patterns can have different shapes, or sizes, or positions of sub-blocks. In some embodiments, a dividing pattern may include irregular sub-block sizes. FIGS. 14A-G show several examples of dividing patterns for a 16×16 block. In FIG. 14A, a block is divided into 4×4 sub-blocks in accordance with the disclosed technology. This pattern is also used in JEM. FIG. 14B shows an example of a block being divided into 8×8 sub-blocks in accordance with the disclosed technology. FIG. 14C shows an example of the block being divided into 8×4 sub-blocks in accordance with the disclosed technology. FIG. 14D shows an example of the block being divided into 4×8 sub-blocks in accordance with the disclosed technology. In FIG. 14E, a portion of the block is divided into 4×4 sub-blocks in accordance with the disclosed technology. The pixels at block boundaries are divided in smaller sub-blocks with sizes like 2×4, 4×2 or 2×2. Some sub-blocks may be merged to form larger sub-blocks. FIG. 14F shows an example of adjacent sub-blocks, such as 4×4 sub-blocks and 2×4 sub-blocks, that are merged to form larger sub-blocks with sizes like 6×4, 4×6 or 6×6. In FIG. 14G, a portion of the block is divided into 8×8 sub-blocks. The pixels at block boundaries are divided in smaller sub-blocks with sizes like 8×4, 4×8 or 4×4 instead.

Item 3: The shapes and sizes of sub-blocks in sub-block based prediction can be determined based on the shape and/or size of the coding block and/or coded block information. For example, in some embodiments, the sub-blocks have a size of 4×N (or 8×N, etc.) when the current block has a size of M×N. That is, the sub-blocks have the same height as the current block. In some embodiments, the sub-blocks have a size of M×4 (or M×8, etc.) when the current block has a size of M×N. That is, the sub-blocks have the same width as the current block. In some embodiments, the sub-blocks have a size of A×B with A>B (e.g., 8×4) when the current block has a size of M×N, where M>N. Alternatively, the sub-blocks can have the size of B×A (e.g. 4×8). In some embodiments, the current block has a size of M×N. The sub-blocks have a size of A×B when M×N<=T (or Min(M, N)<=T, or Max(M, N)<=T, etc.), and the sub-blocks have a size of C×D when M×N>T (or Min(M, N)>T, or Max(M, N)>T, etc.), where A<=C and B<=D. For example, if M×N<=256, sub-blocks can be in a size of 4×4. In some implementations, the sub-blocks have a size of 8×8.

Enabling/Disabling Interweaved Prediction and Coding Process of Interweaved Prediction Item 4: In some embodiments, whether to apply interweaved prediction can be determined based on the inter-prediction direction. For example, in some embodiments, the interweaved prediction may be applied for bi-prediction but not for uni-prediction. As another example, when multiple-hypothesis is applied, the interweaved prediction may be applied for one prediction direction when there are more than one reference blocks.

Item 5: In some embodiments, how to apply interweaved prediction may also be determined based on the inter-prediction direction. In some embodiments, a bi-predicted block with sub-block based prediction is divided into sub-blocks with two different dividing patterns for two different reference lists. For example, a bi-predicted block is divided into 4×8 sub-blocks as shown in FIG. 14D when predicted from reference list 0 (L0). The same block is divided into 8×4 sub-blocks as shown in FIG. 14C when predicted from reference list 1 (L1). The final prediction P is calculated as $$P(x, y) = \frac{w^0(x, y) \times P^0(x, y) + w^1(x, y) \times P^1(x, y)}{w^0(x, y) + w^1(x, y)} \qquad \text{Eq. (18)}$$

Here, $P^0$ and $P^1$ are predictions from L0 and L1, respectively. $w^0$ and $w^1$ are weighting values for L0 and L1, respectively. As shown in Eq. (16), the weighting values can be determined as: $w^0(x,y)+w-(x,y)=1<<N$ (wherein N is non-negative integervalue). Because fewer sub-blocks are used for prediction in each direction (e.g., 4×8 sub-blocks as opposed to 8×8 sub-blocks), the computation requires less bandwidth as compared to the existing sub-block based methods. By using larger sub-blocks, the prediction results are also less susceptible to noise interference.

In some embodiments, a uni-predicted block with sub-block based prediction is divided into sub-blocks with two or more different dividing patterns for the same reference list. For example, the prediction for list L (L=0 or 1) $P^L$ is calculated as $$P^L(x, y) = \frac{\sum_{i=0}^{XL-1} w_i^L(x, y) \times P_i^L(x, y)}{\sum_{i=0}^{XL-1} w_i^L(x, y)} \qquad \text{Eq. (19)}$$

Here A is the number of dividing patterns for list L. $P_i^L$(x,y) is the prediction generated with the $i^{th}$ dividing pattern and $w_1^L$(x,y) is the weighting value of $P_i^L$ (x,y). For example, when XL is 2, two dividing patterns are applied for list L. In the first dividing pattern, the block is divided into 4×8 sub-blocks as shown in FIG. 14D. In the second dividing pattern, the block is divided into 8×4 sub-blocks as shown in FIG. 14D.

In some embodiments, a bi-predicted block with sub-block based prediction is considered as a combination of two uni-predicted block from L0 and L1 respectively. The prediction from each list can be derived as described in the above example. The final prediction P can be calculated as $$P(x, y) = \frac{a * \frac{\sum_{i=0}^{XL_0-1} w_i^0(x, y) \times P_i^0(x, y)}{\sum_{i=0}^{XL_0-1} w_i^0(x, y)} + b * \frac{\sum_{i=0}^{XL_1-1} w_i^1(x, y) \times P_i^1(x, y)}{\sum_{i=0}^{XL_1-1} w_i^1(x, y)}}{a + b} \qquad \text{Eq. (20)}$$

Here parameters a and b are two additional weights applied to the two internal prediction blocks. In this specific example, both a and b can be set to 1. Similar to the example above, because fewer sub-blocks are used for prediction in each direction (e.g., 4×8 sub-blocks as opposed to 8×8 sub-blocks), the bandwidth usage is better than or on par with the existing sub-block based methods. At the same time, the prediction results can be improved by using larger sub-blocks.

In some embodiments, a single non-uniform pattern can be used in each uni-predicted block. For example, for each list L (e.g., L0 or L1), the block is divided into a different pattern (e.g., as shown in FIG. 14E or FIG. 14F). The use of a smaller number of sub-blocks reduces the demand on bandwidth. The non-uniformity of the sub-blocks also increases robustness of the prediction results.

In some embodiments, for a multiple-hypothesis coded block, there can be more than one prediction blocks generated by different dividing patterns for each prediction direction (or reference picture list). Multiple prediction blocks can be used to generate the final prediction with additional weights applied. For example, the additional weights may be set to 1/M wherein M is the total number of generated prediction blocks.

Item 6: In some embodiments, the encoder can determine whether and how to apply the interweaved prediction. The encoder then can transmit information corresponding to the determination to the decoder at a sequence level, a picture level, a view level, a slice level, a Coding Tree Unit (CTU) (also known as a Largest Coding Unit (LCU)) level, a CU level, a PU level, a Tree Unit (TU) level, tile level, tile group level, or a region level (which may include multiple CUs/PUs/Tus/LCUs). The information can be signaled in a Sequence Parameter Set (SPS), a view parameter set (VPS), a Picture Parameter Set (PPS), a Slice Header (SH), a picture header, a sequence header, or tile level or tile group level, a CTU/LCU, a CU, a PU, a TU, or a first block of a region.

In some implementations, the interweaved prediction applies to existing sub-block methods like the affine prediction, ATMVP, STMVP, FRUC, or BIO. In such cases, no additional signaling cost is needed. In some implementations, new sub-block merge candidates generated by the interweaved prediction can be inserted into a merge list, e.g., interweaved prediction+ATMVP, interweaved prediction+STMVP, interweaved prediction+FRUC etc. In some implementations, a flag may be signaled to indicate whether interweaved prediction is used or not. In one example, a flag signaled to indicate whether interweaved prediction is used or not, if the current block is affine inter-coded. In some implementations, a flag may be signaled to indicate whether interweaved prediction is used or not, if the current block is affine merge-coded and applies uni-prediction. In some implementations, a flag may be signaled to indicate whether interweaved prediction is used or not, if the current block is affine merge-coded. In some implementations, interweaved prediction may be always used if the current block is affine merge-coded and applies uni-prediction. In some implementations, interweaved prediction may be always used if the current block is affine merge-coded.

In some implementations, the flag to indicate whether interweaved prediction is used or not may be inherited without being signaled. Some examples include:

(i) In one example, the inheritance may be used if the current block is affine merge-coded.

(ii) In one example, the flag may be inherited from the flag of the neighboring block where the affine model is inherited from.

(iii) In one example, the flag is inherited from a predefined neighboring block such as the left or above neighboring block.

(iv) In one example, the flag may be inherited from the first encountered affine-coded neighboring block.

(v) In one example, the flag may be inferred to be zero if no neighbouring block is affine-coded.

(vi) In one example, the flag may be only inherited when the current block applies uni-prediction.

(vii) In one example, the flag may be only inherited when the current block and the neighboring block to be inherited from are in the same CTU.

(viii) In one example, the flag may be only inherited when the current block and the neighboring block to be inherited from are in the same CTU row.

(ix) In one example, the flag may not be inherited from the flag of the neighboring block when the affine model is derived from a temporal neighboring block.

(x) In one example, the flag may not be inherited from the flag of a neighboring block which is not located in the same LCU or LCU row or video data processing unit (such as 64×64, or 128×128).

(xi) In one example, how to signal and/or derive the flag may depend on the block dimension of the current block and/or coded information.

In some implementations, interweaved prediction is not applied if the reference picture is the current picture. For example, the flag to indicate whether interweaved prediction is used or not is not signaled if the reference picture is the current picture.

In some embodiments, the dividing patterns to be used by the current block can be derived based on information from spatial and/or temporal neighboring blocks. For example, instead of relying on the encoder to signal the relevant information, both encoder and decoder can adopt a set of predetermined rules to obtain dividing patterns based on temporal adjacency (e.g., previously used dividing patterns of the same block) or spatial adjacency (e.g., dividing patterns used by neighboring blocks).

Weighting Values

Item 7: In some embodiments, the weighting values w can be fixed. For example, all dividing patterns can be weighted equally: $w_i(x,y)=1$.

Item 8: In some embodiments, the weighting values can be determined based on positions of blocks as well as the dividing patterns used. For example, $w_i(x,y)$ may be different for different (x,y). In some embodiments, the weighting values may further depend on the sub-block prediction based coding techniques (e.g., affine, or ATMVP) and/or other coded information (e.g., skip or non-skip modes, and/or MV information).

Item 9: In some embodiments, the encoder can determine the weighting values, and transmit the values to the decoder at sequence level, picture level, slice level, CTU/LCU level, CU level, PU level, or region level (which may include multiple CUs/PUs/Tus/LCUs). The weighting values can be signaled in a Sequence Parameter Set (SPS), a Picture Parameter Set (PPS), a Slice Header (SH), a CTU/LCU, a CU, a PU, or a first block of a region. In some embodiments, the weighting values can be derived from the weighting values of a spatial and/or temporal neighboring block.

Partial Interweaved Prediction

Item 10: In some embodiments, partial interweaved prediction may be achieved as follow.

In some embodiments, interweaved prediction is applied to a part of the current block. Prediction samples at some positions are calculated as the weighted sum of two or more sub-block based predictions. Prediction samples at other positions are not used for the weighted sum. For example, these prediction samples are copied from the sub-block based prediction with a certain dividing pattern.

In some embodiments, the current block is predicted by sub-block based prediction P1 and P2 with dividing pattern D0 and dividing pattern D1, respectively. The final prediction is calculated as P=w0×P0+w1×P1. At some positions, w0≠0 and w1≠0. But at some other positions, w0=1 and w1=0, that is, interweaved prediction is not applied at those positions.

Figure 15B:
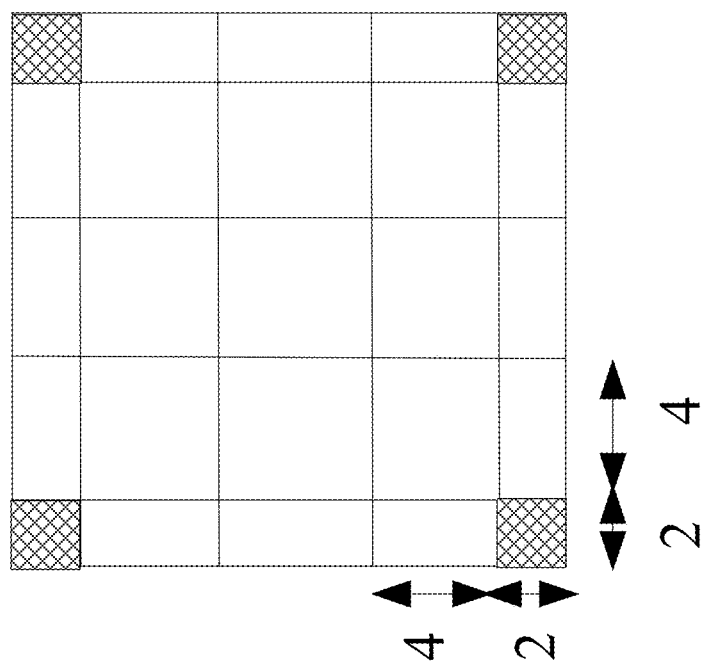
FIGS. 15A-15D show example embodiments of a partial interweaved prediction.
Figure 15A:
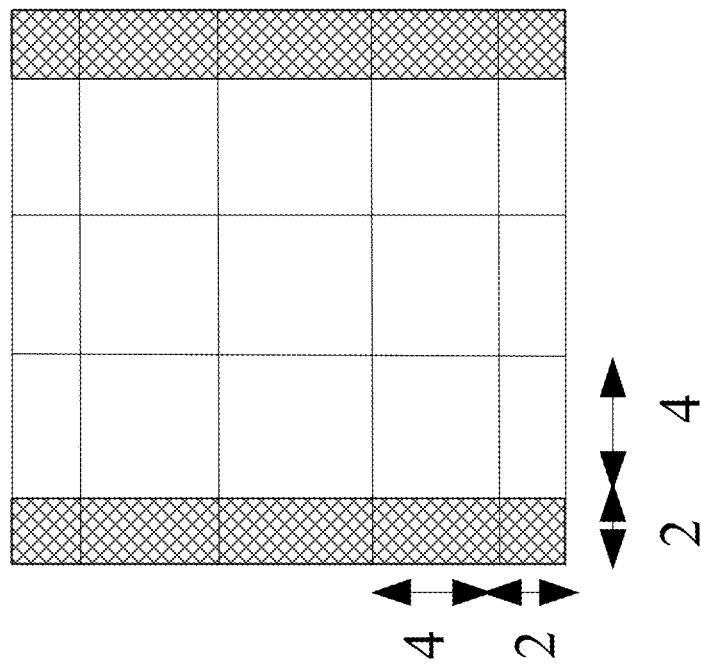

In some embodiments, interweaved prediction is not applied on four corner sub-blocks as shown in FIG. 15A.

In some embodiments, interweaved prediction is not applied on the left-most column of sub-blocks and right-most column of sub-blocks as shown in FIG. 15B.

Figure 15D:
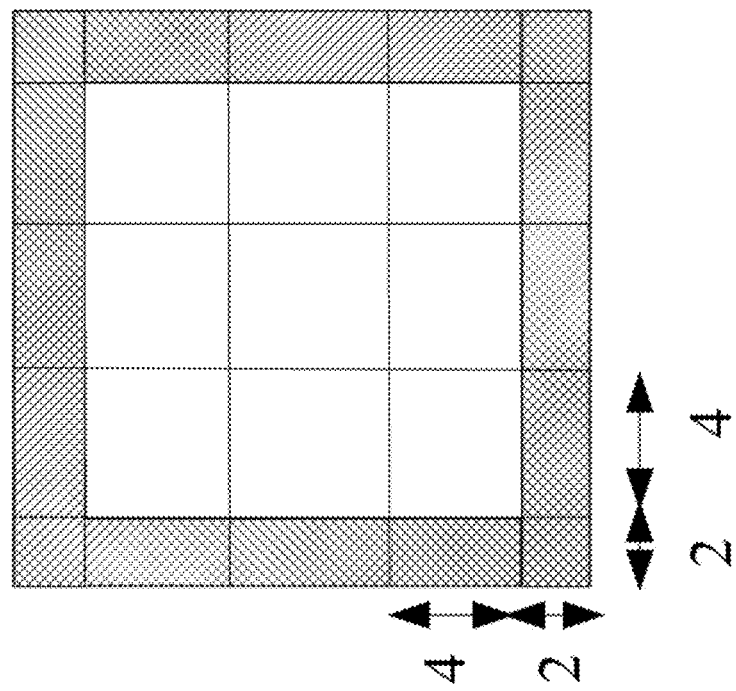
Figure 15C:
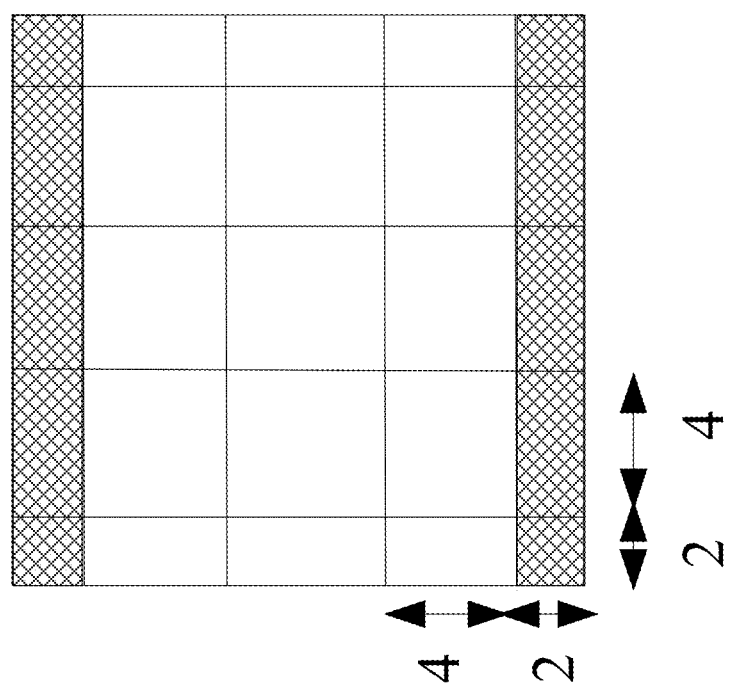

In some embodiments, interweaved prediction is not applied on the top-most row of sub-blocks and bottom-most row of sub-blocks as shown in FIG. 15C.

In some embodiments, interweaved prediction is not applied on the top-most row of row of sub-blocks, bottom-most row of sub-blocks the left-most column of sub-blocks and right-most column of sub-blocks as shown in FIG. 15D.

In some embodiments, whether to and how to apply partial interweaved prediction may depend on the size/shape of the current block.

For example, in some embodiments, interweaved prediction is applied to the whole block if the size of the current block satisfies certain conditions; otherwise, interweaved prediction is applied to a part (or some parts) of the block. The conditions include but not limited to: (suppose the width and height of the current block is W and H respectively and T, T1, T2 are integer values):

$W>=T1$ and $H>=T2$;

$W<=T1$ and $H<=T2$;

$W>=T1$ or $H>=T2$;

$W<=T1$ or $H<=T2$;

$W+H>=T$ $W+H<=T$ $W \times H>=T$ $W \times H<=T$

In some embodiments, the partial interweaved prediction is applied to a portion of the current block that is smaller than the current block. For example, in some embodiments, the portion of the block excludes sub-blocks as follows. In some embodiments, interweaved prediction is not applied on the left-most column of sub-blocks and right-most column of sub-blocks as shown in FIG. 15B if W>H; Otherwise, interweaved prediction is not applied on the top-most row of sub-blocks and bottom-most row of sub-blocks as shown in FIG. 15C.

For example, in some embodiments, interweaved prediction is not applied on the left-most column of sub-blocks and right-most column of sub-blocks as shown in FIG. 15B if W>H; Otherwise, interweaved prediction is not applied on the top-most row of sub-blocks and bottom-mostrow of sub-blocks as shown in FIG. 15C.

In some embodiments, whether and how to apply interweaved prediction may be different for different regions in a block. For example, suppose the current block is predicted by sub-block based prediction P1 and P2 with dividing pattern D0 and dividing pattern D1, respectively. The final prediction is calculated as $P(x,y)=w0 \times P0(x,y)+w1 \times P1(x,y)$. If the position (x,y) belongs to a sub-block with dimensions S0×H0 with the dividing pattern D0; and belongs to a sub-block S1×H1 with the dividing pattern D1. If one or several following conditions are satisfied, set w0=1 and w1=0 (e.g., interweaved prediction is not applied at this position):

$S1<T1$;

$H1<T2$;

$S1<T1$ and $H1<T2$; or $S1<T1$ or $H1<T2$,

Herein, T1 and T2 are integers. For example, T1=T2=4.

Examples of Techniques Incorporated within Encoder Embodiments

Item 11: In some embodiments, interweaved prediction is not applied in the motion estimation (ME) process.

For example, interweaved prediction is not applied in the ME process for the 6-parameter affine prediction.

For example, interweaved prediction is not applied in the ME process if the size of the current block satisfies certain conditions such as follows. Here, it is assumed that the width and height of the current block is W and H respectively and T, T1, T2 are integer values:

$W >= T1$ and $H >= T2$;

$W <= T1$ and $H <= T2$;

$W >= T$ or $H >= T2$;

$W <= T1$ or $H <= T2$;

$W+H >= T$ $W+H <= T$ $W \times H >= T$ $W \times H <= T$

For example, interweaved prediction is omitted in the ME process if the current block is split from a parent block, and the parent block does not choose affine mode at encoder.

Alternatively, affine mode is not checked at encoder if the current block is split from a parent block, and the parent block does not choose affine mode at encoder.

Exemplary Embodiments for MV Derivation

In the following examples, SatShift(x, n) is defined as $$SatShift(x, n) = \begin{cases} (x + offset0) >> n & \text{if } x \geq 0 \\ -((-x + offset1) >> n) & \text{if } x < 0 \end{cases}$$

Shift(x, n) is defined as Shift(x, n)=(x+offset0)>>n. In one example, offset0 and/or offset1 are set to (1<<n)>>1 or (1<<(n−1)). In another example, offset0 and/or offset1 are set to 0.

Figures 16A, 16B:
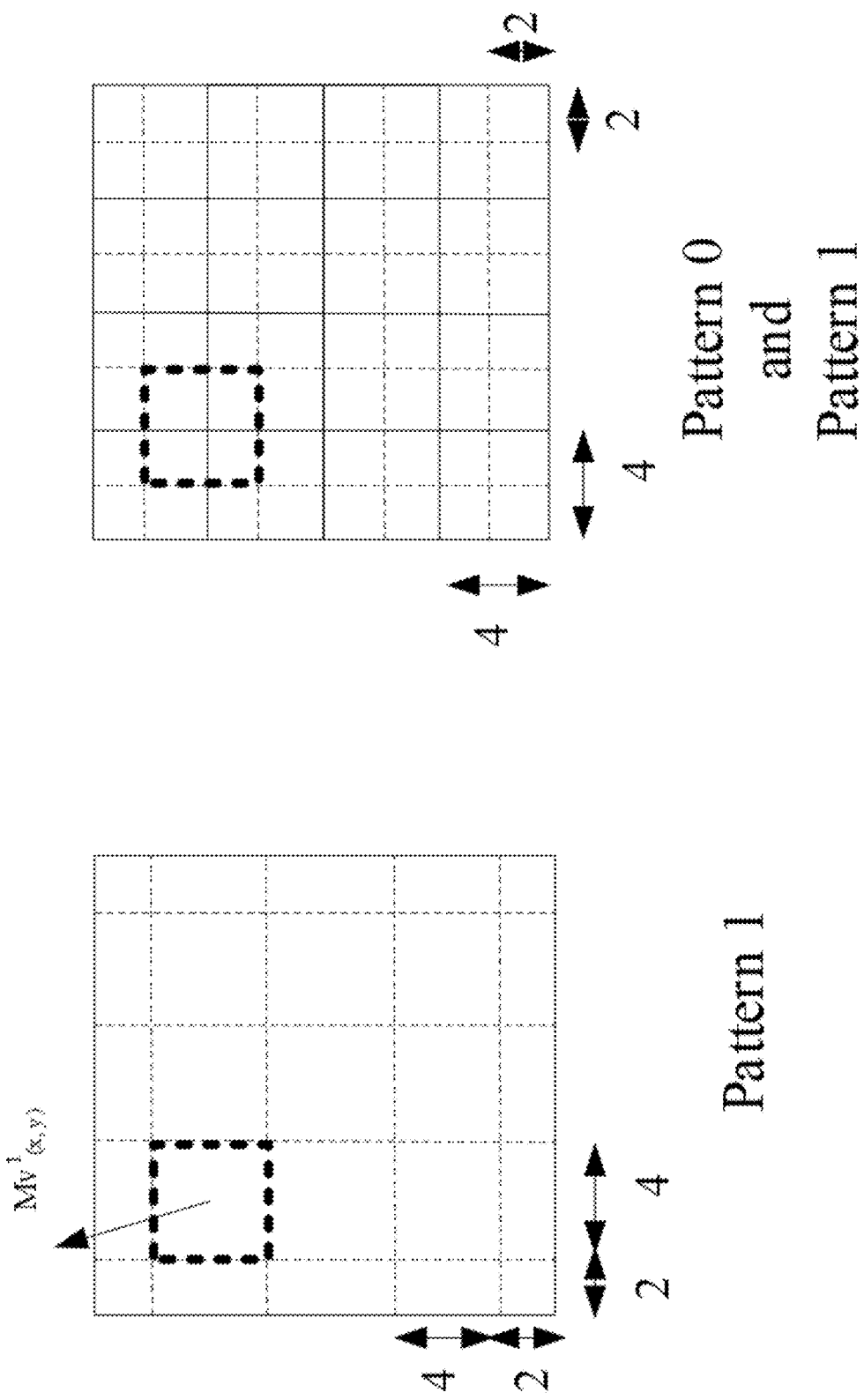

Item 12: In some embodiments, the MV of each sub-block within one dividing pattern may be derived from the affine model (such as with Eq.(1)) directly, or it may be derived from MVs of sub-blocks within another dividing pattern.
  (a) In one example, the MV of a sub-block B with dividing pattern 0, may be derived from MVs of all or some of the sub-blocks within dividing pattern 1, that overlap with sub-block B.
  (b) FIGS. 16A-16C show some examples. In FIG. 16A, MV1(x,y) of a specific sub-block within dividing pattern 1 is to be derived. FIG. 16B shows dividing pattern 0 (solid) and dividing pattern 1 (dashed) in the block, indicating that there are four sub-blocks with in dividing pattern 0 overlapping with the specific sub-block within dividing pattern 1. FIG. 16C shows the four MVs: $MV^0_{(x-2,y-2)}$, $MV^0_{(x+2,y-2)}$, $MV^0_{(x-2,y+2)}$ and $MV^0_{(x+2,y+2)}$ of the four sub-blocks with in dividing pattern 0 overlapping with the specific sub-block within dividing pattern 1. Then $MV^1_{(x,y)}$ will be derived from $MV^0_{(x-2,y-2)}$, $MV^0_{(x+2,y-2)}$, $MV^0_{(x-2,y+2)}$ and $MV^0_{(x+2,y+2)}$.
  (c) Suppose MV' of one sub-block within dividing pattern 1 is derived from MV0, MV1, MV2, . . . MVk of k−1 sub-blocks within dividing pattern 0. MV' may be derived as:
    (i) MV'=MVn, n is any of 0 . . . k.
    (ii) MV'=f(MV0, MV1, MV2, . . . , Vk). f is a linear function.
    (iii) MV'=f(MV0, MV1, MV2, . . . , MVk). f is a non-linear function.
    (iv) MV'=Average(MV0, MV1, MV2, . . . , Vk). Average is an averaging operation.
    (v) MV'=Median(MV0, MV1, MV2, . . . , MVk). Median is an operation to get the median value.
    (vi) MV'=Max(MV0, MV1, MV2, . . . , MVk). Max is an operation to get the maximum value.
    (vii) MV'=Min(MV0, MV1, MV2, . . . , MVk). Min is an operation to get the minimum value.
    (viii) MV'=MaxAbs(MV0, MV1, MV2, . . . , Vk). MaxAbs is an operation to get the value with the maximum absolute value.
    (ix) MV'=MinAbs(MV0, MV1, MV2, . . . , Vk). MinAbs is an operation to get the value with the minimum absolute value.
    (x) Take FIG. 16A as an example, $MV^1_{(x,y)}$ may be derived as:
      1. $MV^1_{(x,y)}$=SatShift(MV0(x−2,y−2)+MV0(x+2,y−2)+MV0(x−2,y+2)+MV0(x+2,y+2), 2);
      2. $MV^1_{(x,y)}$=Shift(MV0(x−2,y−2)+MV0(x+2,y−2)+MV0(x−2,y+2)+MV0(x+2,y+2), 2);
      3. $MV^1_{(x,y)}$=SatShift(MV0(x−2,y−2)+MV0(x+2,y−2), 1);
      4. $MV^1_{(x,y)}$=Shift(MV0(x−2,y−2)+MV0(x+2,y−2), 1);
      5. $MV^1_{(x,y)}$=SatShift(MV0(x−2,y+2)+MV0(x+2,y+2), 1);
      6. $MV^1_{(x,y)}$=Shift(MV0(x−2,y+2)+MV0(x+2,y+2), 1);
      7. $MV^1_{(x,y)}$=SatShift(MV0(x−2,y−2)+MV0(x+2,y+2), 1);
      8. $MV^1_{(x,y)}$=Shift(MV0(x−2,y−2)+MV0(x+2,y+2), 1);
      9. $MV^1_{(x,y)}$=SatShift(MV0(x−2,y−2)+MV0(x−2,y+2), 1);
      10. $MV^1_{(x,y)}$=Shift(MV0(x−2,y−2)+MV0(x−2,y+2), 1);
      11. $MV^1_{(x,y)}$=SatShift(MV0(x+2,y−2)+MV0(x+2,y+2), 1);
      12. $MV^1_{(x,y)}$=Shift(MV0(x+2,y−2)+MV0(x+2,y+2), 1);
      13. $MV^1_{(x,y)}$=SatShift(MV0(x+2,y−2)+MV0(x−2,y+2), 1);
      14. $MV^1_{(x,y)}$=Shift(MV0(x+2,y−2)+MV0(x−2,y+2), 1);
      15. $MV^1_{(x,y)}=MV^0_{(x-2,y-2)}$;
      16. $MV^1_{(x,y)}=MV^0_{(x+2,y-2)}$;
      17. $MV^1_{(x,y)})=MV^0_{(x-2,y+2)}$; or
      18. $MV^1_{(x,y)}=MV^0_{(x+2,y+2)}$.

Figure 17A:
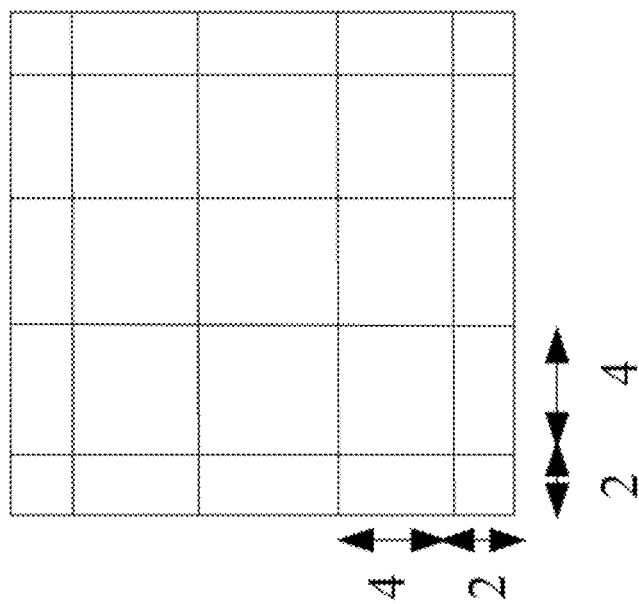
Figure 17A:
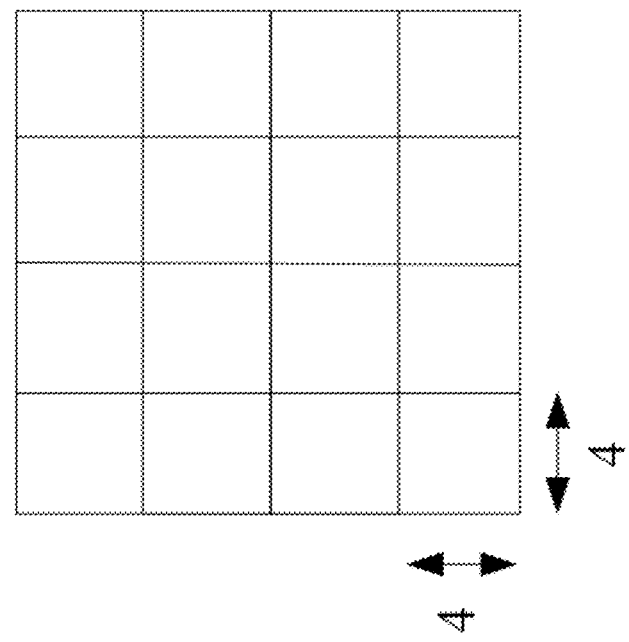

Item 13: In some embodiments, how to select the dividing pattern may depend on the width and height of the current block.
  (a) For example, if width>T1 and height>T2 (e.g. T1=T2=4), two dividing patterns are selected. FIG. 17A shows an example of two dividing patterns.
  (b) For example, if height<=T2 (e.g. T2=4), another two dividing patterns are selected. FIG. 17B shows an example of two dividing patterns.
  (c) For example, if width<=T1 (e.g. T1=4), yet another two dividing patterns are selected. FIG. 17C shows an example of two dividing patterns.

Item 14: In some embodiments, the MV of each sub-block within one dividing pattern of one color component C1 may be derived from MVs of sub-blocks within another dividing pattern of another color component C0.
  (a) For example, C1 refers to color component coded/decoded after another color component, such as Cb or Cr or U or V or R or B.

(b) For example, C0 refers to color component coded/decoded before another color component, such as Y or G.

(c) In one example, how to derive MV of a sub-block within one dividing pattern of one color component from MVs of MVs of sub-blocks within another dividing pattern of another color component may depend on the color format, such as 4:2:0, or 4:2:2, or 4:4:4.

(d) In one example, the MV of a sub-block B in color component C1 with dividing pattern C1Pt (t=0 or 1), may be derived from MVs of all or some of the sub-blocks in color component C0 within dividing pattern C0Pr (r=0 or 1), that overlap with sub-block B, after down-scaling or up-scaling the coordinates according to the color format.

(i) In one example, C0Pr is always equal to C0P0.

Figure 18A:
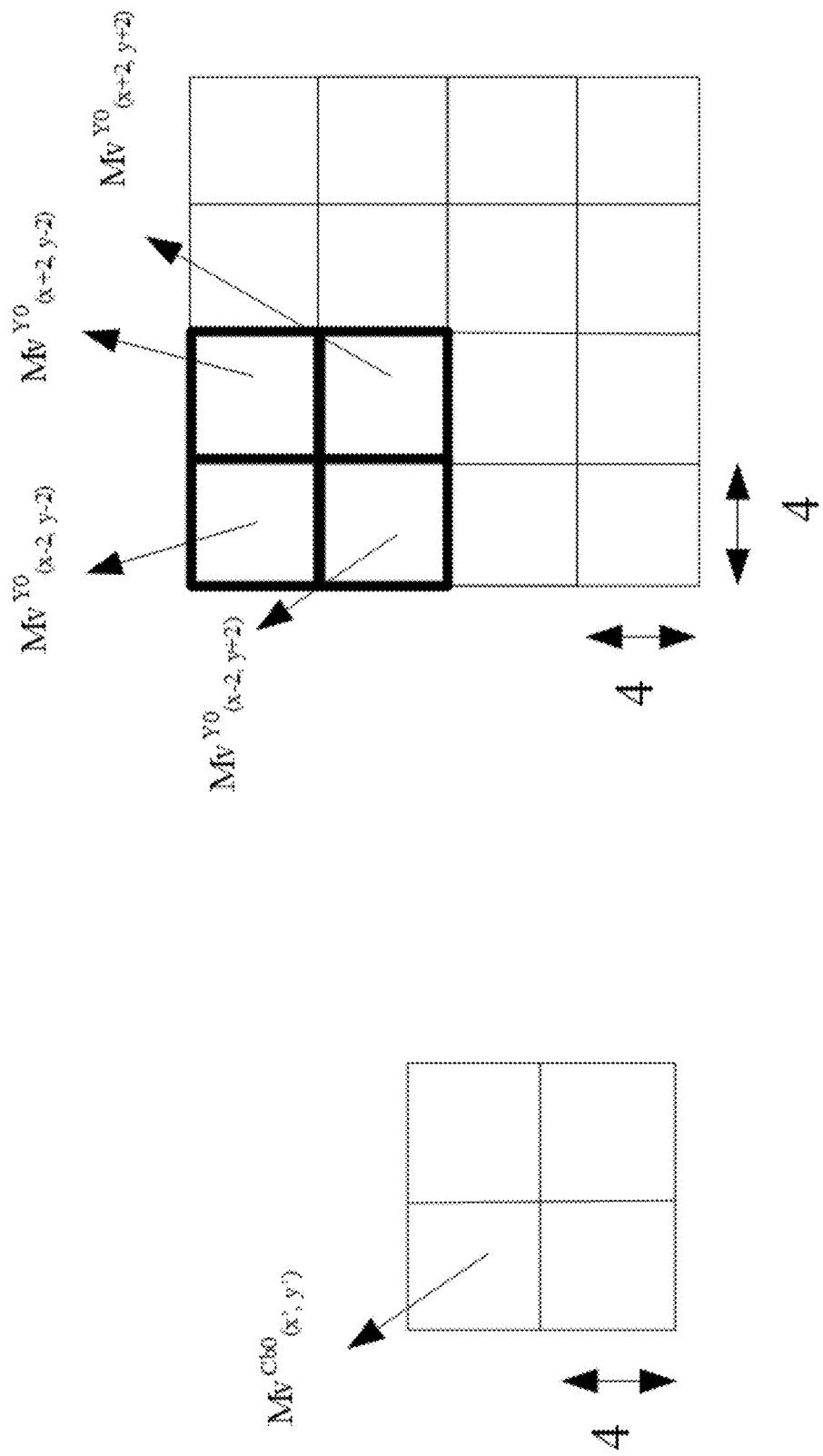
FIGS. 18A and 18B show example embodiments of deriving MVs of sub-blocks in one component within a dividing pattern from MVs of sub-block in another component within another dividing pattern.
Figure 18B:
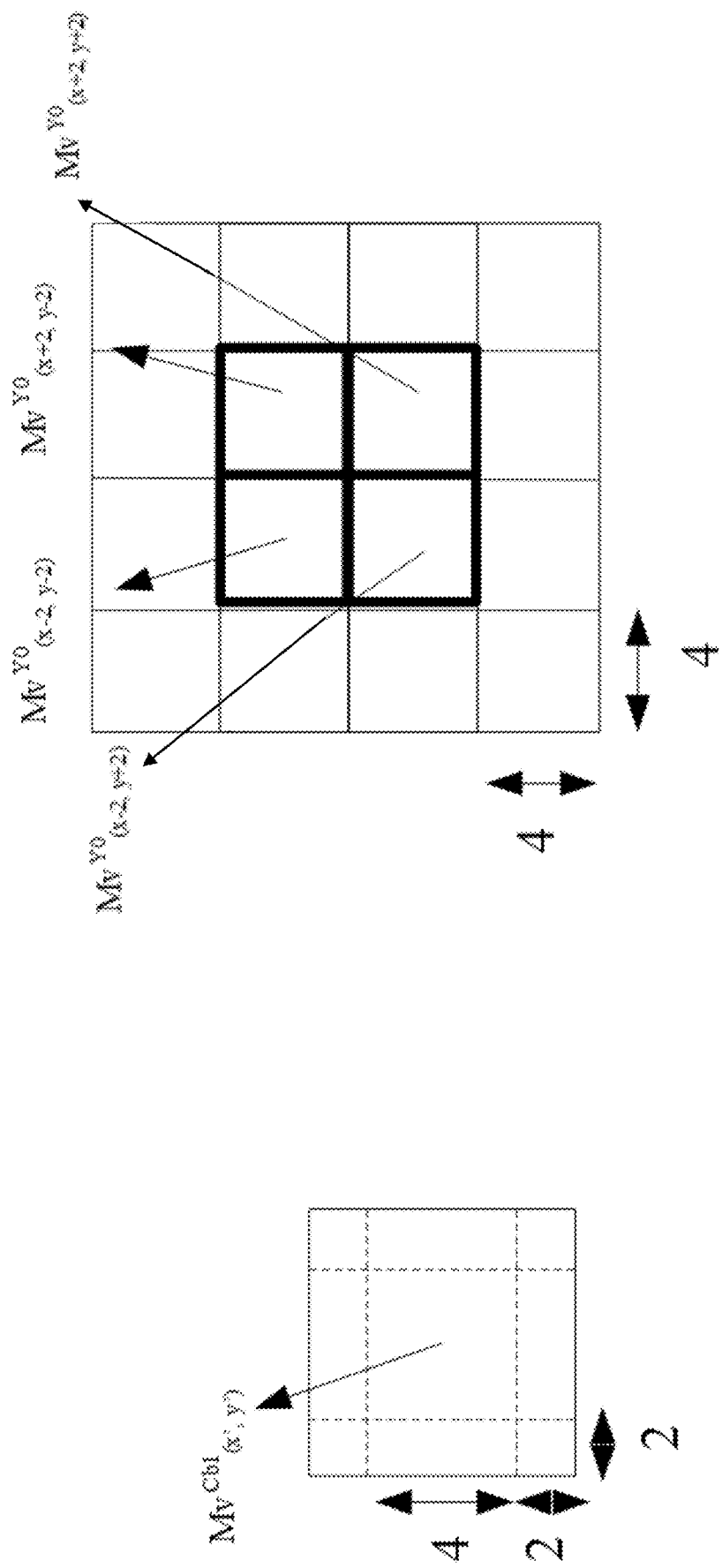

(e) FIGS. 18A and 18B show two examples. The color format is 4:2:0. MVs of sub-blocks in Cb component are derived from MVs of sub-blocks in Y component.

(i) In FIG. 18A left, $MV^{Cb0}_{(x',y')}$ of a specific Cb sub-block B within dividing pattern 0 is to be derived. FIG. 18A right shows four Y sub-blocks with in dividing pattern 0, which are overlapped with Cb sub-block B when down-scaled by 2:1. Suppose x=2*x' and y=2*y', four Vs: $MV^0_{(x-2,y-2)}$, $MV^0_{(x+2,y-2)}$, $MV^0_{(x-2,y+2)}$ and $MV^0_{(x+2,y+2)}$ of the four Y sub-blocks with in dividing pattern 0 are used to derive the $MV^{Cb0}_{(x',y')}$ (ii) In FIG. 18B left, $MV^{Cb0}_{(x',y')}$ of a specific Cb sub-blockB within dividing pattern 1 is to be derived. FIG. 18B right shows four Y sub-blocks with in dividing pattern 0, which are overlapped with Cb sub-blockB when down-scaled by 2:1. Suppose x=2*x' and y=2*y', four Vs: $MV^0_{(x-2,y-2)}$, $MV^0_{(x+2,y-2)}$, $MV^0_{(x-2,y+2)}$ and $MV^0_{(x+2,y+2)}$ of the four Y sub-blocks with in dividing pattern 0 are used to derive the $MV^{Cb0}_{(x',y')}$ (f) Suppose MV' of one sub-block of color component C1 is derived from MV0, MV1, MV2, . . . MVk of k−1 sub-blocks of color component C0. MV' may be derived as:

(i) MV'=MVn, n is any of 0 . . . k.
  (ii) MV'=f(MV0, MV1, MV2, . . . , Vk). f is a linear function.
  (iii) MV'=f(MV0, MV1, MV2, . . . , MVk). f is a non-linear function.
  (iv) MV'=Average(MV0, MV1, MV2, . . . , Vk). Average is an averaging operation.
  (v) MV'=Median(MV0, MV1, MV2, . . . , MVk). Median is an operation to get the median value.
  (vi) MV'=Max(MV0, MV1, MV2, . . . , MVk). Max is an operation to get the maximum value.
  (vii) MV'=Min(MV0, MV1, MV2, . . . , MVk). Min is an operation to get the minimum value.
  (viii) MV'=MaxAbs(MV0, MV1, MV2, . . . , Vk). MaxAbs is an operation to get the value with the maximum absolute value.
  (ix) MV'=MinAbs(MV0, MV1, MV2, . . . , MVk). MinAbs is an operation to get the value with the minimum absolute value.
  (x) Take FIGS. 18A and 18B as examples, $MV^{Cbt}_{(x',y')}$ with t=0 or 1, may be derived as:
    1. $MV^{Cbt}_{(x',y')}$=SatShift(MV0(x−2,y−2)+MV0(x+2,y−2)+MV0(x−2,y+2)+MV0(x+2,y+2), 2);
    2. $MV^{Cbt}_{(x',y')}$=Shift(MV0(x−2,y−2)+MV0(x+2,y−2)+MV0(x−2,y+2)+MV0(x+2,y+2), 2);
    3. $MV^{Cbt}_{(x',y')}$=SatShift(MV0(x−2,y−2)+MV0(x+2,y−2), 1);
    4. $MV^{Cbt}_{(x',y')}$=Shift(MV0(x−2,y−2)+MV0(x+2,y−2), 1);
    5. $MV^{Cbt}_{(x',y')}$=SatShift(MV0(x−2,y+2)+MV0(x+2,y+2), 1);
    6. $MV^{Cbt}_{(x',y')}$=Shift(MV0(x−2,y+2)+MV0(x+2,y+2), 1);
    7. $MV^{Cbt}_{(x',y')}$=SatShift(MV0(x−2,y−2)+MV0(x+2,y+2), 1);
    8. $MV^{Cbt}_{(x',y')}$=Shift(MV0(x−2,y−2)+MV0(x+2,y+2), 1);
    9. $MV^{Cbt}_{(x',y')}$=SatShift(MV0(x−2,y−2)+MV0(x−2,y+2), 1);
    10. $MV^{Cbt}_{(x',y')}$=Shift(MV0(x−2,y−2)+MV0(x−2,y+2), 1);
    11. $MV^{Cbt}_{(x',y')}$=SatShift(MV0(x+2,y−2)+MV0(x+2,y+2), 1);
    12. $MV^{Cbt}_{(x',y')}$=Shift(MV0(x+2,y−2)+MV0(x+2,y+2), 1);
    13. $MV^{Cbt}_{(x',y')}$=SatShift(MV0(x+2,y−2)+MV0(x−2,y+2), 1);
    14. $MV^{Cbt}_{(x',y')}$=Shift(MV0(x+2,y−2)+MV0(x−2,y+2), 1);
    15. $MV^{Cbt}_{(x',y')}$=$MV^0_{(x-2,y-2)}$;
    16. $MV^{Cbt}_{(x',y')}$=$MV^0_{(x+2,y-2)}$;
    17. $MV^{Cbt}_{(x',y')}$=$MV^0_{(x-2,y+2)}$;
    18. $MV^{Cbt}_{(x',y')}$=$MV^0_{(x+2,y+2)}$;

Example Embodiments for Interweaved Prediction for Bi-Prediction

Item 15: In some embodiments, when interweaved prediction is applied on bi-prediction, the following methods may be applied to save the internal bit-depth increased due to different weights:

(a) For list X (x=0 or 1), $P^X(x,y)$=Shift(W0(x,y)*$P^X_0$(x,y)+W1(x,y)*$P^X_1$(x,y), SW), where $P^X(x,y)$ is the prediction for list X, $P^X_0$(x,y) and $P^X_1$(x,y) are the prediction for list X with dividing pattern 0 and dividing pattern 1, respectively. W0 and W1 are integers representing the interweaved prediction weighting values and SW represents the precision of the weighting values.

(b) The final prediction value is derived as P(x,y)=Shift(Wb0(x,y)*$P^0$(x,y)+Wb1(x,y)*$P^1$(x,y), SWB), where Wb0 and Wb1 are integers used in weighted bi-prediction and SWB is the precision. When there is no weighted bi-prediction, Wb0=Wb1=SWB=1.

(c) In some embodiments, $P^X_0$(x,y) and $P^X_1$(x,y) may be kept the precision of interpolation filtering. For example, they may be unsigned integers with 16 bits. The final prediction value is derived as P(x,y)=Shift(Wb0(x,y)*$P^0$(x,y)+Wb1(x,y)*$P^1$(x,y), SWB+PB), where PB is the additional precision from interpolation filtering, e.g., PB=6. In this case, W0(x,y)*$P^X_0$(x,y) or W1(x,y)*$P^X_1$(x,y) may exceed 16 bits. It is proposed that $P^X_0$(x,y) and $P^X_1$(x,y) are right-shift to a lower precision first, to avoid exceeding 16 bits.

(i) For example, For list X (x=0 or 1), $P^X(x,y)$=Shift(W0(x,y)*$PL^X_0$(x,y)+W1(x,y)*$PL^X_1$(x,y), W), where $PL^X_0$(x,y)=Shift($P^X_0$(x,y), M), $PL^X_1$(x,y)=Shift($P^X_1$(x,y), M). And the final prediction is derived as P(x,y)=Shift(Wb0(x,y)*$P^0$(x,y)+Wb1(x,y)*$P^1$(x,y), SWB+PB−M). For example, M is set to be 2 or 3.

(d) The above mentioned methods may be also applicable to other bi-prediction methods with different weighting factors for two reference prediction blocks, such as Generalized Bi-Prediction (GBi, wherein weights could be e.g., ⅜, ⅝), weighted prediction (wherein weights could be a very large value).
(e) The above mentioned methods may be also applicable to other multiple hypothesis uni-prediction or bi-prediction methods with different weighting factors for different reference prediction blocks.

Example Embodiments for Block Size Dependency

Item 16: Whether and/or how to apply interweaved prediction may depend on block width W and height H.
  a. In one example, whether and/or how to apply interweaved prediction may depend on the size of VPDU (Video Processing Data Unit which typically represent the maximumly allowed block size for processing in hardware design).
  b. In one example, when interweaved prediction is disabled for a certain block dimension (or a block with certain coded information), the original prediction method may be utilized.
    i. Alternatively, affine mode may be directly disabled for such kind of blocks. c. In one example, interweaved prediction cannot be used when W>T1 and H>T2. For example, T1=T2=64;
  d. In one example, interweaved prediction cannot be used when W>T1 or H>T2. For example, T1=T2=64;
  e. In one example, interweaved prediction cannot be used when W*H>T. For example, T=64*64;
  f. In one example, interweaved prediction cannot be used when W<T1 and H<T2. For example, T1=T2=16;
  g. In one example, interweaved prediction cannot be used when W<T1 or H>T2. For example, T1=T2=16;
  h. In one example, interweaved prediction cannot be used when W*H<T. For example, T=16*16;
  i. In one example, for a sub-block which is not located at block boundary (e.g., coding unit), interweaved affine may be disabled for this sub-block. Alternatively, furthermore, the prediction results with original affine prediction method may be directly used as the final prediction for this sub-block.
  j. In one example, interweaved prediction is used in a different way when W>T1 and H>T2. For example, T1=T2=64;
  k. In one example, interweaved prediction is used in a different way when W>T1 or H>T2. For example, T1=T2=64;
  l. In one example, interweaved prediction is used in a different way when W*H>T. For example, T=64*64;
  m. In one example, interweaved prediction is used in a different way when W<T1 and H<T2. For example, T1=T2=16;
  n. In one example, interweaved prediction is used in a different way when W<T1 or H>T2. For example, T1=T2=16;
  o. In one example, interweaved prediction is used in a different way when W*H<T. For example, T=16*16;
  p. In one example, when H>X (e.g. H is equal to 128, X=64), the interweaved prediction is not applied on samples belonging to a sub-blocks crossing the upper W*(H/2) partition and the lower W*(H/2) partition of the current block;
  q. In one example, when W>X (e.g. W is equal to 128, X=64), the interweaved prediction is not applied on samples belonging to a sub-blocks crossing the left (W/2)*H partition and the right (W/2)*H partition of the current block;
  r. In one example, when W>X and H>Y (e.g. W=H=128, X=Y=64),
    i. the interweaved prediction is not applied on samples belonging to a sub-blocks crossing the left (W/2)*H partition and the right (W/2)*H partition of the current block;
    ii. the interweaved prediction is not applied on samples belonging to a sub-blocks crossing the upper W*(H/2) partition and the lower W*(H/2) partition of the current block;
  s. In one example, interweaved prediction is only enabled for blocks with specific sets of width and/or height.
  t. In one example, interweaved prediction is only disabled for blocks with specific sets of width and/or height.
  u. In one example, interweaved prediction is only used for specific types of picture/slice/tile group/tile/or other kinds of video data units.
    i. For example, interweaved prediction is only used for P picture or B picture;
    ii. For example, a flag is signaled to indicate whether interweaved prediction can be used or not in the header of picture/slice/tile group/tile.
      1. For example, this flag is signaled only if affine prediction is allowed.

Item 17: It is proposed that a message is signaled to indicate whether to apply the dependency between whether/how to apply interweaved prediction and the width and height. The message may be signaled in SPS/VPS/PPS/Slice header/picture header/tile/tile group header/CTUs/CTU rows/multiple CTUs/or other kinds of video processing units.

Item 18: In one example, when interweaved prediction is used, bi-prediction is disallowed.
  a. For example, when interweaved prediction is used, the index to indicate whether bi-prediction is used is not signaled.
  b. Alternatively, indications of whether bi-prediction is disallowed may be signaled in SPS/VPS/PPS/Slice header/picture header/tile/tile group header/CTUs/CTU rows/multiple CTUs.

Item 19: It is proposed to further refine sub-blocks' motion information based on motion information derived from two or multiple patterns.
  a. In one example, the refined motion information may be utilized for predicting following blocks to be coded.
  b. In one example, the refined motion information may be utilized in the filtering process, such as Deblock, SAO, ALF.
  c. Whether to store the refined information may be based on the position of sub-block relative to the whole block/CTU/CTU row/tile/slice/tile groups/picture.
  d. Whether to store the refined information may be based on the coded mode of current block and/or neighboring blocks.
  e. Whether to store the refined information may be based on the dimension of current block.
  f. Whether to store the refined information may be based on picture/slice types/reference picture lists etc. al.

Item 20: It is proposed that whether to and/or how to apply deblocking process or other kinds of filtering process (such as SAO, Adaptive loop filter) may depend on whether interweaved prediction is applied or not.

a. In one example, deblocking is not conducted on an edge between two sub-blocks in one division pattern for a block if the edge is inside a sub-block in another division pattern for a block.

b. In one example, deblocking is made weaker on an edge between two sub-blocks in one division pattern for a block if the edge is inside a sub-block in another division pattern for a block.
  i. In one example, bS[xDi][yDj] described in the VVC deblocking process is decreased for such a edge.
  ii. In one example, β described in the VVC deblocking process is decreased for such a edge.
  iii. In one example, □ described in the VVC deblocking process is decreased for such a edge.
  iv. In one example, tC described in the VVC deblocking process is decreased for such a edge.

c. In one example, deblocking is made stronger on an edge between two sub-blocks in one division pattern for a block if the edge is inside a sub-block in another division pattern for a block.
  i. In one example, bS[xDi][yDj] described in the VVC deblocking process is increased for such a edge.
  ii. In one example, R described in the VVC deblocking process is increased for such a edge.
  iii. In one example, Q described in the VVC deblocking process is increased for such a edge.
  iv. In one example, tC described in the VVC deblocking process is increased for such a edge.

Item 21: It is proposed that whether to and/or how to apply local illumination compensation or weighted prediction to a block/sub-block may depend on whether interweaved prediction is applied or not.
  a. In one example, when one block is coded with interweaved prediction mode, it is disallowed to apply local illumination compensation or weighted prediction.
  b. Alternatively, furthermore, there is no need to signal indications of enabling local illumination compensation if interweaved prediction is applied to a block/sub-block.

Item 22: It is proposed that when weighted prediction is applied to one block or sub-block, bi-directional optical flow (BIO) may be skipped.
  a. In one example, BIO may be applied to blocks with weighted prediction.
  b. In one example, BIO may be applied to blocks with weighted prediction, however, certain conditions shall be satisfied.
    i. In one example, it is required that at least one parameter shall be within one range, or equal to certain values.
    ii. In one example, certain reference pictures restrictions may be applied.

The embodiments and examples described above may be implemented in the context of methods as shown FIG. 19 to [ ], described next.

Figure 19:
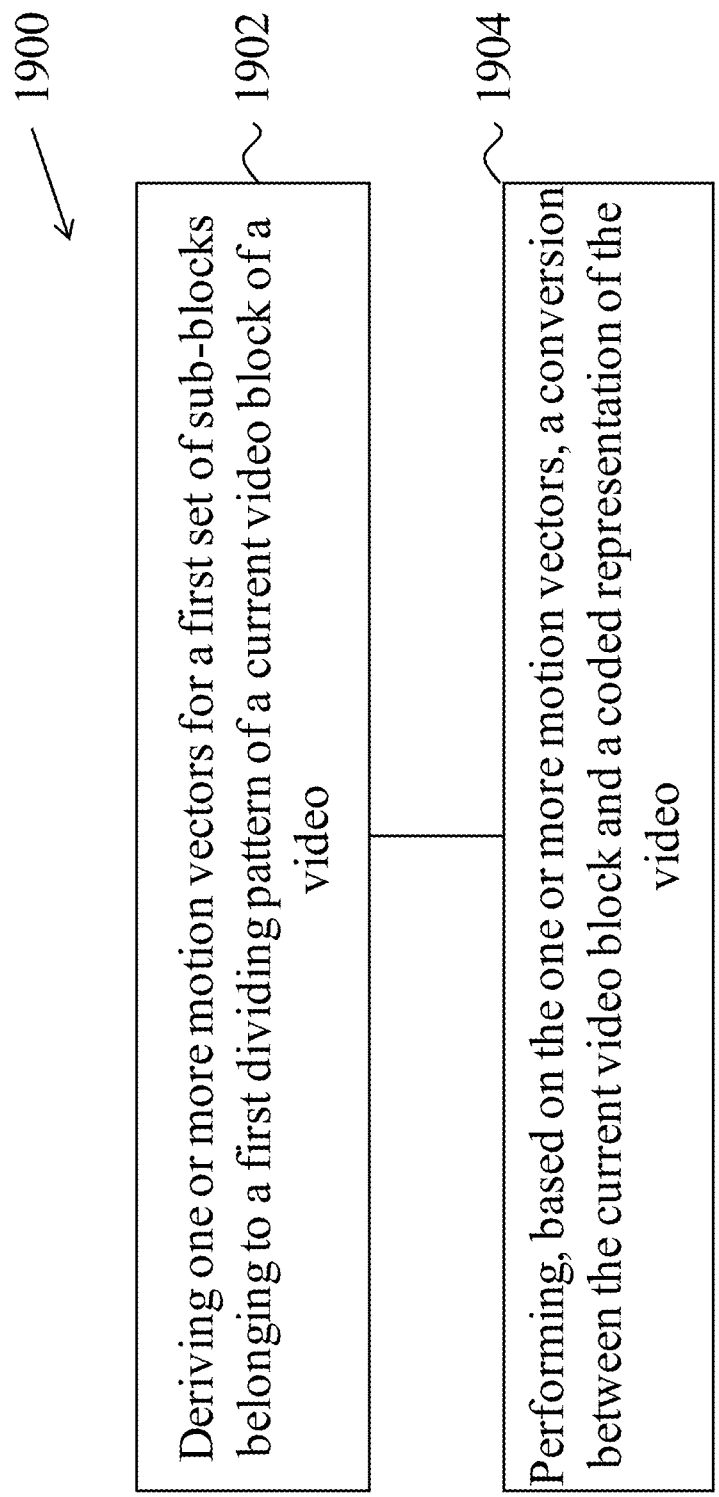
FIG. 19 is an example flowchart of a method for video processing based on some implementations of the disclosed technology.
Figure 20:
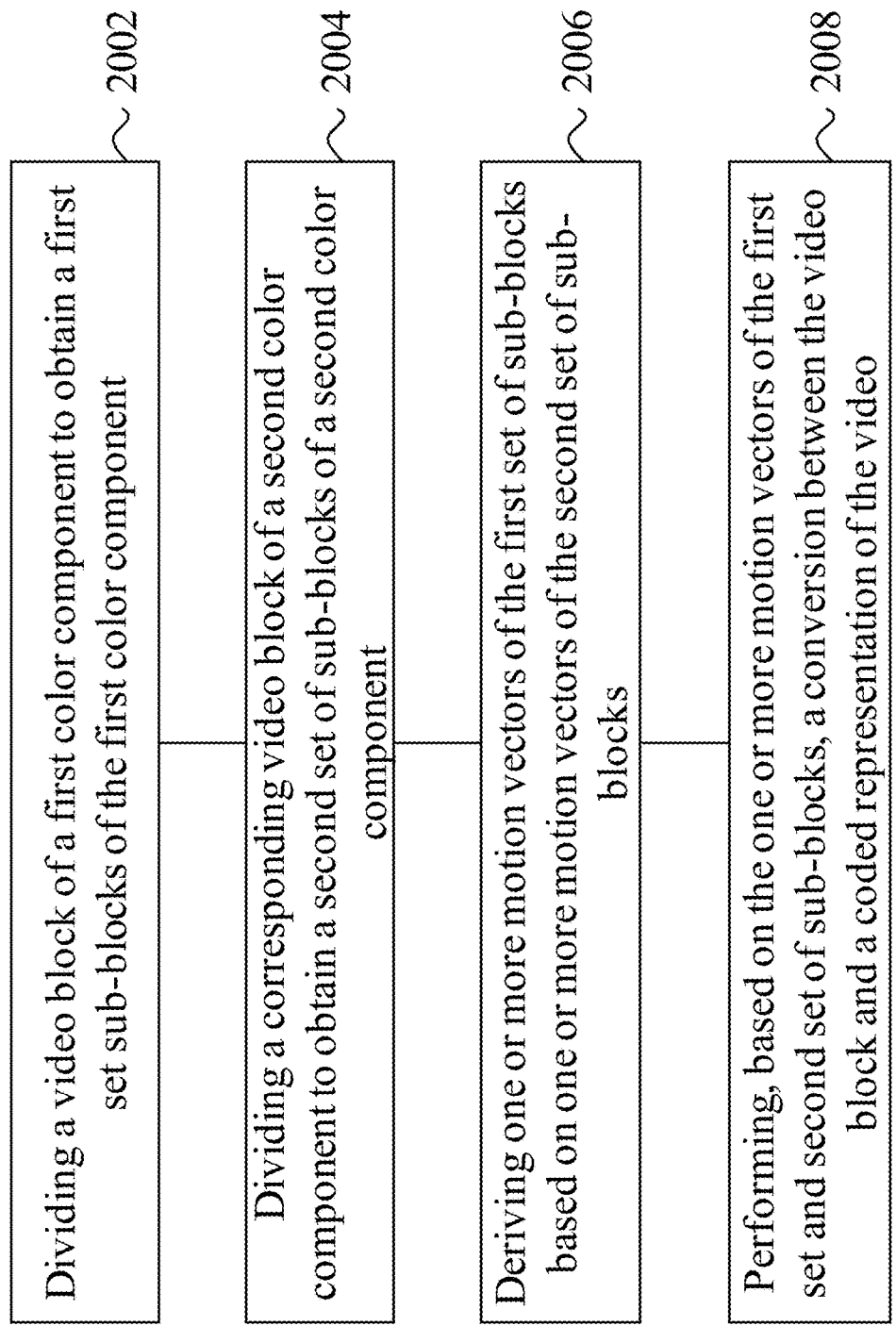
FIG. 20 is an example flowchart of a method for video processing based on some other implementations of the disclosed technology.

FIG. 19 shows an example flowchart of a method 1900 for video processing based on some implementations of the disclosed technology. The method 1900 includes, at 1902, deriving one or more motion vectors for a first set of sub-blocks belonging to a first dividing pattern of a current video block of a video. The method 1900 includes, at 1904, performing, based on the one or more motion vectors, a conversion between the current video block and a coded representation of the video FIG. 20 shows an example flowchart of a method 2000 for video processing based on some implementations of the disclosed technology. The method 2000 includes, at 2902, dividing a video block of a first color component to obtain a first set sub-blocks of the first color component. The method 2000 further includes, at 2004, dividing a corresponding video block of a second color component to obtain a second set of sub-blocks of a second color component. The method 2000 further includes, at 2006, deriving one or more motion vectors of the first set of sub-blocks based on one or more motion vectors of the second set of sub-blocks. The method 2000 further includes, at 2008, performing, based on the one or more motion vectors of the first set and second set of sub-blocks, a conversion between the video block and a coded representation of the video.

Figure 21A:
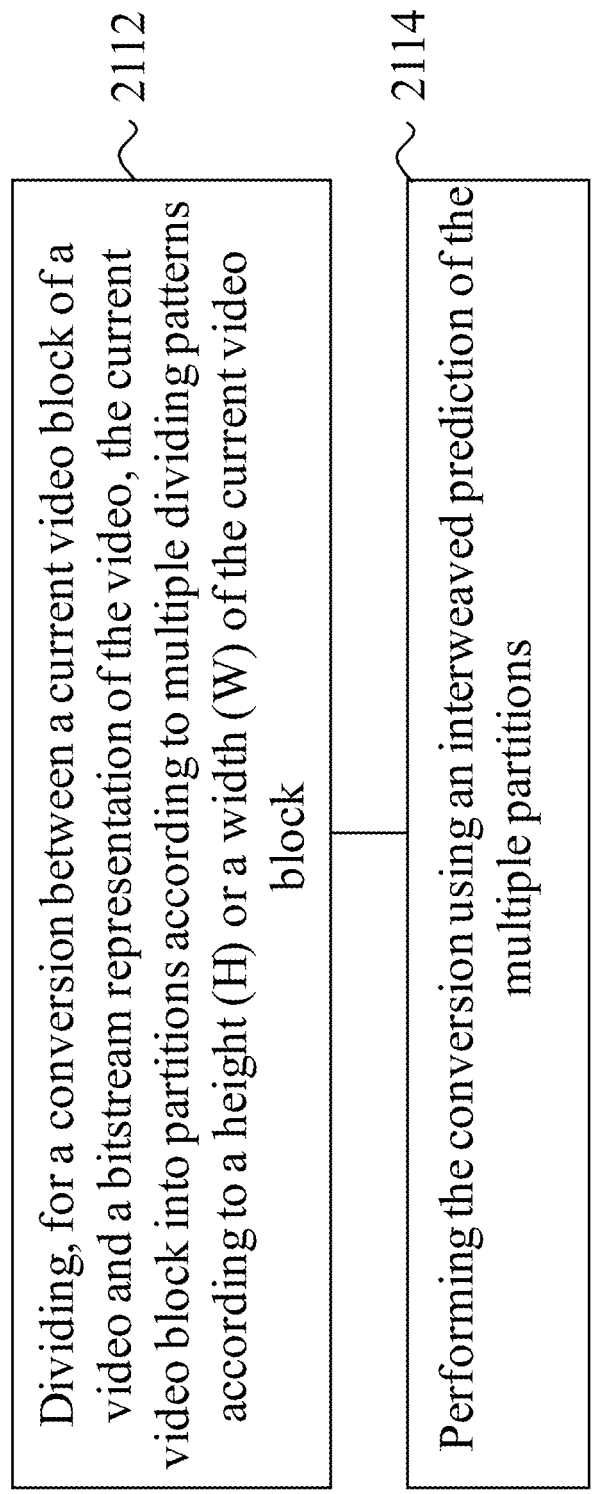
FIGS. 21A to 21D are example flowcharts of methods for video processing based on some other implementations of the disclosed technology.

FIG. 21A shows an example flowchart of a method 2110 for video processing based on some implementations of the disclosed technology. The method 2110 includes, at 2112, dividing, for a conversion between a current video block of a video and a bitstream representation of the video, the current video block into partitions according to multiple dividing patterns according to a height (H) or a width (W) of the current video block. The method 2110 further includes, at 2114, performing the conversion using an interweaved prediction of the multiple partitions.

Figure 21B:
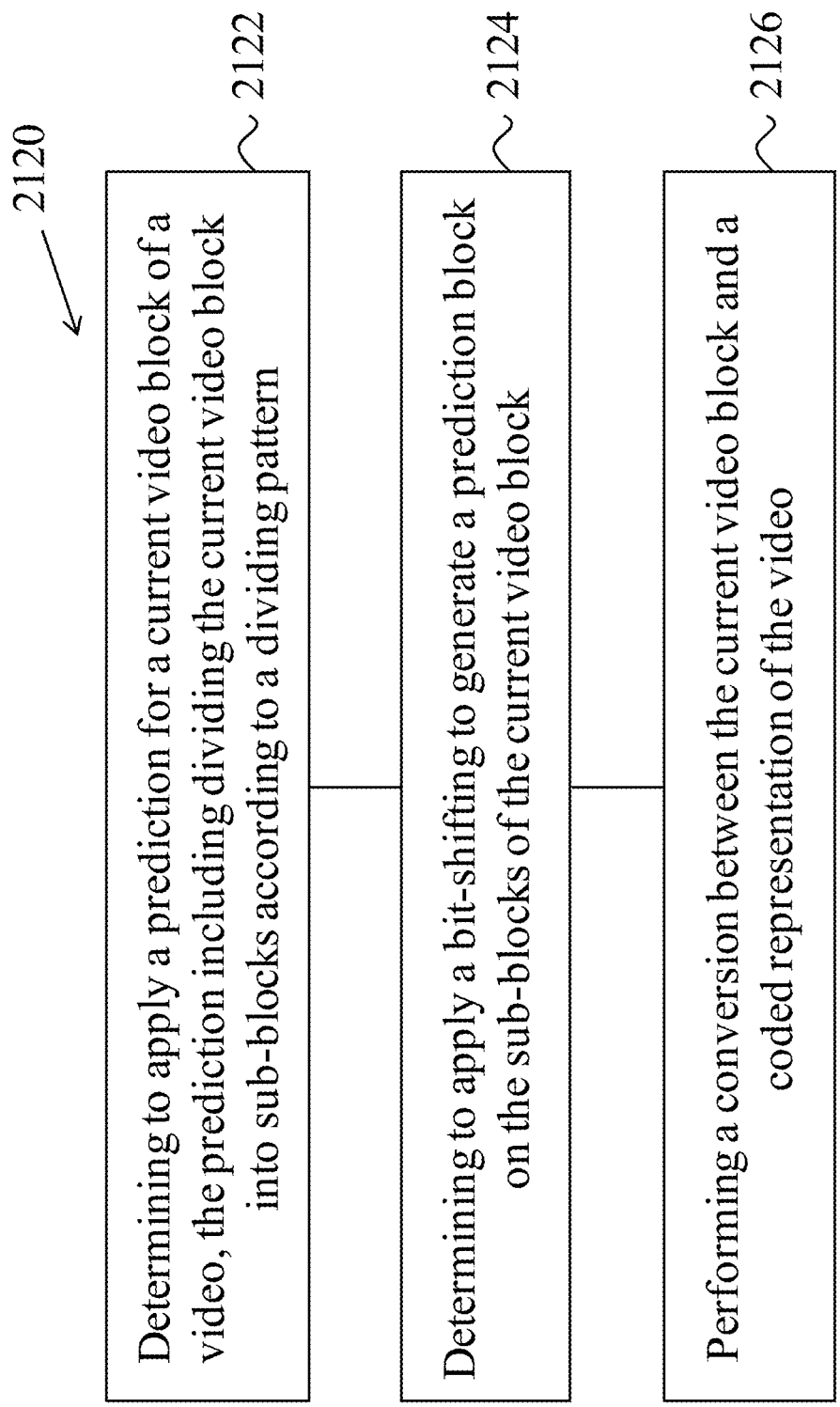

FIG. 21B shows an example flowchart of a method 2120 for video processing based on some implementations of the disclosed technology. The method 2120 includes, at 2122, determining to apply a prediction for a current video block of a video, the prediction including dividing the current video block into sub-blocks according to a dividing pattern. The method 2120 further includes, at 2124, determining to apply a bit-shifting to generate a prediction block on the sub-blocks of the current video block. The method 2120 further includes, at 2126, performing a conversion between the current video block and a coded representation of the video.

Figure 21C:
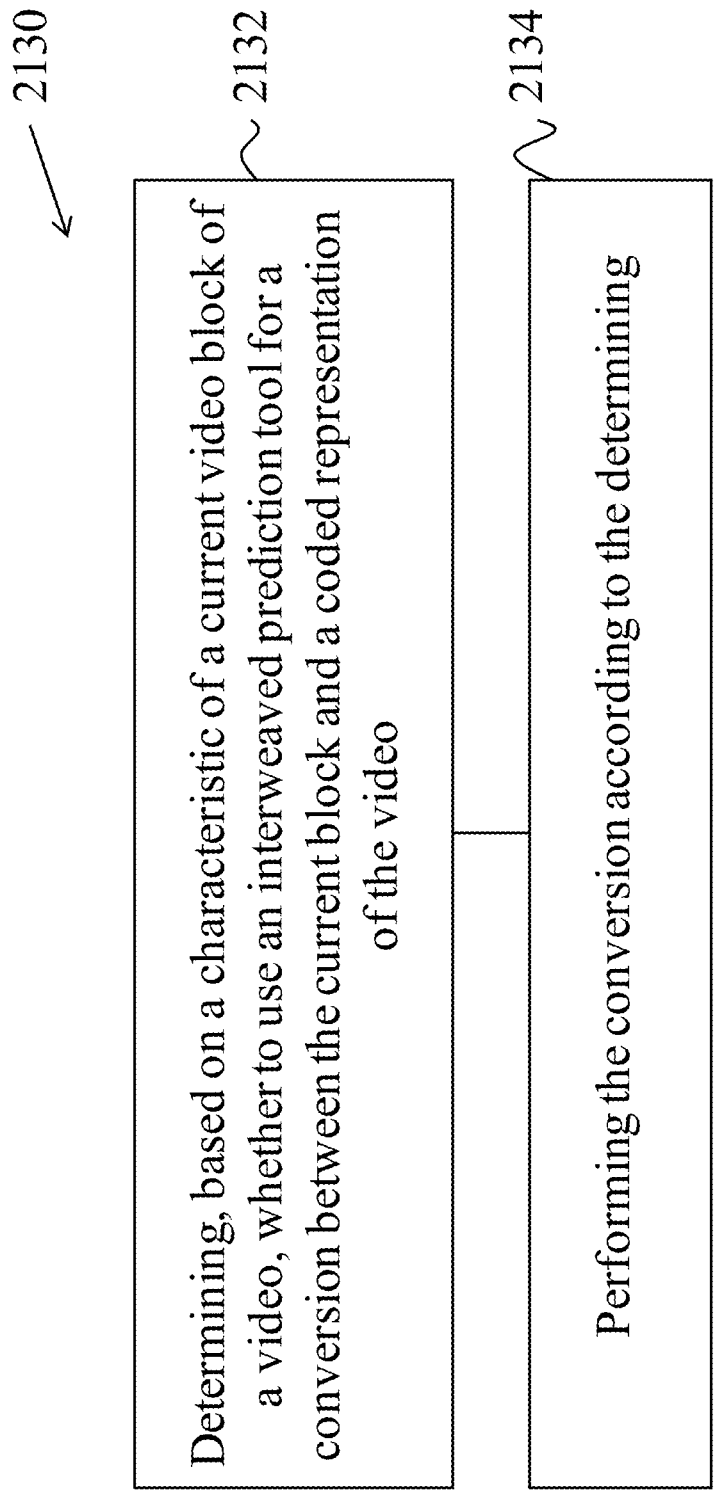

FIG. 21C shows an example flowchart of a method 2130 for video processing based on some implementations of the disclosed technology. The method 2130 includes, at 2132, determining, based on a characteristic of a current video block of a video, whether to use an interweaved prediction tool for a conversion between the current block and a coded representation of the video. The method 2130 further includes, at 2134, performing the conversion according to the determining. In some implementations, upon the determining that the characteristic of the current video block fails to meet a condition, the conversion is performed by disabling a use of an affine prediction tool and/or the interweaved prediction tool. In some implementations, upon the determining that the characteristic of the current video block meets a condition, the conversion is performed by using an affine prediction tool and/or the interweaved prediction tool.

Figure 21D:
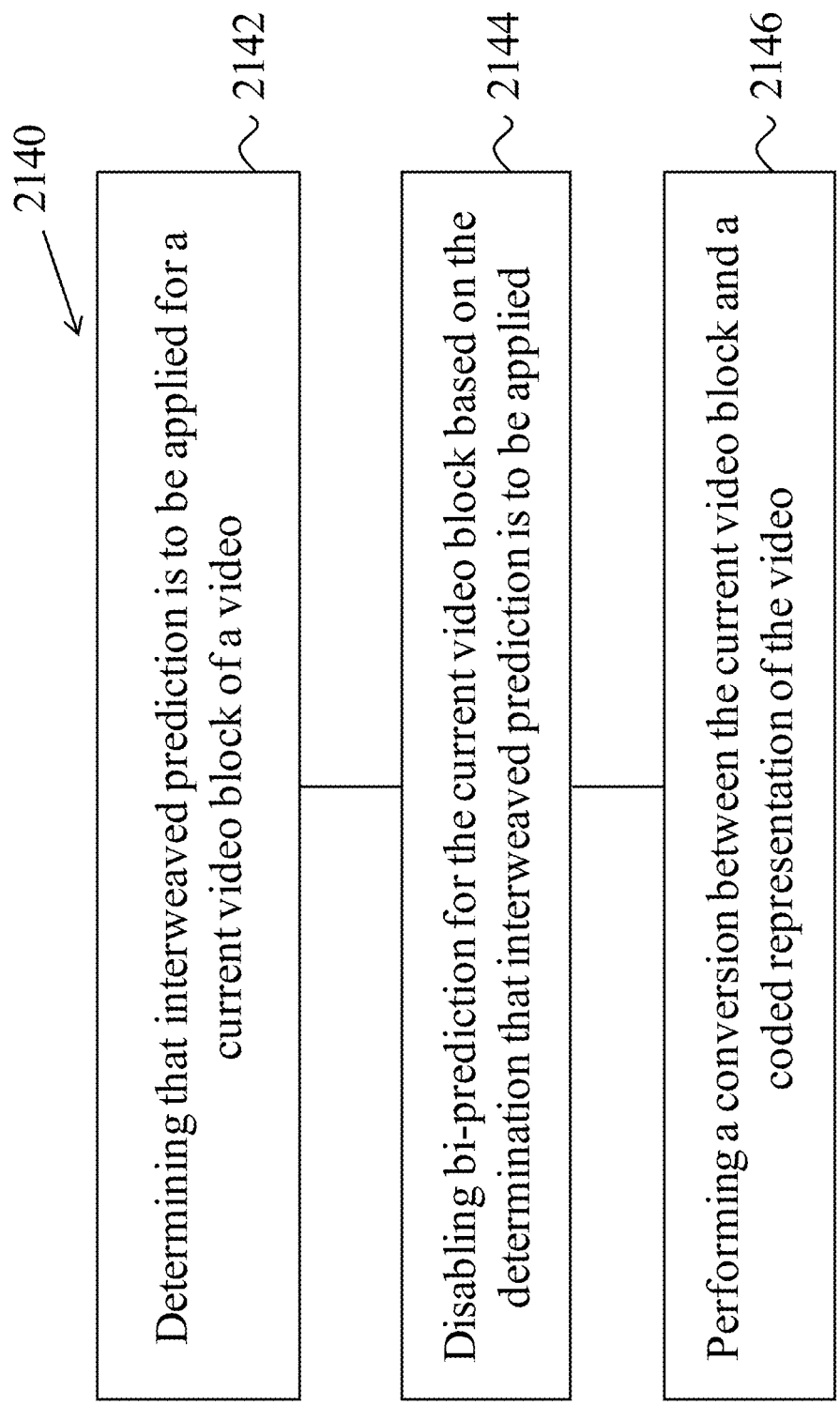

FIG. 21D shows an example flowchart of a method 2140 for video processing based on some implementations of the disclosed technology. The method 2140 includes, at 2142, determining that interweaved prediction is to be applied for a current video block of a video. The method 2140 further includes, at 2144, disabling bi-prediction for the current video block based on the determination that interweaved prediction is to be applied. The method 2140 further includes, at 2146, performing a conversion between the current video block and a coded representation of the video.

FIG. 22A shows an example flowchart of a method 2210 for video processing based on some implementations of the disclosed technology. The method 2210 includes, at 2212, determining, for a conversion between a current video block of a video and a coded representation of the video, a refined motion information for the current video block. The method 2210 further includes, at 2214, performing the conversion using the refined motion information. In some implementations, the refined motion information is generated based on an interweaved prediction tool in which motion information of partitions of the current video block that are generated using multiple patterns, and the refined motion information of the current video block is used for a subsequent processing or selectively stored based on whether a condition is satisfied.

Figure 22B:
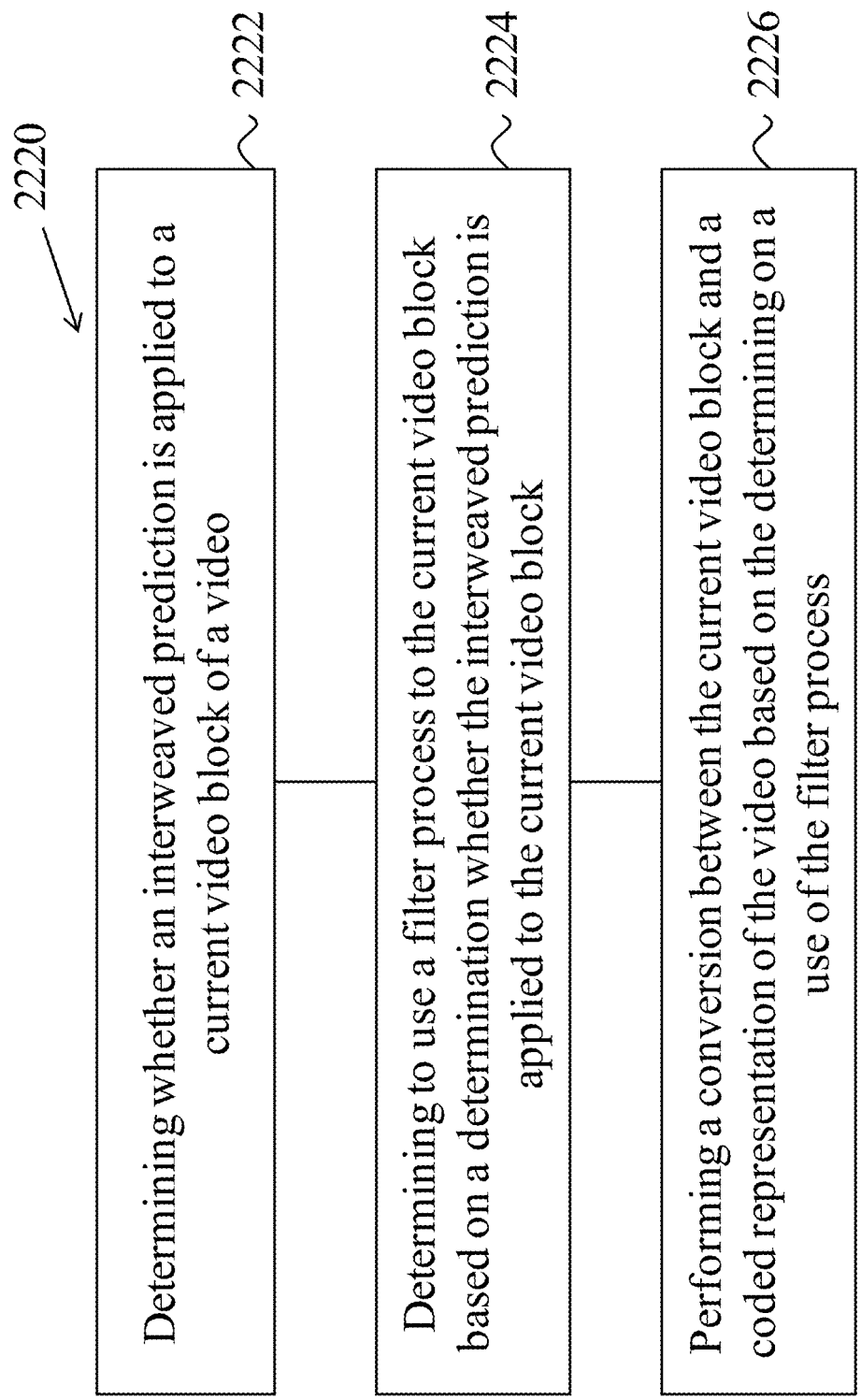

FIG. 22B shows an example flowchart of a method 2220 for video processing based on some implementations of the disclosed technology. The method 2220 includes, at 2222, determining whether an interweaved prediction is applied to a current video block of a video. The method 2220 further includes, at 2224, determining to use a filter process to the current video block based on a determination whether the interweaved prediction is applied to the current video block. The method 2220 further includes, at 2226, performing a conversion between the current video block and a coded representation of the video based on the determining on a use of the filter process.

Figure 22C:
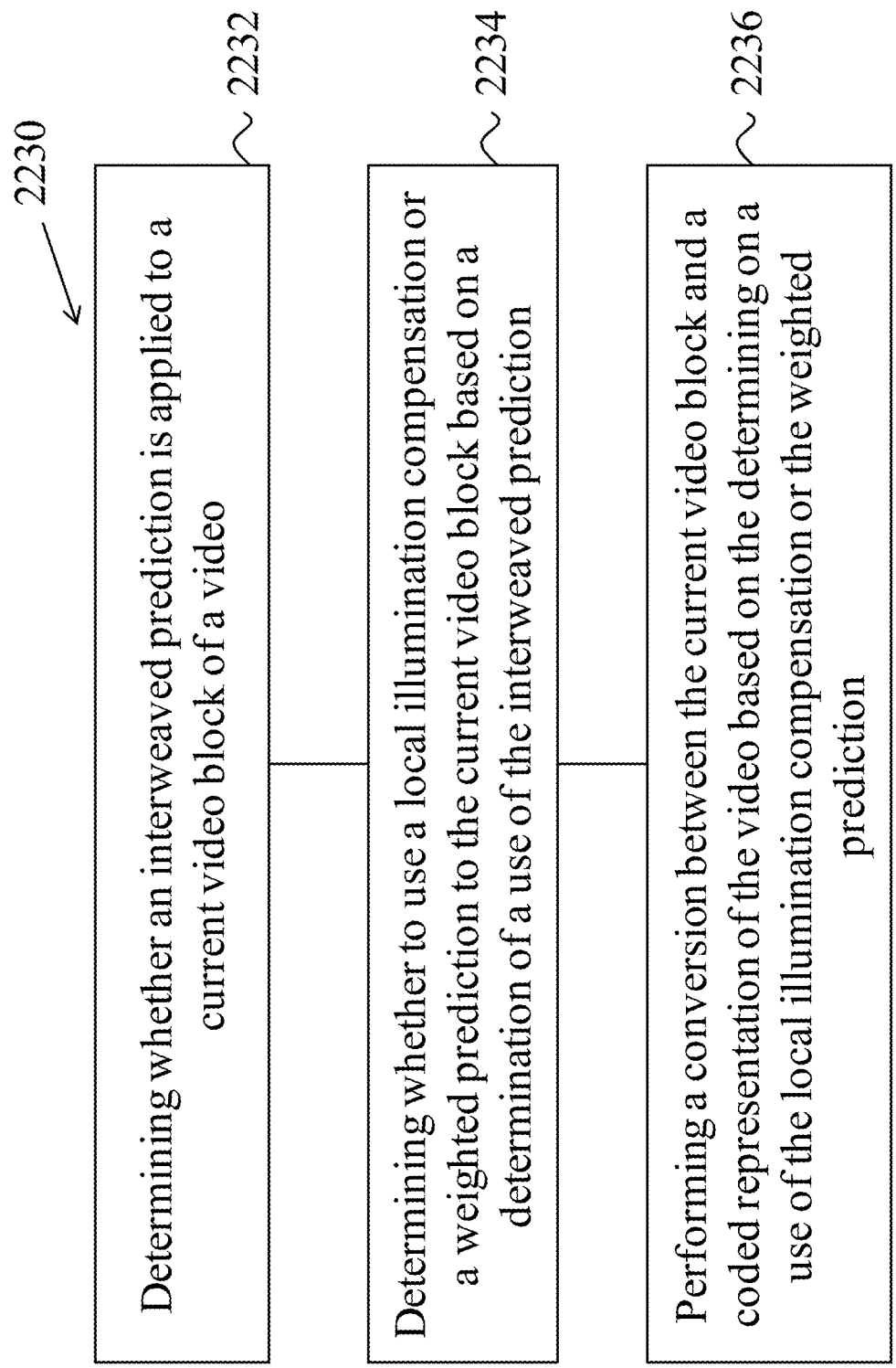

FIG. 22C shows an example flowchart of a method 2230 for video processing based on some implementations of the disclosed technology. The method 2230 includes, at 2232, determining whether an interweaved prediction is applied to a current video block of a video. The method 2230 further includes, at 2234, determining whether to use a local illumination compensation or a weighted prediction to the current video block based on a determination of a use of the interweaved prediction. The method 2230 further includes, at 2236, performing a conversion between the current video block and a coded representation of the video based on the determining on a use of the local illumination compensation or the weighted prediction.

Figure 22D:
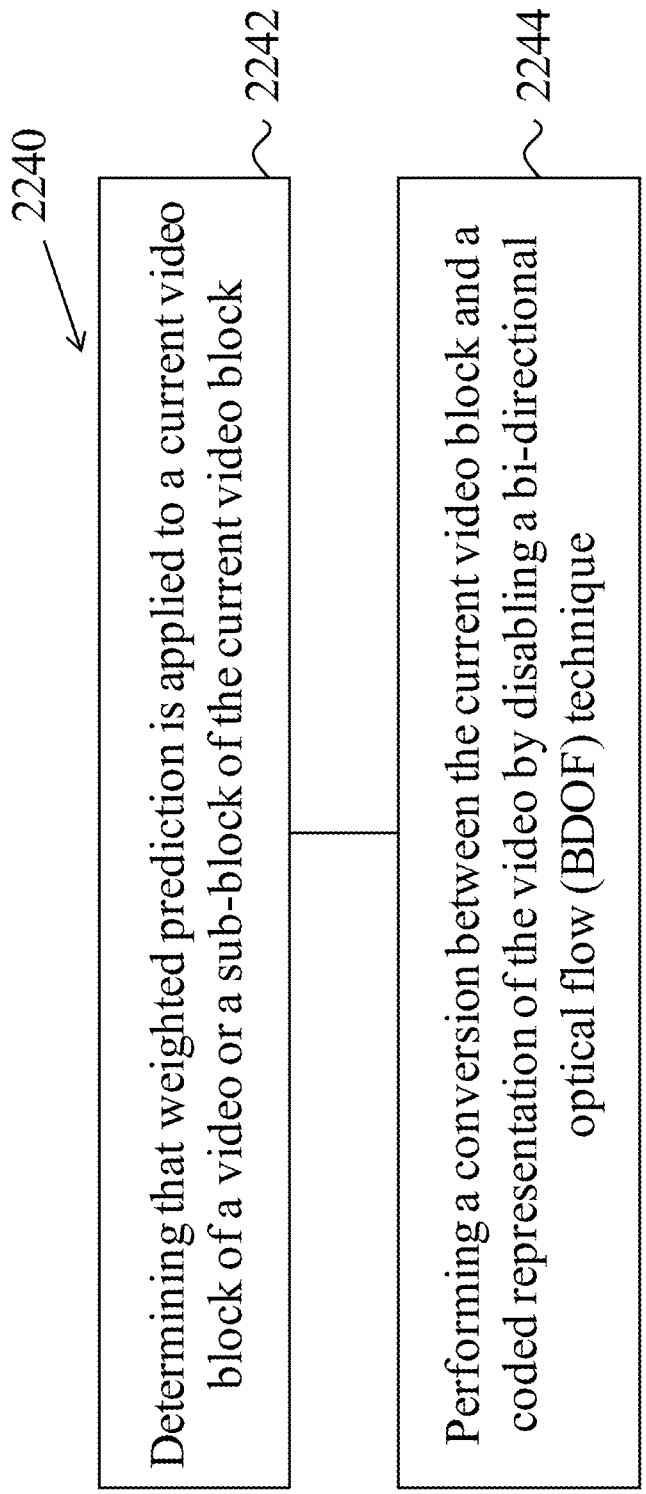

FIG. 22D shows an example flowchart of a method 2240 for video processing based on some implementations of the disclosed technology. The method 2240 includes, at 2242, determining that weighted prediction is applied to a current video block of a video or a sub-block of the current video block. The method 2240 further includes, at 2244, performing a conversion between the current video block and a coded representation of the video by disabling a bi-directional optical flow (BDOF) technique.

In the methods as discussed above, partial interweaving may be implemented. Using this scheme, samples in a first subset of prediction samples are calculated as a weighted combination of the first intermediate prediction block and samples a second subset of the prediction samples are copied from sub-blocked based prediction wherein the first subset and the second subset are based on a dividing pattern. The first subset and the second subset may together make up the entire prediction block, e.g., the block that is currently being processed. As depicted in FIGS. 15A-15D, in various examples, the second subset that is excluded from interweaving could be made up of (a) corner sub-blocks or (b) uppermost and lowermost row of sub-blocks or (c) left-most or right-most columns of sub-blocks. The size of the block being currently processed may be used as a condition for deciding whether to exclude certain sub-blocks from interweaved prediction.

As further described in the present document, the encoding process may refrain from checking affine mode for blocks that are split from a parent block, where the parent block itself is encoded with a mode different from affine mode.

In some embodiments, a video decoder apparatus may implement a method of video decoding in which the improved block-based motion prediction as described herein is used for video decoding. The method may include forming a block of video using a set of pixels from a video frame. The block may be partitioned into a first set of sub-blocks according to a first pattern. A first intermediate prediction block may correspond to the first set of sub-blocks. The block may include a second set of sub-blocks according to a second pattern. At least one sub-block in the second set has a different size than a sub-block in the first set. The method may further determine a prediction block based on the first intermediate prediction block and a second intermediate prediction block that is generated from the second set of sub-blocks. Other features of this method may be similar to the above-described method 1900.

In some embodiments, a decoder-side method of video decoding may use block-based motion prediction for improving video quality by using blocks of a video frame for prediction, where a block corresponds to a set of pixel blocks. The block may be divided into multiple sub-blocks based on a size of the block or information from another block that is spatially or temporally adjacent to the block, wherein at least one sub-block of the multiple sub-blocks has a different size than other sub-blocks. The decoder may use motion vector predictions that are generated by applying a coding algorithm to the multiple sub-blocks. Other features of this method are described with respect to FIG. 2000 and the corresponding description.

Yet another method for video processing includes deriving one or more motion vectors for a first set of sub-blocks of a current video block, wherein each of the first set of sub-blocks has a first dividing pattern, and reconstructing, based on the one or more motion vectors, the current video block.

In some embodiments, the deriving the one or more motion vectors is based on an affine model.

In some embodiments, the deriving the one or more motion vectors is based on motion vectors of one or more of a second set of sub-blocks, each of the second set of sub-blocks has a second dividing pattern different from the first dividing pattern, and the one or more of the second set of sub-blocks overlap with at least one of the first set of sub-blocks. For example, the one or more motion vectors for the first set of sub-blocks comprises MV1, the motion vectors of the one or more of the second set of sub-blocks comprise $MV^{O1}$, $MV^{O2}$, $MV^{O3}$, . . . and $MV^{OK}$, and K is a positive integer. In an example, $MV^1=(MV^{O1}, MV^{O2}, MV^{O3}, \ldots, MV^{OK})$. In another example, f(•) is a linear function. In yet another example, f(•) is a non-linear function. In yet another example, $MV^1$=average($MV^{O1}$, $MV^{O2}$, $MV^{O3}$, . . . , $MV^{OK}$), and average(•) is an averaging operation. In yet another example, $MV^1$=median($MV^{O1}$, $MV^{O2}$, $MV^{O3}$, . . . , $MV^{OK}$), and median(•) is an operation that computes a median value. In yet another example, $MV^1$=min($MV^{O1}$, $MV^{O2}$, $MV^{O3}$ . . . , $MV^{OK}$), and min(•) is an operation that selects a minimum value from a plurality of input values. In yet another example, $MV^1$=MaxAbs ($MV^{O1}$, $MV^{O2}$, $MV^{O3}$, . . . , $MV^{OK}$), and MaxAbs(•) is an operation that selects a maximum absolute value from a plurality of input values.

In some embodiments, the first set of sub-blocks corresponds to a first color component, the deriving the one or more motion vectors is based on motion vectors of one or more of a second set of sub-blocks, each of the second set of sub-blocks has a second dividing pattern different from the first dividing pattern, and the second set of sub-blocks corresponds to a second color component different from the first color component. In an example, the first color component is coded or decoded after a third color component, and wherein the third color component is one or Cr, Cb, U, V, R or B. In another example, the second color component is coded or decoded before a third color component, and wherein the third color component is Y or G. In yet another example, the deriving the one or more motion vectors is further based on a color format of at least one of the second set of sub-blocks. In yet another example, the color format is 4:2:0, 4:2:2 or 4:4:4.

In some embodiments, the first dividing pattern is based on a height or a width of the current video block.

Figure 23:
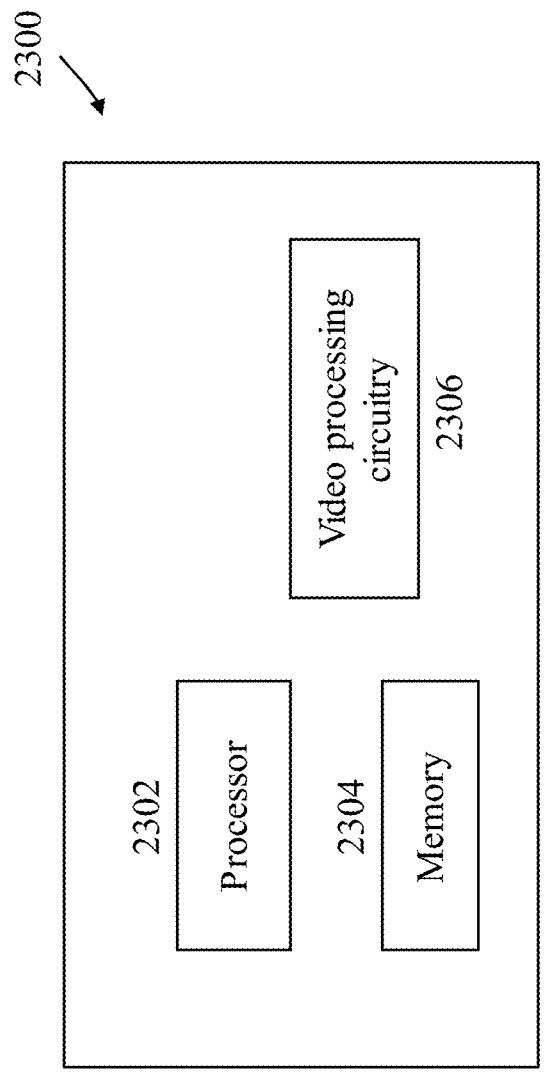
FIGS. 23 and 24 are block diagrams of examples of hardware platforms for implementing video processing methods described in the disclosed technology.

FIG. 23 is a block diagram of a video processing apparatus 2300. The apparatus 2300 may be used to implement one or more of the methods described herein. The apparatus 2300 may be embodied in a smartphone, tablet, computer, Internet of Things (IoT) receiver, and so on. The apparatus 2300 may include one or more processors 2302, one or more memories 2304 and video processing hardware 2306. The processor(s) 2302 may be configured to implement one or more methods (including, but not limited to, methods as shown in FIGS. 19 to 22D) described in the present document. The memory (memories) 2104 may be used for storing data and code used for implementing the methods and techniques described herein. The video processing hardware 2306 may be used to implement, in hardware circuitry, some techniques described in the present document.

Figure 24:
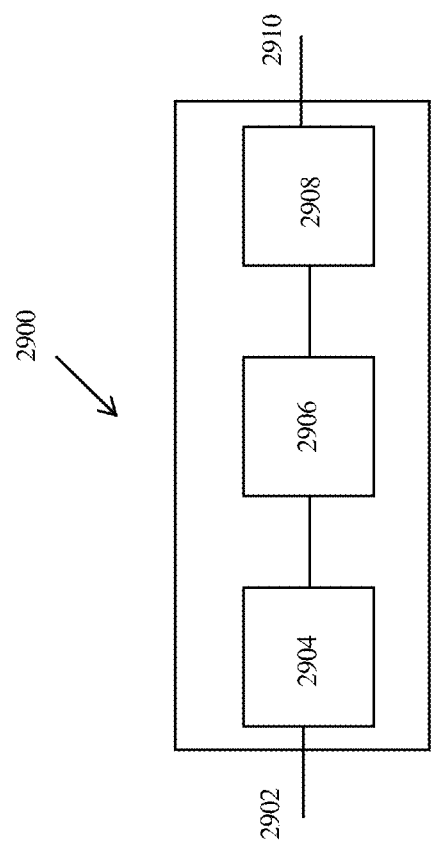

FIG. 24 is another example of a block diagram of a video processing system in which disclosed techniques may be implemented. FIG. 24 is a block diagram showing an example video processing system 3100 in which various techniques disclosed herein may be implemented. Various implementations may include some or all of the components of the system 3100. The system 3100 may include input 3102 for receiving video content. The video content may be received in a raw or uncompressed format, e.g., 8 or 10 bit multi-component pixel values, or may be in a compressed or encoded format. The input 3102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3100 may include a coding component 3104 that may implement the various coding or encoding methods described in the present document. The coding component 3104 may reduce the average bitrate of video from the input 3102 to the output of the coding component 3104 to produce a coded representation of the video. The coding techniques are therefore sometimes called video compression or video transcoding techniques. The output of the coding component 3104 may be either stored, or transmitted via a communication connected, as represented by the component 3106. The stored or communicated bitstream (or coded) representation of the video received at the input 3102 may be used by the component 3108 for generating pixel values or displayable video that is sent to a display interface 3110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the video coding methods may be implemented using an apparatus that is implemented on a hardware platform as described with respect to FIG. 23 or 24.

Various techniques and embodiments may be described using the following clause-based format.

The first set of clauses describe certain features and aspects of the disclosed techniques listed in the previous section, including, for example, Item 1.

1. A method for video processing, comprising: deriving one or more motion vectors for a first set of sub-blocks belonging to a first dividing pattern of a current video block of a video; and performing, based on the one or more motion vectors, a conversion between the current video block and a coded representation of the video.
2. The method of clause 1, wherein the deriving the one or more motion vectors is based on an affine model.
3. The method of clause 1, wherein the deriving the one or more motion vectors is based on motion vectors of a second set of sub-blocks, wherein the second set of sub-blocks has a second dividing pattern different from the first dividing pattern.
4. The method of clause 3, wherein the second set of sub-blocks overlaps with the first set of sub-blocks.
5. The method of clause 3, wherein the one or more motion vectors for the first set of sub-blocks comprises $MV^1$ and the motion vectors of the second set of sub-blocks comprise $MV^{o1}, MV^{o2}, MV^{o3}, \ldots$ and $MV^{oK}$, and wherein K is a positive integer.
6. The method of clause 5, wherein $MV^1 = f(MV^{o1}, MV^{o2}, MV^{o3}, \ldots, MV^{oK})$
7. The method of clause 6, wherein $f(\bullet)$ is a linear function.
8. The method of clause 6, wherein $f(\bullet)$ is a non-linear function.
9. The method of clause 5, wherein $MV^1 =$ average $(MV^{o1}, MV^{o2}, MV^{o3}, \ldots, MV^{o})$ wherein average$(\bullet)$ is an averaging operation.
10. The method of clause 5, wherein MV1=median $(MV^{o1}, MV^{o2}, MV^{o3}, \ldots, MV^{oK})$ wherein median$(\bullet)$ is an operation that computes a median value.
11. The method of clause 5, wherein $MV^1 =$ max $(MV^{o1}, MV^{o2}, MV^{o3}, \ldots, MV^{oK})$ wherein max$(\bullet)$ is an operation that selects a maximum value from a plurality of input values.
12. The method of clause 5, wherein $MV^1 =$ min $(MV^{o1}, MV^{o2}, MV^{o3}, \ldots, MV^{oK})$ wherein min$(\bullet)$ is an operation that selects a minimum value from a plurality of input values.
13. The method of clause 5, wherein $MV^1 =$ MaxAbs $(MV^{o1}, MV^{o2}, MV^{o3}, \ldots, MV^{oK})$ wherein MaxAbs$(\bullet)$ is an operation that selects a maximum ab solute value from a plurality of input values.
14. The method of clause 5, wherein $MV^1 =$ MinAbs $(MV^{o1}, MV^{o2}, MV^{o3}, \ldots, MV^{oK})$ wherein MinAbs$(\bullet)$ is an operation that selects a minimum absolute value from a plurality of input values.
15. The method of any of clauses 1 to 14, wherein the performing of the conversion includes generating the coded representation from the current video block.
16. The method of any of clauses 1 to 14, wherein the performing of the conversion includes generating the current video block from the coded representation.

17. An apparatus in a video system comprising a processor and a non-transitory memory with instructions thereon, wherein the instructions upon execution by the processor, cause the processor to implement the method recited in one or more of clauses 1 to 16.
18. A computer program product stored on a non-transitory computer readable media, the computer program product including program code for carrying out the method recited in one or more of clauses 1 to 16.

The second set of clauses describe certain features and aspects of the disclosed techniques listed in the previous section, including, for example, Item 14.

The third set of clauses describe certain features and aspects of the disclosed techniques listed in the previous section, including, for example, Items 13, 15, 16, 17 and 18.

1. A method of video processing, comprising: dividing, for a conversion between a current video block of a video and a bitstream representation of the video, the current video block into partitions according to multiple dividing patterns according to a height (H) or a width (W) of the current video block; and performing the conversion using an interweaved prediction of the multiple partitions.
2. The method of clause 1, wherein the current video block is divided according to two dividing patterns in a case that W>T1 and H>T2, T1, T2 being integer values.
3. The method of clause 2, wherein T1=T2-4.
4. The method of clause 1, wherein the current video block is divided according to two dividing patterns in a case that H<=T2, T2 being an integer.
5. The method of clause 4, wherein T2=4.
6. The method of clause 1, wherein the current video block is divided according to two dividing patterns in a case that W<=T1, T1 being an integer.
7. The method of clause 6, wherein T1=4.
8. A method for video processing, comprising: determining to apply a prediction for a current video block of a video, the prediction including dividing the current video block into sub-blocks according to a dividing pattern; determining to apply a bit-shifting to generate a prediction block on the sub-blocks of the current video block; and performing a conversion between the current video block and a coded representation of the video.
9. The method of clause 8, wherein a bi-prediction or a uni-prediction is applied to the current video block.
10. The method of clause 8, wherein one or more motion vectors related to the current video block has an internal bit depth depending on weighting values of the prediction.
11. The method of clause 8, wherein, for a reference picture list X of the current video block, $P^X(x,y)$=Shift $(W0(x,y)*P^X_0(x,y)+W1(x,y)*P^X_1(x,y), SW)$, where $P^X(x,y)$ is the prediction for the list X that is 0 or 1, $P^X_0(x,y)$ and $P^X_1(x,y)$ are the prediction for list X with dividing pattern 0 and dividing pattern 1, respectively, W0 and W1 are integers representing weighting values of the interweaved prediction, SW represents the precision of interweaved weighting values, and Shift(x, n) is defined as Shift(x, n)=(x+offset0)>>n.
12. The method of clause 8, wherein a final prediction value is derived as P(x,y)=Shift (Wb0 $(x,y)*P^0(x,y)$+Wb1$(x,y)*P^1(x,y)$, SWB), where Wb0 and Wb1 are integers representing weighting values of the bi-prediction, $P^0(x,y)$ and $P^1(x,y)$ represent the prediction for list 0 and list 1, respectively, SWB is the precision of an weighted bi-prediction, and Shift(x, n) is defined as Shift(x, n)=(x+offset0)>>n.
13. The method of clause 12, wherein, Wb0=Wb1=SWB=1.
14. The method of clause 8, wherein an interpolation filtering is applied to generate a prediction block and a final prediction value is derived as P(x,y)=Shift (Wb0 $(x,y)*P^0(x,y)$+Wb1$(x,y)*P^1(x,y)$, SWB+PB), where Wb0 and Wb1 are integers representing weighting values of the interweaved prediction, SWB is the precision of an weighted bi-prediction, PB is an additional precision from the interpolation filtering, and Shift(x, n) is defined as Shift(x, n)=(x+offset0)>>n.
15. The method of clause 14, wherein $P^X_0(x,y)$ and $P^X_1(x,y)$ are predictions for a reference picture list X with dividing pattern 0 and dividing pattern 1 and wherein $P^X_0(x,y)$ and $P^X_1(x,y)$ are right-shifted.
16. The method of clause 8, wherein the bi-prediction uses different weighting factors for two reference prediction blocks.
17. The method of clause 11 or 14, wherein $P^X_0(x,y)$ is modified as $P^X_0(x,y)$=Shift($P^X_0(x,y)$, M) and/or $P^X_1(x,y)$ is modified as $P^X_1(x,y)$=Shift($P^X_1(x,y)$, M), wherein M is an integer, and P(x,y)=Shift(Wb0(x,y)*P0(x,y)+Wb1(x,y)*P1(x,y), SWB+PB−M).
18. A method for video processing, comprising: determining, based on a characteristic of a current video block of a video, whether to use an interweaved prediction tool for a conversion between the current block and a coded representation of the video; and performing the conversion according to the determining, wherein, upon the determining that the characteristic of the current video block fails to meet a condition, the conversion is performed by disabling a use of an affine prediction tool and/or the interweaved prediction tool.
19. A method for video processing, comprising: determining, based on a characteristic of a current video block of a video, whether to use an interweaved prediction tool for a conversion between the current block and a coded representation of the video; and performing the conversion according to the determining, wherein, upon the determining that the characteristic of the current video block meets a condition, the conversion is performed by using an affine prediction tool and/or the interweaved prediction tool.
20. The method of clause 18 or 19, wherein the characteristic of the current video block includes at least one of a width or a height of the current video block.
21. The method of clause 18 or 19, further comprising: determining a size of a video processing data unit (VPDU), and wherein the determining whether to use the interweaved prediction tool is based on the size of the VPDU.
22. The method of clause 18, wherein a prediction method that is different than the interweaved prediction is applied for the current video block.
23. The method of clause 18, wherein a width and a height of the current video block are W and H, respectively, and T, T1, T2 are integer values, and wherein the interweaved prediction is disabled for a certain condition including one of:
  i. W>T1 and H>T2,
  ii. W>T1 or H>T2,
  iii. W×H>T,
  iv. W<T1 and H<T2, or
  v. W<T1 or H<T2.
  vi. W*H<T.

24. The method of clause 18 or 19, further comprising: determining that a first sub-block of the current video block is not located at a block boundary; and disabling, upon a determination that the first sub-block is not located at the block boundary, an interweaved affine technique for the first sub-block.

25. The method of clause 24, wherein prediction results from an original affine prediction technique is used for a final prediction for the first sub-block.

26. The method of clause 18, wherein a width and a height of the current video block are W and H, respectively, and T, T1, T2 are integer values, and wherein the interweaved prediction is used for a certain condition including one of:
   i. W>T1 and H>T2,
   ii. W>T1 or H>T2,
   iii. W×H>T,
   iv. W<T1 and H<T2, or
   v. W<T1 or H<T2.
   vi. W*H<T.

27. The method of clause 18, wherein the interweaved prediction is not applied to samples belonging to a sub-block crossing an upper W*(H/2) partition and a lower W*(H/2) partition of the current video block in a case that a height (H) of the current video block is greater than X, X being an integer.

28. The method of clause 18, wherein the interweaved prediction is not applied to samples belonging to a sub-block crossing both a left (W/2)*H partition and a right (W/2)*H partition of the current video block in a case that a width (W) of the current video block is greater than X, X being an integer.

29. The method of clause 27 or 28, wherein X=64.

30. The method of clause 19, wherein the interweaved prediction is allowed for specific types of a video data unit including the current video block, the video data unit including a picture, a slice, a tile group, or a tile.

31. The method of clause 19, wherein the interweaved prediction is used for P pictures or B pictures.

32. The method of clause 18 or 19, wherein a flag indicating whether the interweaved prediction tool is used or disabled is signaled in a header of a picture, a slice, a tile group, or a tile.

33. The method of clause 32, wherein the flag is signaled based on whether an affine prediction is allowed for the current video block.

34. The method of clause 18 or 19, wherein a message is signaled to indicate whether to use the characteristics of the current video block in a video processing unit including a video parameter set(VPS), a sequence parameter set(SPS), a picture parameter set (PPS), a slice header, a picture header, a tile group header, a tile, a coding tree unit (CTU), or a CTU row.

35. A method for video processing, comprising: determining that interweaved prediction is to be applied for a current video block of a video; disabling bi-prediction for the current video block based on the determination that interweaved prediction is to be applied; and performing a conversion between the current video block and a coded representation of the video.

36. The method of clause 35, wherein an index to indicate that bi-prediction is used is not signaled.

37. The method of clause 36, wherein bi-prediction is disabled based on an indication signaled in video parameter set (VPS), a sequence parameter set (SPS), a picture parameter set (PPS), a slice header, a picture header, a tile group header, a tile, a coding tree unit (CTU), a CTU row, or multiple CTUs.

38. The method of any of clauses 1 to 37, wherein the conversion comprises generating pixel values of the current video block from the bitstream representation.

39. The method of any of clauses 1 to 37, wherein the conversion comprises generating the bitstream representation from pixel values of the current video block.

40. An apparatus in a video system comprising a processor and a non-transitory memory with instructions thereon, wherein the instructions upon execution by the processor, cause the processor to implement the method in any one of clauses 1 to 39.

41. A computer program product stored on a non-transitory computer readable media, the computer program product including program code for carrying out the method in any one of clauses 1 to 39.

The fourth set of clauses describe certain features and aspects of the disclosed techniques listed in the previous section, including, for example, Item 19, 20, 21, and 22.

1. A method of video processing, comprising: determining, for a conversion between a current video block of a video and a coded representation of the video, a refined motion information for the current video block; and performing the conversion using the refined motion information, wherein the refined motion information is generated based on an interweaved prediction tool in which motion information of partitions of the current video block that are generated using multiple patterns; wherein the refined motion information of the current video block is used for a subsequent processing or selectively stored based on whether a condition is satisfied.

2. The method of clause 1, wherein the subsequent processing is a conversion of a subsequent block to be conversed after the current video block.

3. The method of clause 1, wherein the subsequent processing is a filtering process for the current video block.

4. The method of clause 1, wherein whether the condition is satisfied is determined based on a position of a sub-block, the position being in relation to a block, a CTU, a CTU row, a tile, a slice, a tile group, or a picture in the video.

5. The method of clause 1, wherein whether the condition is satisfied is determined based on a coded mode of at least one of the current video block or neighboring video blocks of the current video block.

6. The method of clause 1, wherein whether the condition is satisfied is determined based on a dimension of the current video block.

7. The method of clause 1, wherein whether the condition is satisfied is determined based on at least one of a picture, a slice type, or a reference picture list that is related to the current video block.

8. A method for video processing, comprising: determining whether an interweaved prediction is applied to a current video block of a video; determining to use a filter process to the current video block based on a determination whether the interweaved prediction is applied to the current video block; and performing a conversion between the current video block and a coded representation of the video based on the determining on a use of the filter process.

9. The method of clause 8, wherein the filter process includes a deblocking process, a sample adaptive offset (SAO) filtering, or an adaptive loop filtering.

10. The method of clause 8, further comprising: determining parameters related to how the filter process is to be applied, and wherein the conversion is performed based on the parameters of the filter process.
11. The method of clause 8, wherein the filter process is not applied on an edge between two sub-blocks in a division pattern for the current video block in a case that the edge is inside a sub-block in another division pattern for the current video block.
12. The method of clause 8, wherein the filter process is in a weaker level for an edge between two sub-blocks in a division pattern for the current video block in a case that the edge is inside a sub-block in another division pattern for the current video block.
13. The method of clause 9, wherein at least one of bS[xDi][yDj], β, Δ, or tc that is a variable used in the deblocking process has a less value for the edge.
14. The method of clause 8, wherein the filter process is in a stronger level on an edge between two sub-blocks in a division pattern for the current video block in a case that the edge is inside a sub-block in another division pattern for the current video block.
15. The method of clause 13, wherein at least one of bS[xDi][yDj], β, Δ, or tc that is a variable used in the deblocking process has a greater value for the edge.
16. A method for video processing, comprising: determining whether an interweaved prediction is applied to a current video block of a video; determining whether to use a local illumination compensation or a weighted prediction to the current video block based on a determination of a use of the interweaved prediction; and performing a conversion between the current video block and a coded representation of the video based on the determining on a use of the local illumination compensation or the weighted prediction.
17. The method of clause 16, further comprising: determining parameters related to how the local illumination compensation or the weighted prediction is to be applied, and wherein the conversion is performed based on the parameters of the local illumination compensation or the weighted prediction.
18. The method of clause 16, wherein the local illumination compensation or a weighted prediction is disabled upon a determination that the interweave prediction is applied to the current video block.
19. The method of clause 16, wherein an indication indicating that the local illumination compensation or the weighted prediction is enabled is not signaled for the current video block or a sub-block of the current video block to which the interweaved prediction is applied.
20. A method for video processing, comprising: determining that weighted prediction is applied to a current video block of a video or a sub-block of the current video block; and performing a conversion between the current video block and a coded representation of the video by disabling a bi-directional optical flow (BDOF) technique.
21. The method of clause 20, wherein the BDOF technique is applied to blocks with weighted prediction.
22. The method of clause 21, wherein a parameter of the BDOF technique is within a threshold range or equal to a certain value.
23. The method of clause 20, wherein certain reference picture restrictions are applied to the current video block.
24. The method of any of clauses 1 to 23, wherein the conversion comprises generating pixel values of the current video block from the bitstream representation.
25. The method of any of clauses 1 to 23, wherein the conversion comprises generating the bitstream representation from pixel values of the current video block.
26. An apparatus in a video system comprising a processor and a non-transitory memory with instructions thereon, wherein the instructions upon execution by the processor, cause the processor to implement the method in any one of clauses 1 to 26.
27. A computer program product stored on a non-transitory computer readable media, the computer program product including program code for carrying out the method in any one of clauses 1 to 26.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of processing video data, comprising:
    determining, during a conversion between a current video unit of a video and a bitstream of the video, that motion vectors of control points for a luma block of the current video unit based on an affine mode, and wherein the current video unit comprises the luma block and a chroma block;
    dividing the luma block into luma sub-blocks;
    dividing the chroma block into chroma sub-blocks;
        determining a luma motion vector for each luma sub-block based on the motion vectors of the control points, and determining a chroma motion vector for each chroma sub-block; and
        reconstructing the luma block based on the luma motion vector of each luma sub-block;
    wherein a color format of the current video unit is 4:2:0, the chroma block comprises at least one chroma group, and four chroma sub-blocks included in a same chroma group correspond to four luma sub-blocks; and
    the four chroma sub-blocks included in the same chroma group share a same chroma motion vector which is derived based two luma motion vectors of two corresponding luma sub-blocks at diagonal or anti-diagonal positions.

2. The method of claim 1, wherein a top-left one of the four luma sub-blocks has motion vector $MV_0$, and a bottom-right one of the four luma sub-blocks has motion vector $MV_1$, and wherein the same chroma motion vector is derived based on applying a scaling factor to an intermediate motion vector $MV^*$, and the $MV^*$ is derived based on the $MV_0$ and the $MV_1$.

3. The method of claim 2, wherein the intermediate motion vector $MV^*$ is derived based on applying an offset-based averaging operation on the $MV_0$ and the $MV_1$.

4. The method of claim 3, wherein the intermediate motion vector $MV^*=Shift(MV_0+MV_1,1)$, wherein $Shift(x, 1)=(x+offset)>>1$, offset is equal to 0 or 1, and wherein >> represents a right shift operation.

5. The method of claim 1, wherein a number of the control points is 2.

6. The method of claim 1, wherein the control points include a top-left control point and a top-right control point.

7. The method of claim 1, wherein a number of the control points is 3.

8. The method of claim 1, wherein the control points include a top-left control point, a top-right control point and a bottom-left corner control point.

9. The method of claim 1, further comprising:
    reconstructing the chroma block based on the motion vectors of the chroma sub-blocks.

10. The method of claim 1, wherein the conversion includes encoding the current video unit into the bitstream.

11. The method of claim 1, wherein the conversion includes decoding the current video unit from the bitstream.

12. An apparatus for processing video data comprising a processor and a non-transitory memory with instructions thereon, wherein the instructions upon execution by the processor, cause the processor to:
    determine, during a conversion between a current video unit of a video and a bitstream of the video, that motion vectors of control points for a luma block of the current video unit based on an affine mode, and wherein the current video unit comprises the luma block and a chroma block;
    divide the luma block into luma sub-blocks;
    divide the chroma block into chroma sub-blocks;
        determine a luma motion vector for each luma sub-block based on the motion vectors of the control points, and determining a chroma motion vector for each chroma sub-block; and
        reconstruct the luma block based on the luma motion vector of each luma sub-block;
    wherein a color format of the current video unit is 4:2:0, the chroma block comprises at least one chroma group, and four chroma sub-blocks included in a same chroma group correspond to four luma sub-blocks; and the four chroma sub-blocks included in the same chroma group share a same chroma motion vector which is derived based two luma motion vectors of two corresponding luma sub-blocks at diagonal or anti-diagonal positions.

13. The apparatus of claim 12, wherein a top-left one of the four luma sub-blocks has motion vector $MV_0$, and a bottom-right one of the four luma sub-blocks has motion vector $MV_1$, and wherein the same chroma motion vector is derived based on applying a scaling factor to an intermediate motion vector $MV^*$, and the $MV^*$ is derived based on the $MV_0$ and the $MV_1$.

14. The apparatus of claim 13, wherein the intermediate motion vector $MV^*$ is derived based on applying an offset-based averaging operation on the $MV_0$ and the $MV_1$.

15. The apparatus of claim 14, wherein the intermediate motion vector $MV^*=\text{Shift}(MV_0+MV_1,1)$, wherein $\text{Shift}(x,1)=(x+\text{offset})\gg 1$, offset is equal to 0 or 1, and wherein $\gg$ represents a right shift operation.

16. The apparatus of claim 12, wherein a number of the control points is 2.

17. The apparatus of claim 12, wherein the control points include a top-left control point and a top-right control point.

18. The apparatus of claim 12, wherein a number of the control points is 3.

19. A non-transitory computer-readable storage medium storing instructions that cause a processor to:
   determine, during a conversion between a current video unit of a video and a bitstream of the video, that motion vectors of control points for a luma block of the current video unit based on an affine mode, and wherein the current video unit comprises the luma block and a chroma block;
   divide the luma block into luma sub-blocks;
   divide the chroma block into chroma sub-blocks;
      determine a luma motion vector for each luma sub-block based on the motion vectors of the control points, and determining a chroma motion vector for each chroma sub-block; and
      reconstruct the luma block based on the luma motion vector of each luma sub-block;

wherein a color format of the current video unit is 4:2:0, the chroma block comprises at least one chroma group, and four chroma sub-blocks included in a same chroma group correspond to four luma sub-blocks; and the four chroma sub-blocks included in the same chroma group share a same chroma motion vector which is derived based two luma motion vectors of two corresponding luma sub-blocks at diagonal or anti-diagonal positions.

20. A non-transitory computer-readable recording medium storing a bitstream of a video which is generated by a method performed by a video processing apparatus, wherein the method comprises:
   determining, that motion vectors of control points for a luma block of a current video unit of the video based on an affine mode, and wherein the current video unit comprises the luma block and a chroma block;
   dividing the luma block into luma sub-blocks;
   dividing the chroma block into chroma sub-blocks;
      determining a luma motion vector for each luma sub-block based on the motion vectors of the control points, and determining a chroma motion vector for each chroma sub-block;
      reconstructing the luma block based on the luma motion vector of each luma sub-block to obtain reconstructed luma block; and
   generating the bitstream at least based on the reconstructed luma block;

wherein a color format of the current video unit is 4:2:0, the chroma block comprises at least one chroma group, and four chroma sub-blocks included in a same chroma group correspond to four luma sub-blocks; and the four chroma sub-blocks included in the same chroma group share a same chroma motion vector which is derived based two luma motion vectors of two corresponding luma sub-blocks at diagonal or anti-diagonal positions.

* * * * *